US008873698B2

(12) United States Patent
Kropaczek et al.

(10) Patent No.: US 8,873,698 B2
(45) Date of Patent: Oct. 28, 2014

(54) COMPUTER-IMPLEMENTED METHOD AND SYSTEM FOR DESIGNING A NUCLEAR REACTOR CORE WHICH SATISFIES LICENSING CRITERIA

(75) Inventors: David Joseph Kropaczek, Wilmington, NC (US); Jens Andersen, Wilmington, NC (US); James Shaug, Moss Landing, CA (US); Mehdi Asgari, Ammon, ID (US)

(73) Assignee: Global Nuclear Fuel—Americas, LLC, Wilmington, NC (US)

( * ) Notice: Subject to any disclaimer, the term of this patent is extended or adjusted under 35 U.S.C. 154(b) by 2614 days.

(21) Appl. No.: 11/642,871

(22) Filed: Dec. 21, 2006

(65) Prior Publication Data
US 2007/0213959 A1 Sep. 13, 2007

Related U.S. Application Data

(63) Continuation-in-part of application No. 11/585,965, filed on Oct. 25, 2006, which is a continuation-in-part of application No. 10/321,441, filed on Dec. 18, 2002, now Pat. No. 7,222,061, and a continuation-in-part of application No. 10/401,602, filed on Mar. 31, 2003, now Pat. No. 7,231,333, and a continuation-in-part of application No. 10/325,831, filed on Dec. 23, 2002, now Pat. No. 7,200,541.

(51) Int. Cl.
*G06F 17/50* (2006.01)
*G06G 7/54* (2006.01)
(Continued)

(52) U.S. Cl.
CPC .......... *G21C 17/00* (2013.01); *G21Y 2002/203* (2013.01); *Y02E 30/39* (2013.01);
(Continued)

(58) Field of Classification Search
USPC .......... 376/267, 409; 367/260, 261, 264, 267, 367/347, 463; 700/90, 95, 97–107, 1, 700/28–55; 703/1, 6, 7
See application file for complete search history.

(56) References Cited

U.S. PATENT DOCUMENTS 4,851,186 A * 7/1989 Berte et al. .................... 376/364
5,024,801 A * 6/1991 Impink et al. .................... 703/6
(Continued)

FOREIGN PATENT DOCUMENTS

EP 1113456 A1 7/2001
EP 1113457 A1 7/2001
(Continued)

OTHER PUBLICATIONS

Zhian Li, Samuel H. Levine, "AUTOLOAD, An Automatic Optimal Pressurized Water Reactor Reload Design System with an Expert Module" Nuclear Science and Engineering: 118, 1994, pp. 67-78.
(Continued)

*Primary Examiner* — Bernarr Gregory
(74) *Attorney, Agent, or Firm* — Harness, Dickey & Pierce, P.L.C.

(57) ABSTRACT

In a computer-implemented method of designing a nuclear reactor of a given reactor plant, an initial, test reactor core design is generated for the given plant based on a plurality of limits input by a user. The limits include a plurality of transient licensing constraints to be satisfied for operating the given plant. The method includes selecting, from a set of automated tools, one or more automated tools to evaluate the test core design, and operating one of more of selected automated tools to output data for display to the user. The displayed data is related to a core design that satisfies the limits inclusive of the transient licensing constraints.

19 Claims, 28 Drawing Sheets

(51) Int. Cl.
| | |
|---|---|
| *G21D 3/00* | (2006.01) |
| *G21C 19/20* | (2006.01) |
| *G21C 17/00* | (2006.01) |
| *G21D 3/04* | (2006.01) |
| *G21D 3/08* | (2006.01) |
| *G06F 17/00* | (2006.01) |
| *G06G 7/00* | (2006.01) |

(52) U.S. Cl.
CPC ......... *G21D 3/001* (2013.01); *G21Y 2002/202* (2013.01); *G21Y 2004/403* (2013.01); *G21Y 2002/304* (2013.01); *G21C 19/205* (2013.01); *G21Y 2004/40* (2013.01); *G21D 2003/002* (2013.01); *G21D 3/04* (2013.01); *G21Y 2002/201* (2013.01); *G21D 3/08* (2013.01)
USPC ............... 376/409; 376/463; 703/1; 703/6; 703/7; 700/1; 700/28; 700/90; 700/95; 700/97

(56) References Cited

U.S. PATENT DOCUMENTS

| | | | | |
|---|---|---|---|---|
| 5,272,736 | A | 12/1993 | Wolters, Jr. et al. | 376/267 |
| 5,790,616 | A | 8/1998 | Jackson | 376/245 |
| 5,790,618 | A | 8/1998 | Fawks, Jr. | 376/259 |
| 5,912,933 | A | 6/1999 | Shaug et al. | 376/216 |
| 5,923,717 | A * | 7/1999 | Fawks, Jr. | 376/245 |
| 6,026,136 | A * | 2/2000 | Radkowsky | 376/173 |
| 6,075,529 | A | 6/2000 | Tamegaya | 715/744 |
| 6,198,786 | B1 | 3/2001 | Carroll et al. | 376/211 |
| 6,208,982 | B1 | 3/2001 | Allen et al. | 706/11 |
| 6,243,860 | B1 | 6/2001 | Holland | 717/141 |
| 6,263,038 | B1 | 7/2001 | Kantrowitz et al. | 376/435 |
| 6,338,149 | B1 * | 1/2002 | Ciccone et al. | 714/38 |
| 6,381,564 | B1 | 4/2002 | Davis et al. | 703/22 |
| 6,404,437 | B1 * | 6/2002 | Russell et al. | 345/473 |
| 6,430,247 | B1 | 8/2002 | Mourlevat et al. | 376/254 |
| 6,526,116 | B1 * | 2/2003 | Nguyen et al. | 376/439 |
| 6,535,568 | B1 | 3/2003 | Reese | |
| 6,701,289 | B1 * | 3/2004 | Garnett et al. | 703/14 |
| 6,748,348 | B1 * | 6/2004 | Russell, II | 703/6 |
| 6,813,327 | B1 | 11/2004 | Challberg | |
| 6,931,090 | B2 * | 8/2005 | Chao et al. | 376/267 |
| 6,934,350 | B1 | 8/2005 | Challberg et al. | 376/353 |
| 7,224,761 | B2 * | 5/2007 | Popa | 376/267 |
| 7,337,099 | B2 * | 2/2008 | Kropaczek et al. | 703/6 |
| 7,409,032 | B2 * | 8/2008 | Sutton et al. | 376/267 |
| 7,424,412 | B2 * | 9/2008 | Kropaczek et al. | 703/6 |
| 7,426,458 | B2 * | 9/2008 | Horton et al. | 703/6 |
| 7,428,479 | B2 * | 9/2008 | Boer et al. | 703/6 |
| 7,472,045 | B2 * | 12/2008 | Jackson et al. | 703/6 |
| 7,574,337 | B2 | 8/2009 | Kropaczek et al. | |
| 7,613,272 | B2 * | 11/2009 | Sutton et al. | 376/267 |
| 7,804,929 | B2 | 9/2010 | Karve et al. | |
| 8,109,766 | B2 | 2/2012 | Russell, II et al. | |
| 2002/0085660 | A1 | 7/2002 | Nakamaru et al. | 376/293 |
| 2002/0101949 | A1 | 8/2002 | Nordberg | 376/122 |
| 2002/0101951 | A1 * | 8/2002 | Nakamaru et al. | 376/282 |
| 2002/0122521 | A1 | 9/2002 | Bolger et al. | |
| 2003/0086520 | A1 * | 5/2003 | Russell et al. | 376/259 |
| 2004/0013220 | A1 | 1/2004 | Casillas et al. | 376/245 |
| 2004/0052326 | A1 | 3/2004 | Blanpain et al. | 376/411 |
| 2004/0059549 | A1 * | 3/2004 | Kropaczek et al. | 703/2 |
| 2004/0059696 | A1 * | 3/2004 | Kropaczek et al. | 706/46 |
| 2004/0066875 | A1 | 4/2004 | Bazant | 376/343 |
| 2004/0096101 | A1 * | 5/2004 | Mori et al. | 382/162 |
| 2004/0101083 | A1 | 5/2004 | Russell et al. | 376/256 |
| 2004/0122629 | A1 * | 6/2004 | Russell et al. | 703/2 |
| 2004/0122632 | A1 | 6/2004 | Kropaczek et al. | |
| 2004/0191734 | A1 | 9/2004 | Russell et al. | 434/218 |
| 2004/0220787 | A1 | 11/2004 | Russell et al. | 703/6 |
| 2005/0015227 | A1 | 1/2005 | Kropaczek et al. | 703/6 |
| 2005/0018806 | A1 * | 1/2005 | Gautier et al. | 376/406 |
| 2006/0149514 | A1 | 7/2006 | Kropaczek et al. | 703/6 |
| 2006/0149515 | A1 | 7/2006 | Horton et al. | |

FOREIGN PATENT DOCUMENTS

| | | |
|---|---|---|
| EP | 1221701 | 7/2002 |
| EP | 1435626 | 7/2004 |
| EP | 1 524 674 | 4/2005 |
| EP | 1 675 127 | 6/2006 |
| EP | 1677314 A2 | 7/2006 |
| EP | 1 699 057 | 9/2006 |
| EP | 1699058 | 9/2006 |
| EP | 1 202 289 | 11/2006 |
| EP | 1 113 455 | 6/2012 |
| JP | 08-194088 | 7/1996 |
| JP | 08194088 A | 7/1996 |
| JP | 9-304570 | 11/1997 |
| JP | 2001-264478 | 9/2001 |
| JP | 2001-296382 | 10/2001 |
| JP | 2001296382 A | 10/2001 |
| JP | 2002-181977 | 6/2002 |
| JP | 2002181977 A | 6/2002 |
| JP | 2002-257973 | 9/2002 |
| JP | 2005-010140 | 1/2005 |
| JP | 2005-114724 | 4/2005 |
| JP | 2005114724 A | 4/2005 |
| JP | 2006-017717 | 1/2006 |
| JP | 2006-017718 | 1/2006 |
| JP | 2006-177962 | 7/2006 |
| JP | 2006-189438 | 7/2006 |
| JP | 2006-189439 | 7/2006 |
| JP | 2006-189442 | 7/2006 |
| JP | 2006177962 A | 7/2006 |

OTHER PUBLICATIONS

Han Gon Kim, Soon Heung Chang, Byung Ho Lee, "Optimal Fuel Loading Pattern Design Using an Artificial Neural Network and a Fuzzy Rule-Based System" Nuclear Science and Engineering: 115, 1993, pp. 152-163.

Lian Shin Lin, Chaung Lin, "A Rule-Based Expert System for Automatic Control Rod Pattern Generation for Boiling Water Reactors" Nuclear Technology vol. 95 Jul. 1991, pp. 1-8.

Zhian Li, Samuel H. Levine, "AUTOLOAD, An Automated Optimal Pressurized Water Reactor Reload Design with an Expert Module" Nuclear Science and Engineering: 118, 1994, pp. 67-78.

Han Gon Kim, Soon Heung Chang, Byung Ho Lee, "Optimal Fuel Loading Pattern Design Using Artificial Neural Netwrok and a Fuzzy Rule-based System" Nuclear Science and Engineering: 115, 1993 pp. 152-163.

European Search Report dated May 11, 2010 for corresponding European Application No. 07118797.5-2208.

European Search Report dated Sep. 27, 2010 for corresponding European Application No. 07123175.7.

An Unofficial English translation of a JP Office Action issued in connection with corresponding JP Patent Application No. 2007-325495 dated May 3, 2009.

Notice of Reasons for Refusal for corresponding Japanese patent application No. 2007-325495 dated Dec. 18, 2012 with English translation.

Office Action from corresponding Japanese patent application No. 2007-325495 dated Dec. 3, 2013 (with partial English translation).

* cited by examiner

FIG. 5 ePrometheus - Hatch 1 - Cycle 1 - Test 5b - CS ID:2485 <Online Operations> — 505

WorkSpace  Input  Run  View  Reports  Window  Help

Input Deck

Plant Configuration | Optimization Configuration | Optimization Constraints | Operations Configuration | Fuel Shuffling | Eigenvalue & Operating Limit | Select Files

Optimization Constraints

510

| Constraint Description | Importance | Exposure Dependence | Design Value | Objective Add Funct. | Optimization Credits |
|---|---|---|---|---|---|
| Maximum MFLCPR | Nominal | ☐ Edit | 0.964 | ☐ | None |
| Maximum MFLPD | Nominal | ☐ Edit | 0.957 | ☐ | None |
| Maximum MAPLHGR | Nominal | ☐ Edit | 0.957 | ☐ | None |
| Minimum % Flow | Nominal | ☐ Edit | 85.0 | ☐ | None |
| Maximum % Flow | Nominal | ☐ Edit | 100.0 | ☐ | None |
| Eigenvalue Upper Tolerance ( Δ Cycle) | None | ☐ Edit | 1.0E-4 | ☐ | None |
| Eigenvalue Lower Tolerance ( Δ Cycle) | None | ☐ Edit | 1.0E-4 | ☐ | None |
| EOC Eigenvalue Upper Tolerance | None | | 0.0 | ☐ | None |
| EOC Eigenvalue Lower Tolerance | Nominal | | 0.0 | ☐ | Nominal |
| Minimum Cycle Length (MWD/st) | None | | 11500.0 | ☐ | None |
| Maximum Nodal Exposure Ratio (NEXRAT) | None | | 0.0 | ☐ | None |
| Maximum Bundle Average Exposure @ EOC | None | | 0.0 | ☐ | None |
| Minimum % Shutdown Margin | Nominal | ☐ Edit | 1.5 | ☐ | None |
| Maximum % Hot Excess | None | ☐ Edit | 0.0 | ☐ | None |
| Minimum % SLICS Margin | None | ☐ Edit | 0.0 | ☐ | None |
| Minimum % Hot Excess @ 200 | None | | 0.0 | ☐ | None |
| Maximum Hot Excess Slope (%/(MWD/st)) | None | | 0.0 | ☐ | None |
| Minimum Average Void Fraction | None | ☐ Edit | 0.0 | ☐ | None |
| Maximum Average Void Fraction | None | ☐ Edit | 0.0 | ☐ | None |
| Minimum Axial Void Tilt (AVT) | None | ☐ Edit | 0.0 | ☐ | None |
| Maximum Axial Void Tilt (AVT) | None | ☐ Edit | 0.0 | ☐ | None |
| Minimum Axial Power Tilt (APT) | None | ☐ Edit | 0.0 | ☐ | None |
| Maximum Axial Power Tilt (APT) | None | ☐ Edit | 0.0 | ☐ | None |
| Minimum Axial Peak | None | ☐ Edit | 0.0 | ☐ | None |
| Maximum Axial Peak | None | ☐ Edit | 0.0 | ☐ | None |
| Maximum Integrated Power | None | ☐ Edit | 0.0 | ☐ | None |

FIG. 9

Filter Burnt Fuel

☑ K∞ — 642     [>▼]—644   [1.2]—646

☑ Exposure     [<▼]—644   [2000]—646

☑ Cycle

| | Cycle | |
|---|---|---|
| ☑ | 2 | ▲ |
| ☐ | 3 | |
| ☑ | 4 | |
| ☐ | | |
| ☐ | | ▼ |

☑ Pedigree

| | Status | |
|---|---|---|
| ☑ | RU | ▲ |
| ☑ | RP | |
| ☐ | DC | |
| ☐ | DD | ▼ |

[ OK ]

[ CANCEL ]

☑ Product Line

| | Product | |
|---|---|---|
| ☑ | GE 11 | ▲ |
| ☑ | GE 12 | |
| ☐ | GE 6 | |
| ☐ | GE 8 | ▼ |

FIG. 10

Fresh Bundle Type ~650

| BName | K∞ | Product Line | Avg Enrich... | Gad V |
|---|---|---|---|---|
| wxy01 | 0.9988 | Ascending | | 5.0 |
| wxy05 | 1.0 | Descending | | 7.0 |
| wxy02 | 1.2302 | | | 10.0 |
| wxy04 | 1.3999 | GE 10test01 | 4.5 | 10.0 |
| wxy03 | 1.4 | GE 11test01 | 1.2 | 3.0 |

630 → ▶ ~632
▲ ~634
↰ ~636

Fresh Bundle Pool ~660

| $ | BName | K∞ | Product Line | Avg Enrich... |
|---|---|---|---|---|
| 1 | | | | |
| 2 | | | | |
| 3 | | | | |

662

Total: 0     0 row(s) selected

| ePrometheus - Hatch 1 - Cycle 1 - Test 5b - CS10:2671 <Online Operation> |
| --- |

WorkSpace  Input  Run  View  Reports  Window  Help

Input Deck

| Plant Configuration | Optimization Configuration | Optimization Constraints | Operations Configuration | Fuel Shuffling | Eigenvalue & Operating Limit | Select Files |

Optimization Configuration

2158

| Constraint Description | Exposure Dependence | Design Value | Importance | Objective Add Funct. | Optimization Credits |
| --- | --- | --- | --- | --- | --- |
| Maximum MFLCPR — 2150 | ☐ Edit | 0.964 | Nominal | ☐ | None |
| Maximum MFLPD — 2156 | ☐ Edit | 0.957 | Nominal | ☐ —2152 —2154 | None |
| Maximum MAPLHGR | ☐ Edit | 0.957 | Nominal | ☐ | None |
| Minimum % Flow | ☐ Edit | 85.0 | Nominal | ☐ | None |
| Maximum % Flow | ☐ Edit | 100.0 | None | ☐ | None |
| Eigenvalue Upper Tolerance (ΔCycle) | ☐ Edit | 1.0E-4 | None | ☐ | None |
| Eigenvalue Lower Tolerance (ΔCycle) | ☐ Edit | 1.0E-4 | None | ☐ | None |

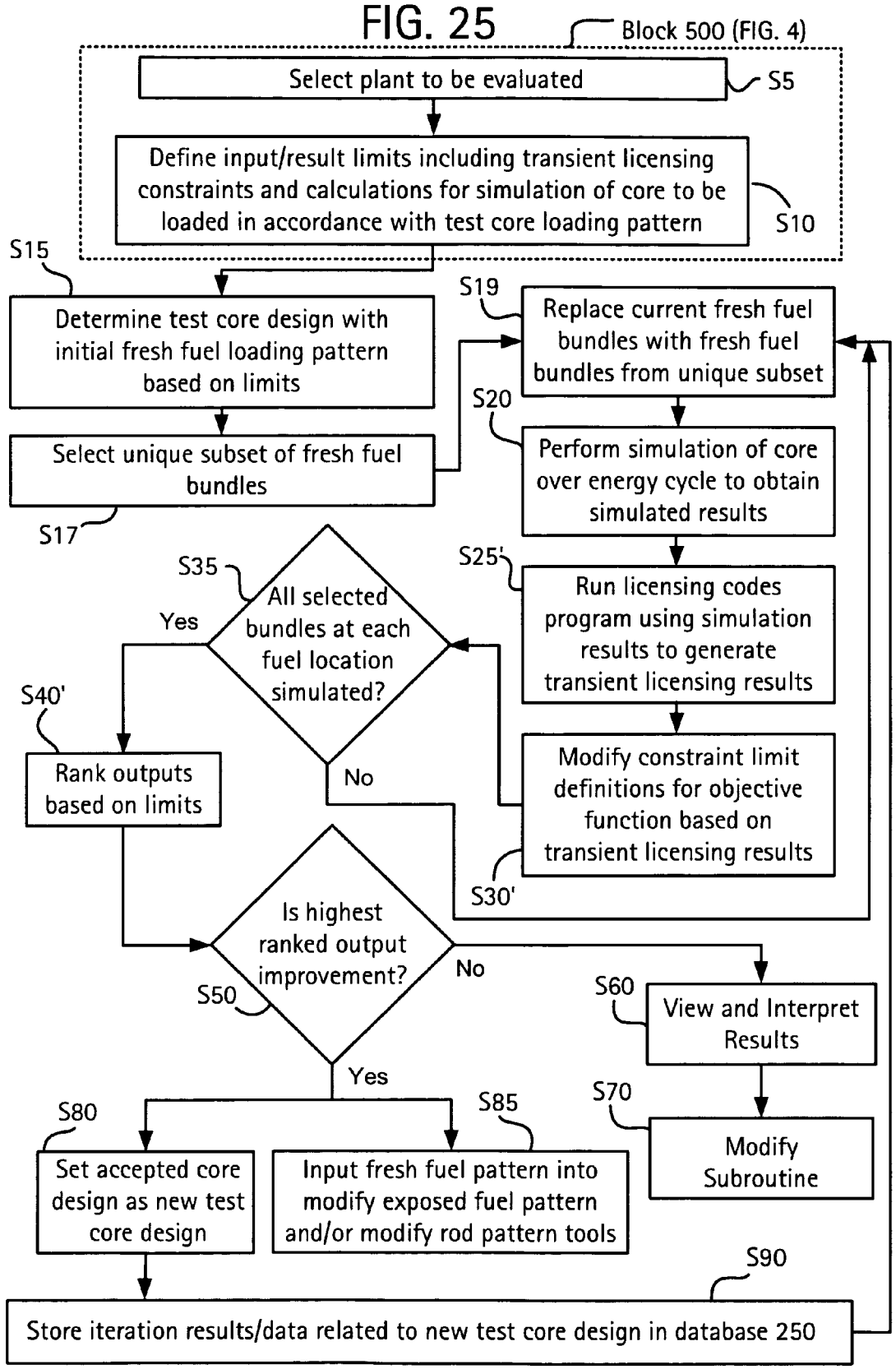

FIG. 26

```
Input Deck                                                    _ □ X
[icons] ◄ ►
   Plant Configuration    |  Optimization Configuration  |  Optimization Constraints
 Operations Configuration | Fuel Shuffling | Eigenvalue & Operating Limit | Select Files | n Streaming N-Streaming
34 19 4 4 7 0                           ─ 2605

☑  1 GE10-P8HXB311-8GZ-100T-145-T6-3869       [1 ▼]  [ONE]
☑  2 GE10-P8HXB312-7GZ-100T-145-T6-3870       [1 ▼]  [TDD]
☑  3 GE10-P8HXB332-8G5.0-100T-145-T6-3872     [1 ▼]  [T__]
☐  4 GE10-P8HXB333-4G5.0/6G4.0-100T-145-T6-3871   1
☐  5 ATRM9-P9DATB349-11G6.5-SPC100T-9WR-144-T6-2444  2
☐  6 GE9B-P8DWB258-9GZ-80U-145-T6-2441               3
☐  7 ATRM9-P9DATB360-11G6.5-SPC100T-9WR-144-T6-2445  4
☐  8 GE9B-P8DWB258-4G4.0/3G3.0-80U-145-T6-2440       5
☐  9 GE8B-P8DQB300-9G4.0-90U-4WR-145-T6-2443         6
☐ 12 GE8B-P8DQB301-9GZ-90U-4WR-145-T6-2439    [1 ▼]
☐ 15 GE9B-P8DWB305-7GZ-80U-145-T6-3869        [1 ▼]
☐ 16 GE14-P10DNAB411-14GZ-100T-145-T6-2564    [1 ▼]
☐ 17 GE14-P10DNAB409-15GZ-100T-145-T6-2565    [1 ▼]
☐ 18 ATRM9-P9DATB383-11GZ-SPC100T-9WR-144-TB-2446  [1 ▼]
☐ 19 ATRM9-P9DATB382-12GZ-SPC100T-9WR-144-T6-2438  [1 ▼]
☐ 20 GE14-P10DNAB402-15GZ-100T-145-T6-12222   [1 ▼]
☑ 21 GE14-P10DNAB409-13GZ-100T-145-T6-21222   [1 ▼]  [N21]
```

2610, 2605, 2600

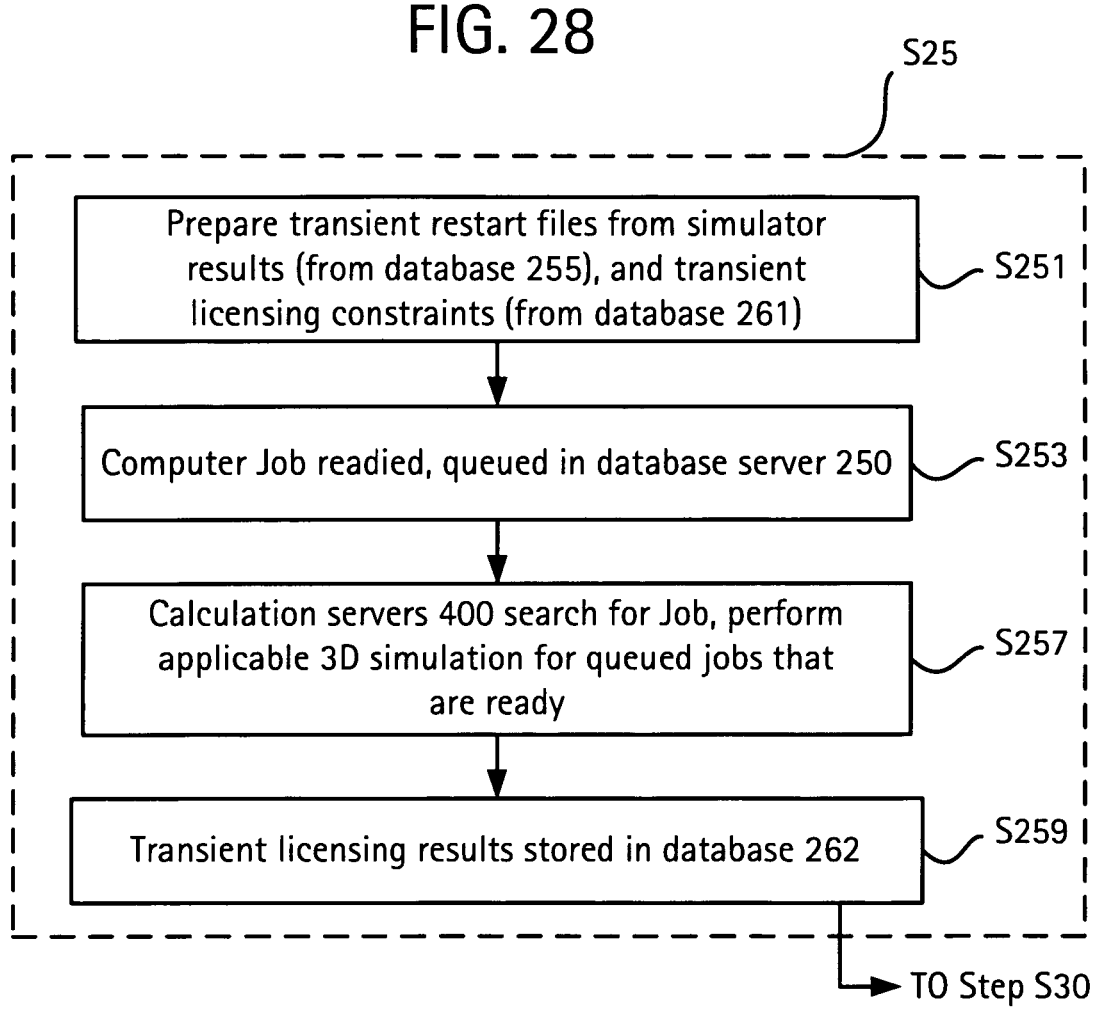

COMPUTER-IMPLEMENTED METHOD AND SYSTEM FOR DESIGNING A NUCLEAR REACTOR CORE WHICH SATISFIES LICENSING CRITERIA

PRIORITY STATEMENT

This application is a continuation-in-part of and claims domestic priority benefits under 35 U.S.C. §120 of co-pending and commonly assigned U.S. patent application Ser. No. 11/585,965 to David J. Kropaczek et al., the "'965 application", filed Oct. 25, 2006 and entitled "Method and System for Designing a Nuclear Reactor Core for Uprated Power Operations", the entire contents of which is hereby incorporated by reference herein. The '965 application is a continuation-in-part of the following commonly assigned U.S. patent application Ser. No. 10/321,441 to William Earl Russell, II, et al., filed Dec. 18, 2002 and entitled "Method and Arrangement for Developing Rod Patterns in Nuclear Reactors", now U.S. Pat. No. 7,222,061; Ser. No. 10/401,602 to William Earl Russell, II et al., filed Mar. 31, 2003 and entitled "Method and Arrangement for Developing Core Loading Patterns in Nuclear Reactors", now U.S. Pat. No. 7,231,333; and Ser. No. 10/325,831 to David J. Kropaczek et al., filed Dec. 23, 2002 and entitled "Method and Arrangement for Determining Nuclear Reactor Core Designs", now U.S. Pat. No. 7,200,541, the entire contents of all three applications being hereby incorporated by reference herein.

BACKGROUND OF THE INVENTION

1. Field of the Invention

Example embodiment(s) of the present invention are related in general to a computer-implemented method and system for designing a nuclear reactor core which satisfies NRC steady-state and transient licensing requirements.

2. Description of the Related Art

A core of a nuclear reactor such as boiling water reactor (BWR) or pressurized water reactor (PWR) has several hundred individual fuel bundles of fuel rods (BWR) or groups of fuel rods (PWR) that have different characteristics. These bundles (or fuel rod groups) are arranged so that interaction between rods within a fuel bundle, and between fuel bundles satisfies all regulatory and reactor design constraints, including governmental (licensing) and customer-specified constraints. Additionally for a BWR, the control mechanisms, e.g. rod pattern (control blade) design and core flow, must be determined so as to optimize core cycle energy. Core cycle energy is the amount of energy that a reactor core generates before the core needs to be refreshed with new fuel elements, such as is done at an outage.

Traditionally, reactor core and operational strategy design for a BWR proceeds in several phases. The first phase, fuel cycle development, typically occurs approximately 9 months in advance of the fuel outage and involves certain assumptions about key operating parameters, such as operating limit critical power ratio (OLMCPR), the determination of which depends on the ultimate design result.

The second phase reactor core and operational strategy design, known as reference loading pattern (RLP) development, provides a refinement of the fuel cycle design in preparation for licensing. The RLP forms the basis of all licensing (transient) calculations to be performed to assure the licenseability as well as safety of the plant for the upcoming fuel cycle. The RLP involves some modification of previous operating parameter assumptions, especially if there has been a marked change in the energy plan from previous cycles, introduction of new fuel products, or a change in operational strategy. These modifications in assumptions result in changes to the final core design and operational strategy. As a result, significant differences from the original fuel cycle can result, with a potential for negative impact on economics, margin, or flexibility of operations.

The reasons for the two phase approach to design and licensing stem from the requirement to use numerous computer codes that have been developed for evaluation of accident and transient scenarios that determine the design basis for the plant. Many of the actual licensing limits, especially those related to thermal performance of the fuel, are condensed into a series of design curves that are readily evaluated by a 3D core simulator. Other licensing limits can be ignored in the design phase since these licensing limits are not considered design limiting. These ignored licensing limits are only evaluated during the post-design licensing phase, not during reactor core design.

The existing design process requires a designer to be cognizant of potential licensing problems a priori in the design and licensing process. Past experiences with a particular plant and fuel cycle design approach could suggest additional 'soft constraints' introduced by the designer to hedge against future problems in the licensing phase. Even so, violation of licensing criteria during the licensing phase nevertheless occurs, in which case, additional design iterations need to be performed. These additional iterations involve 'detuning' a design, which can involve adding additional fresh bundles, adding additional cost down at end of cycle, and/or reducing flexibility of operations. Often, assumptions made by core designers with regard to design limits impact the aggressiveness with regard to maximizing fuel cycle efficiency.

Additionally, no assistance is provided via the iterative design process in order to guide a designer toward a more favorable design solution. The conventional core design process typically looks at a subset of the licensing limits (i.e., those considered to be most limiting in the core design and translatable into a pseudo-steady state design limit readily evaluated by the 3D simulation code). The responsible engineer's experience and intuition are the sole means of performing design changes, with the goal of improving the overall core design solution. However, other transient licensing constraints which also depend on the core design (and which are ignored during the design process), can and do in fact become limiting.

BRIEF DESCRIPTION OF THE INVENTION

An example embodiment is directed to a computer-implemented method of designing a nuclear reactor core of a given reactor plant. The method includes generating an initial, test reactor core design for the given plant based on a plurality of limits input by a user. The limits include a plurality of transient licensing constraints to be satisfied for operating the given plant. The method includes selecting, from a set of automated tools, one or more automated tools to evaluate the test core design, and operating one of more of selected automated tools to output data for display to the user related to a core design that satisfies the limits inclusive of the transient licensing constraints.

Another example embodiment is directed to a system for designing a core of a nuclear reactor plant. The system includes a memory for storing a test reactor core design to be evaluated for a reactor plant of interest, and an interface receiving a set of limits. The limits include a plurality of transient licensing constraints to be satisfied for power operations in the core. A processor iterates one or more automated tools of a set of tools useable to evaluate the test design against the limits and transient licensing constraints. The interface enables selection of one or more of the automated tools for simulating reactor operation of the test core design to produce a plurality of simulation outputs. The processor then operates the selected automated tool to generate the simulation outputs which are evaluated against the limits and transient licensing constraints, and generates data via the interface for display to the user. The data indicates whether any limits were violated by the test core design during the simulation based on the evaluation. Otherwise if no limits are violated, the processor directs data via the interface for display to the user that is related to a core design that satisfies all limits and transient licensing constraints.

BRIEF DESCRIPTION OF THE DRAWINGS

Example embodiments of the present invention will become more apparent by describing, in detail, example embodiments thereof with reference to the attached drawings, wherein like elements are represented by like reference numerals, which are given by way of illustration only and thus do not limit the example embodiments of the present invention.

FIG. 5 is a screen shot to illustrate example client-inputted plant specific constraints.

FIG. 9 is a screen shot illustrating the filter tool 632.

FIG. 10 is a screen shot to illustrate a load fresh window displayed by the loading map editor 601 for loading of fresh bundles into the fuel template.

FIG. 12 is a screen shot illustrating how a control blade sequence may be entered.

FIG. 21 illustrates a screen shot of an exemplary optimization constraints page listing optimization constraints associated with an optimization problem of boiler water reactor core design.

FIG. 25 is a flow chart illustrating the functionality of the N-Streaming tool in accordance with an exemplary embodiment of the invention.

FIG. 26 illustrates a screen shot of a bundle selection web page.

FIG. 28 is a flow diagram illustrating run licensing codes Step S25 of FIG. 11 in further detail.

DETAILED DESCRIPTION OF EXAMPLE EMBODIMENTS

Figure 1:
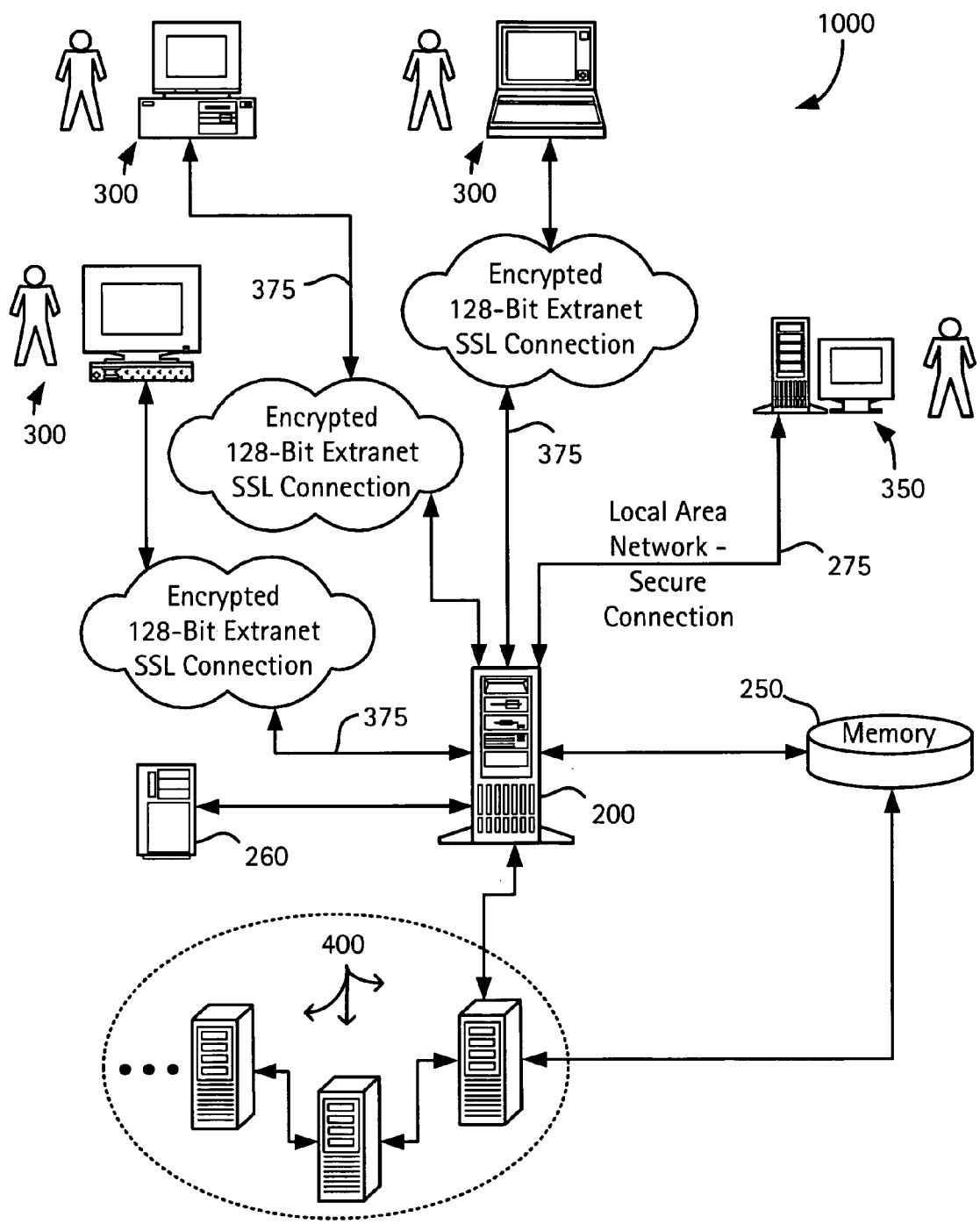
FIG. 1 illustrates an arrangement for implementing a method of designing a nuclear reactor core for power operations in accordance with an example embodiment of the invention.

As will be described in more detail below, the example embodiments are directed to a computer-implemented method and system for designing a nuclear reactor core which incorporate licensing calculations to account for plant licensing criteria during core design. The system includes a graphical user interface (GUI) and a processing medium (e.g., software-driven program, processor, application(s), etc.) to enable a user of the program to virtually simulate a reactor core design.

In an example, the GUI and one or more processors enable the user to virtually simulate a core design while taking into account operational cycle and reload licensing transients as part of an integrated approach to determining optimized rod patterns, flow, fresh and exposed fuel placements, and fresh fuel bundle design using a plurality of automated tools. Various computer codes for performing licensing calculations are coupled with core simulator codes used to evaluate fuel cycle design parameters. Data from the core simulation (simulation outputs) is passed to the transient codes, and a transient codes program is run using the simulation outputs to evaluate transient licensing criteria and generate transient licensing results. Thus, transient licensing results data is generated within the core design evaluation (which uses an objective function) to evaluate the test core design's adherence to the limits and to perform modifications. Moreover, objective function constraint limit definitions to be used for the objective function are updated dynamically based on the transient licensing results resulting from running the transient codes program.

Each automated design tool may be embodied as a software-driven application or program to develop and/or optimize certain core features or parameters so as to generate an accepted core design that satisfies input limits for the plant of interest inclusive of transient licensing constraints. These automated tools include but are not limited to, an automated tool to modify the rod pattern (control blade pattern) for the core; an automated tool to modify a core loading pattern in the core, and an automated core design tool to optimize and/or determine desired unique fresh fuel bundle types and placement in the core, etc. For each tool, the user may initiate a reactor simulation (e.g., 3D simulation using simulation codes licensed by the NRC) of the modified core design, and view outputs from the simulation.

Each automated tool utilizes an objective function to determine how closely a simulated modified core design meets the constraints. The objective function is a mathematical equation that incorporates the constraints or limits and quantifies the core design's adherence to the limits. The GUI presents a graphic illustration of which outputs violate which constraints, as determined by the objective function. Via the GUI, the user may then modify the core design. This may constitute a change in bundle design, control rod placement, exposed or fresh fuel placement, etc., and repeating the simulation to evaluating if there is any performance improvement in the modified design. The modifying, simulating and evaluating simulation outputs against the constraints may be iteratively repeated until a core design satisfies all limits (inclusive of transient licensing constraints) so as to operate a reactor loaded based on the acceptable reactor core design, or within a margin to given limits(s) that are acceptable to the user and/or customer.

FIG. 1 illustrates a system for implementing the example method in accordance with an exemplary embodiment of the invention. Referring to FIG. 1, system 1000 may include an application server 200, which may serve as a central nexus of an accessible website, for example. The application server 200 may be embodied as any known application server software, such as Citrix MetaFrame Presentation server, for example. Application server 200 may be operatively connected to a plurality of calculation servers 400, a cryptographic server 260 and to a memory 250. Memory 250 may be embodied and illustrated as a relational database server or a database server, for example.

A plurality of external users 300 may communicate with application server 200 over a suitable encrypted medium such as an encrypted 128-bit secure socket layer (SSL) connection 375, although the present invention is not limited to this encrypted communication medium. An external user 300 may connect to the application server 200 over the Internet or from any one of a personal computer, laptop, and personal digital assistant (PDA), etc., using a suitable interface such as a web-based Internet browser. Further, application server 200 is accessible to internal users 350 via a suitable local area network connection (LAN 275), so that internal users 350 have access over an intranet for example. Hereafter for reasons of brevity, 'user' is employed generically to denote any of an external user 300, internal user 350 or other designer accessing system 1000. For example, the user may be any of a representative of a nuclear reactor plant accessing the website to determine a desired core design for his or her nuclear reactor, and/or a vendor hired by a reactor plant site to develop a core design for their plant by using the example method and system of the present invention.

The application server 200 provides a centralized location for users to access an application. Essentially, each user application session may be running on the server but displayed locally to the user access device (e.g., PC) allowing the user to interact with the application. However, this means of deployment is provided as an exemplary embodiment, and does not limit a given user from running the application locally on their access device. The application is responsible for directing all calculations and accessing of data in order to calculate objective function values, and for the creation of suitable graphical representations of various features of a core design that a user may desire to review. The graphical information is communicated over the 128-bit SSL connection 375 or LAN 275, to be displayed on a suitable display device of the user.

Figure 2:
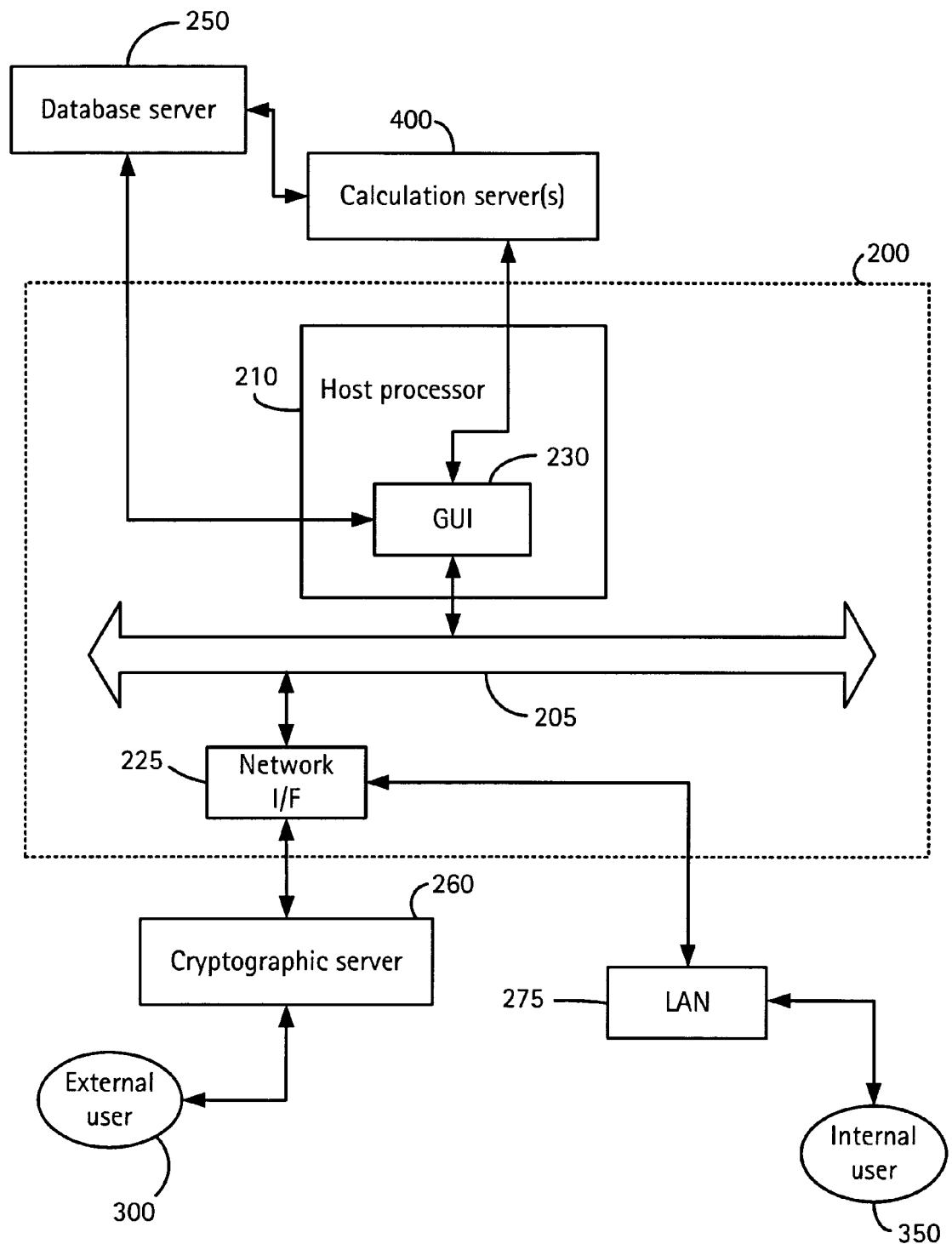
FIG. 2 illustrates an application server of the arrangement shown in FIG. 1.

FIG. 2 illustrates an application server 200 associated with the system of FIG. 1. Referring to FIG. 2, application server 200 utilizes a bus 205 to connect various components and to provide a pathway for data received from the users. Bus 205 may be implemented with conventional bus architectures such as peripheral components interconnect (PCI) bus that is standard in many computer architectures. Alternative bus architectures such as VMEBUS, NUBUS, address data bus, RDRAM, DDR (double data rate) bus, etc. could of course be utilized to implement bus 205. Users communicate information to application server 200 over a suitable connection (LAN 275 and/or via network interface 225) to communicate with application server 200.

Application server 200 may also include a host processor 210, which may be constructed with conventional microprocessors such as currently available PENTIUM processors. Host processor 210 represents a central nexus from which all real time and non-real functions in application server 200 are performed, such as graphical-user interface (GUI) and browser functions, directing security functions, directing calculations such as calculation of the objective functions for various limits, etc., for display and review by the user. Accordingly, host processor 210 may include a GUI 230 which may be accessed through the use of a browser. Browsers are software devices which present an interface to, and interact with, users of the system 1000. In the example embodiment, a browser in conjunction with a Citrix ICA client (part of the commercially available Citrix MetaFrame Access Suite software) may be responsible for formatting and displaying the GUI 230.

Browsers are typically controlled and commanded by the standard hypertext mark-up language (HTML). However, the application being presented or "served" to the user which allows the user to control decisions about calculations, displayed data, etc. may be implemented using C#, Java or Visual Fortran or any combination thereof. In addition, other well-known high-level languages maybe incorporated in the applications implementation (e.g., C, C++, etc.). All of these languages may be customized or adapted for the specific details of a given application or implementation, and images may be displayed in the browser using well known JPG, GIF, TIFF and other standardized compression schemes, other non-standardized languages and compression schemes may be used for the GUI 230, such as XML, ASP.NET, "homebrew" languages or other known non-standardized languages and schemes. Application server 200 through Network I/F 225 may be operatively connected to a cryptographic server 260. Accordingly, application server 200 implements all security functions by using the cryptographic server 260, so as to establish a firewall to protect the system 1000 from outside security breaches. Further, cryptographic server 260 secures external access to all personal information of registered users.

Application server 200 may be also operatively connected to a plurality of calculation servers 400. The calculation servers 400 may perform some or all the calculations required to process user entered data, direct simulation of a core design, calculate values for comparison as to be described in further detail below, and to provide results which may be displayed via, the GUI 230, and presented by the application server 200.

The calculation servers 400 may be embodied as WINDOWS 2000 servers, for example, although other hardware (e.g., Alpha, IA-64) and platforms (e.g., Linux, Unix) are possible. More particularly, the calculation servers 400 may be configured to perform a multitude of complex computations which may include, but are not limited to, configuring the objective function and computing objective function values, executing a 3D simulator program to simulate reactor core operation on a particular core design to be evaluated, and to generate outputs from the simulation, providing results data for access by and display to a user via GUI 230, and iterating an optimization routine as to be described in further detail below.

Figure 3:
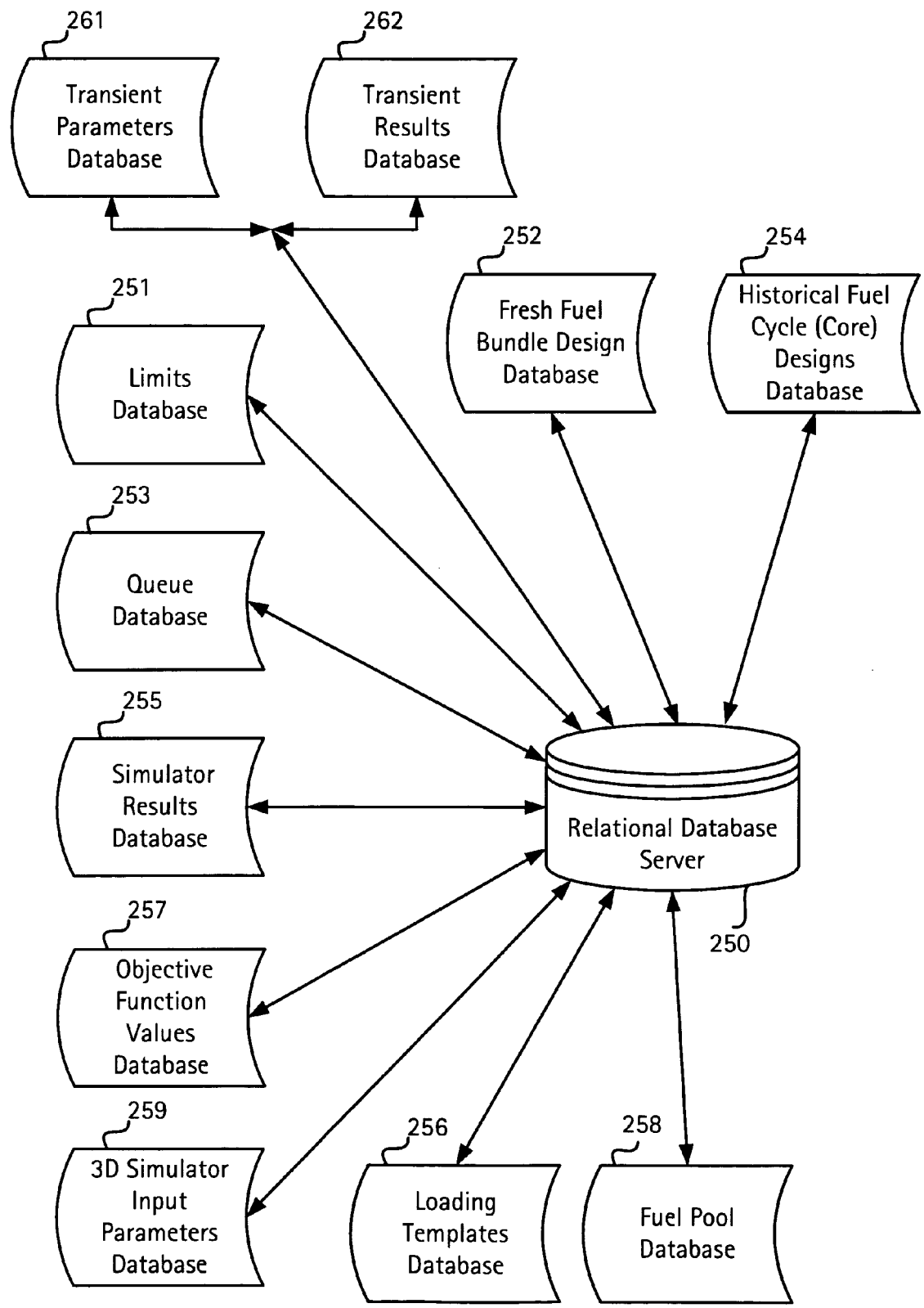
FIG. 3 illustrates the memory shown in FIG. 1 in more detail as a relational database with subordinate databases, in accordance with an example embodiment of the invention.

FIG. 3 illustrates an exemplary database server 250 in accordance with an exemplary embodiment of the invention. Memory or database server 250 may be a relational database such as an Oracle relational database. Relational database server 250 may contain a number of subordinate databases that handle all the necessary data and results in order to implement the method of the present invention. For example, relational database server 250 includes a plurality of storage areas which contain subordinate databases such as limits database 251, which is a database that stores all the user input limits and/or design constraints for all core designs that are evaluated for a particular nuclear reactor. There also is a fresh fuel bundle design database 252 which may include a palette or plurality of different fresh fuel bundle designs that have been previously created, modeled and stored therein.

Additionally, relational database server 250 includes a queue database 253, which stores parameters for a core design that are to be simulated in the 3D simulator and which stores parameters for running transient codes using simulator results from the simulation, and a historical core design database 254, which includes historical reactor core loading pattern designs that may be selected in generating a reference core design that is most consistent with defined user-input limits. Further, relational database 250 includes a loading templates database 256, which may store a plurality of different loading templates for fresh and/or exposed fuel bundles, and a fuel pool database 258 which may store a plurality of different exposed and/or fresh fuel bundle metrics for each of a plurality of different exposed and/or fresh fuel bundles, for example.

Simulator results may be stored in simulator results database 255. The simulator results database 255 (and limits database 251) are accessed by the calculation servers 400 in order to calculate a number of objective function values that are applicable to a particular core design. The objective function values are ranked for a particular core design (due to modification of one or more of the rod (control blade) pattern, core loading pattern and/or N unique fresh fuel bundle types to be used in the eventual acceptable core design) that has been inserted into a virtual core to be simulated, so as to determine whether or not the given design meets certain user-input limits or constraints, for example. These objective function values may be stored in an objective function values database 257 within relational database server 250.

A 3D simulator input parameters database 259 may also be included within relational database server 250. Database 259 may include the positions of control blades and reactor operating parameters for all exposure steps. As the calculation servers 400 are operatively connected to, and may communicate with, relational database server 250, each of the subordinate databases described in FIG. 3 may be accessible by one or more calculation servers 400.

Relational database 250 further includes a transient parameters database 261 and a transient results database 262. The transient parameters database 261 stores a plurality of transient licensing constraints that are included in the above input limits prior to simulation of a core loaded in accordance with a test core design, and also stores transient restart files used in running transient licensing codes to generate transient licensing results The eventual accepted core design satisfies these transient licensing constraints in addition to the limits. The transient results database 262 stores the transient licensing results from running the transient licensing codes. These results are used to modify objective function limit definitions for an objective function that is used to quantify the test core design's adherence to the input limits.

Figure 4:
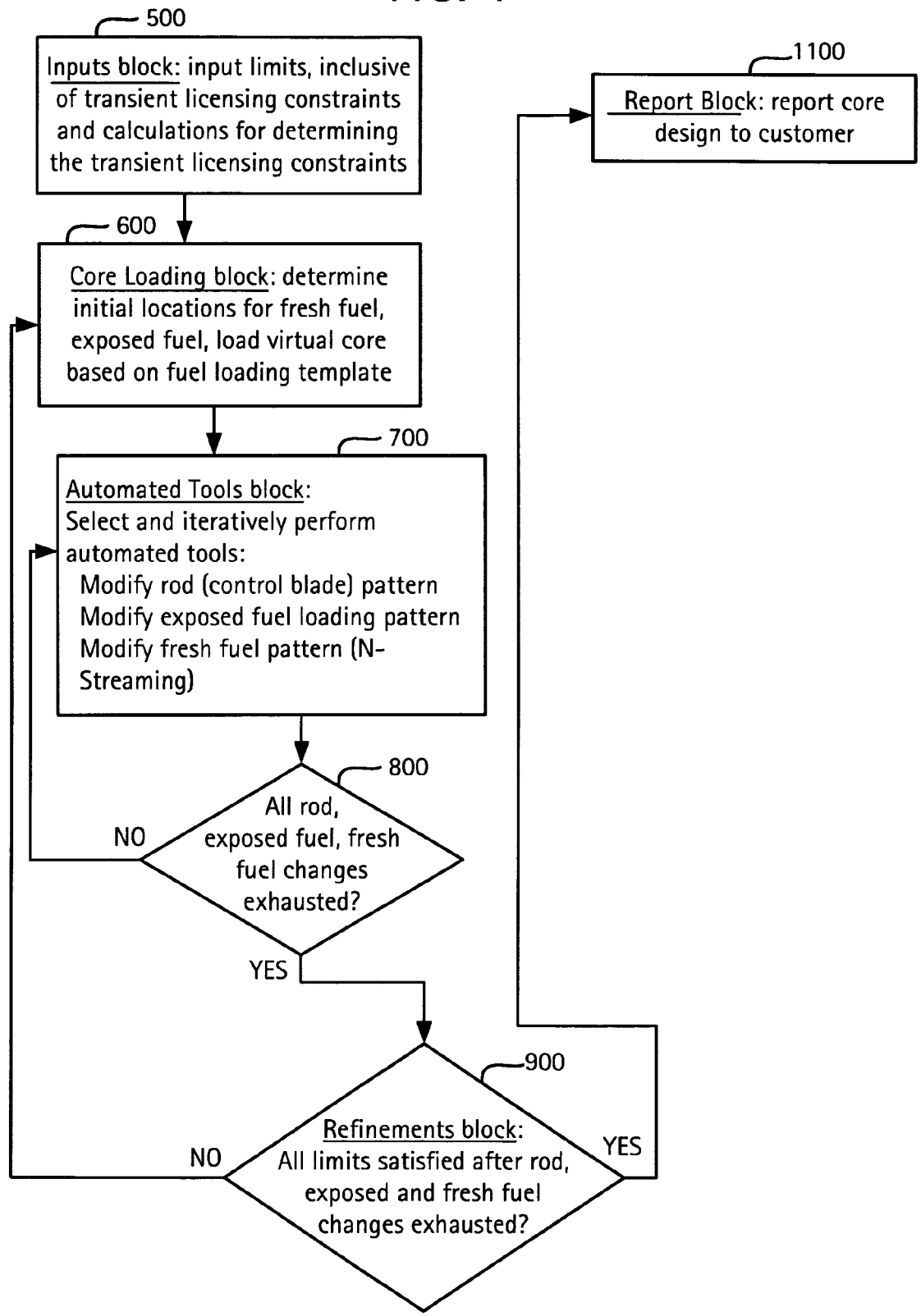
FIG. 4 is a process flow diagram for illustrating a computer-implemented method of designing a nuclear reactor core for power operations in accordance with an example embodiment of the invention.

FIG. 4 is a process flow diagram for illustrating a computer-implemented method of designing a nuclear reactor core for power operations in accordance with an example embodiment of the invention. Referring to FIG. 4, each of the blocks 500 through 1100 describe processing functions of an example method of designing a nuclear reactor core, beginning with an inputs block 500. A given block may represent a number of functions and/or software-driven processes performed by system 1000, such as directly from input by the user via GUI 230, automatically by the host processor 210 and/or calculation servers 400, and/or under control of the host processor 210 in the application server 200 based on commands or selections made by the user.

The functions performed at inputs block 500 enable a set of constraints (referred to herein also as "limits") that need to be satisfied for power operations to be inputted into the evaluation for determining an acceptable core design. These steady-state limits can be applicable to variables that are to be input for performing a simulation of the test core design, and can include limits applicable only to the results of the simulation. For example, the input steady-state limits include client-inputted reactor plant specific constraints and core performance criteria. These input limits also include limits applicable to the simulation results, such as one or more of operational parameter limits used for reactor operation, core safety or thermal limits, margins to these to these operational and safety limits. These and the other client-inputted reactor plant specific constraints are stored in limits database 251.

In addition to the above limits, transient licensing constraints (or "transient limits") are determined and input as part of the limits in limits database 251. Thus, the limits database 251 includes both steady-state and transient limits. The transient licensing constraints are specific to the plant being evaluated and must be satisfied for operating the given plant. The limits also include definitions for the various licensing calculations that are performed by the calculation servers 400 to determine the transient licensing constraints to be satisfied. Plant or core-specific transient licensing calculations are defined or determined from data stored in the licensing parameters database 261. Each reactor plant has its own unique set of reload licensing calculations that need to be run so that the reactor plant may be licensed by the U.S. Nuclear Regulatory Commission (USNRC) for power operation, as well as cycle specific inputs to these calculations. Although the USNRC is described as the regulator, similar licensing constraints would need to be satisfied for foreign regulators.

The following represent example transient licensing constraints, the licensing/transient calculation(s) required for transient licensing constraint determination, and the computer codes. Transient licensing constraints are applicable to both reload licensing as well as initial core and plant operating domain changes. These licensing constraints and codes are known in the art, thus a detailed explanation is omitted for purposes of brevity.

One of the most important limitations in nuclear reactor core design and operation is the critical power ratio (CPR), which is a measure of the margin to dryout conditions during reactor operation. Well-known CPR transient licensing limits and calculations include: (i) Anticipated Operational Occurrence (AOO) transients calculated by well-known GE transient analysis codes such as ODYN/TASC or TRACG, (ii) mis-loaded fuel bundles calculated by well-known GE 3D simulation code packages such as TGBLA or PANAC or other code packages such as LOGOS; (iii) rod withdrawal error calculated by PANAC; and (iv) stability for plants using detect and suppress methodology and calculated by TRACG or using an exclusion region methodology as calculated by the GE code ODYSY. Although certain GE codes are described herein for example purposes only, it should be obvious to one of skill in the art to use known code packages other than GE code packages which perform the same or similar function.

Linear Heat Generation Rate (LHGR) is a measure of the heat generation rate of a fuel rod in a fuel assembly at any axial location. Licensing constraints on the LHGR are specified to ensure that fuel thermal-mechanical design limits are not exceeded anywhere in the core during normal operation. Additionally, the LHGR limits provide assurance the fuel peak cladding temperature (PCT) during a Loss of Coolant Accident (LOCA) will not exceed the NRC requirements set by federal regulations and/or federal statute. Example LHGR transient licensing limits and licensing calculations include (i) Thermal and/or mechanical design limits calculated by the GE fuel rod thermal-mechanical performance codes GESTR/PRIME, which could include a family of optional LHGR limit curves for each fuel type; and (ii) MAPLHGR limits set by Loss of Coolant Accident (LOCA) licensing as calculated by the GE LOCA codes SAFER/CORCL or TRACG.

Additional transient licensing constraints include plastic strain and fuel centerline melt limits, which are established through use of GESTR/PRIME. These limits are evaluated directly for AOO by TRACG, which includes a variant of GESTR/PRIME as part of the solution method. Alternatively, generic analysis has shown that the strain and centerline melt limits will be met if mechanical overpower (MOPS) and thermal overpower (TOPS) heat flux limits are met, respectively. The codes ODYN/TASC are employed to determine MOPS and TOPS limits for AOO. PCT and Oxidation transients/licensing limits and calculations include LOCA transients calculated by the GE severe accident code SAFER/CORCL or TRACG. Enthalpy limits can be calculated for rod drop accidents and evaluated by TASC, PANAC or TRACG.

Additional example transient licensing limits and calculations exist for overpressure and temperature limits related to an ATWS event. An anticipated transient without scram (ATWS) event is recognized as one of the boiling water reactor (BWR) accident sequences potentially leading to core damage. ATWS event overpressure limits and PCT limits from an ATWS event can be evaluated and determined using ODYN/TASC or TRACG codes. Wetwell pool temperature licensing limits include energy to pool evaluated by ODYN/TASC/STEMP codes or TRACG codes. Additionally, Reactor Internal Pressure Difference (RIPD) is evaluated and calculated using the GE LAMB code or TRACG.

The steady-state and transient licensing codes reside on the computer network and are executed as per instructions contained in procedural files stored in transient parameters database 261. The procedural files describe the specific transient licensing codes and order of execution for simulation cases that produce, as their output, results that form the basis of the transient licensing constraints. These transient licensing code outputs as well as transient licensing constraints can also be stored in database 261.

In one example, and in addition to the above licensing constraints being part of the input limits, if a core design is being evaluated for uprated power operations (i.e., reactor core operation above 100% of its original-licensed power level), the limits may further include an uprate power limits flow window which sets higher reactor power, power density and mass flow rate limits than what is rated for the plant being evaluated. These limits also may be stored in limits database 251.

Core loading block 600 generates a test reactor core design based on the limits (constraints) input at block 500. As will be seen in more detail below, the functions performed by system 1000 as indicated in the core loading block 600 include determining the number of fresh fuel bundles to be used in the test core design, selecting a desired fuel loading template from the loading templates database 256, and populating the selected template with fresh fuel bundles for loading and exposed fuel for reloading so as to arrive at a 'virtual nuclear reactor core' that is loaded in accordance with the core loading block 600.

Automated tools block 700 includes processing functionality to enable the user 300 to select and iteratively run one or more automated tools on the initial test core design generated in block 600. These automated tools include a modify rod (control blade) pattern tool, a modify core loading pattern tool, and a unique fresh fuel bundle type design tool (also known as an "N-streaming") tool. Each of the rod pattern, core loading pattern and unique fresh fuel bundle type design tools may be iterated sequentially and/or together by the user and may provide feedback to one or both of the other tools, until all rod (control blade), exposed fuel and/or fresh fuel changes have been exhausted in the test core design and/or a given "candidate" or "derivative" modified test core design satisfies each of the limits, inclusive of the transient licensing constraints set for power operations.

For each automated tool, operation or iteration of the selected automated tool to evaluate the test core design against the input limits or constraints includes, at a minimum, performing a simulation of reactor operation with the test core design, based on the constraints, in order to produce a plurality of simulation results (also referred to as "outputs"). The simulation outputs are stored and then used in running various transient licensing codes to generate a plurality of transient licensing results.

The transient licensing results from running the transient licensing codes are used to modify constraint limit definitions to be used in an objective function that quantifies the test core design's adherence to the limits. As to be described in further detail below, the objective function has three components, one of which includes a parameter representing constraint limit definitions for a particular constraint parameter (e.g., specific design constraint limit definitions for reactor plant parameters). This is represented in the calculation as "CONS".

The transient licensing results may be used to modify CONS or design constraint limit definitions used in the objective function calculation. These transient licensing results are used to modify or replace user-defined input limits defined in limits database 251 that represent steady-state, monitored values. In addition, the transient licensing results allow evaluation of transient-specific constraint values, such as cladding plastic strain and centerline melt temperature, which may be utilized in conjunction with transient design limits obtained from limits database 251 to formulate additional objective function "CONS" terms. In this manner, both steady-state and transient licensing limits are captured within the context of the objective function.

The objective function, with its constraint limit definitions modified based on the transient licensing results from running the transient codes, is used to calculate a plurality of objective functions values. These objective function calculations, which provide objective functions values, are stored in objective function value database 257. Inputs to the objective function calculation include the steady-state and transient limits from the limits database 251 and the simulator results (outputs) from the simulator results database 255, as well as the subset of steady-state constraint limit definitions from limits database 251 for the objective function that have been modified based on the transient licensing results.

An example of steady-state constraint limit definitions from limits database 251 that are subject to modification based on the results of transient licensing calculations are the thermal limits for MFLPCR, MFLPD, and MAPLHGR. As discussed above, the limits database 251 includes both steady-state and transient limits. The transient code results 1) modify existing user-input steady-state limits from database 251 and 2) produce values which are used in conjunction with transient-specific limits, such as plastic strain or centerline melt, to create additional objective function "CONS" terms.

Each of the objective function values calculated by the objective function (with its constraint limit definitions having been modified based on the transient licensing results from running the transient codes) are then evaluated to determine which of the simulation outputs, if any, violate a limit. If the evaluating step indicates that all limits have been satisfied, or all limits are within a margin that is acceptable to the user, data related to an acceptable core design is output for display to the user for review.

Additionally, if the design does not satisfy the limits, data is displayed to the user (i.e., user 300) which indicates those limits violated by the test core design during the simulation. In this case, one or more procedural recommendations for modifying the test core design (so as to create a derivative core design) may be displayed to the user. Although the individual modifications may be left to the desires of the user, these procedural recommendations may be provided in the form of a pull down menu, for example, and may divided into categories such as energy beneficial moves, energy detrimental moves, and converting excessive margin (to thermal limits) into additional energy. One technique may be to address problems with meeting limits using energy beneficial moves rather than energy detrimental moves. Even if the core design meets all of the limits (client-inputted plant specific constraints, design limits, thermal limits, etc.) inclusive of the transient licensing constraints, the user may want to verify that any excessive margin to a particular limit could be converted into additional energy.

One, some or all of the automated tools can be implemented and iteratively repeated until a given derivative core design is determined which meets the limits for power operations inclusive of satisfying the transient licensing constraints. A given derivative core design may also be determined acceptable if the user determines that any limits violated are within a margin to that limit that is acceptable to the user for the reactor plant being evaluated.

Each automated tool thus utilizes an objective function to determine how closely a simulated test core design meets the limits or constraints. As previously discussed, the objective function is a mathematical equation that incorporates the constraints or limits and quantifies the test core design's adherence to the limits. The GUI 230 presents a graphic illustration of which outputs violate which constraints, as determined by the objective function. Via the GUI 230, the user may then modify the test core design, to create what is also known herein as a modified or the aforementioned 'derivative' reactor core design. This may constitute a change in rod pattern design including control blade placement, exposed fuel placement, fresh fuel bundle placement, etc., and repeating core simulation to evaluate if there is any performance improvement in a given derivative test core design.

In an example, and based on which particular limits (inclusive of the transient licensing constraints) were violated by a particular derivative core design, a specific automated tool may be selected by the user for a subsequent iteration. The modifying of the control blade (rod) or fuel (fresh/exposed) fuel placement, the simulation and objective function evaluation functions may be iteratively repeated within a given automated tool process until a given derivative core design satisfies the limits set for the plant of interest.

Data related to the acceptable reactor core design may then be reported to the user at block 1100. In an example, the host processor 210 of the application server 200 directs data via the GUI 230 for display to the user. This data is related to a core design that satisfies all limits and transient licensing constraints for power operations. The user may be presented a number of graphical views for display as to be described in further detail below. In an example, this data may be presented in graphical format via GUI 230 to illustrate to a user how to load and run the selected reactor plant so as to satisfy the limits (inclusive of the transient licensing constraints) during core operation. Accordingly, the core of the plant being evaluated can then be loaded at a next outage in accordance with the design.

Referring again to FIG. 4, after all rod (control blade), exposed fuel and fresh fuel changes have been exhausted (output of 800 in FIG. 4 is 'YES'), if all the limits have been satisfied (output of Refinements block 900 is 'YES'), no further refinements need to be made to the selected exposed fuel or fresh fuel bundles the user has chosen for the test core design; this design is then reported at report block 1100 to the customer, by way of a plurality of displays via GUI 230 for interpretation by the user.

However, if after all rod (control blade), exposed fuel and fresh fuel bundle changes have been exhausted and one or more limits from block 500 are still not satisfied, the user may be directed back to checking whether or not all exposed fuel bundles in the inventory have been used and if not, which returns the processing back to functions performed in core loading block 600, with a recommendation to modify the exposed fuel selection in the loading template. If all exposed fuel bundles from the inventory have been used and one or more limits from block 500 are still not satisfied, the user may be directed back to the processes in core loading block 600 with a recommendation to modify the fuel loading template in order to change the locations in the template for insertion of fresh fuel bundles. Once these changes have been made, a modified or derivative core design may be re-evaluated using one, some or all of the automated tools of block 700 until all limits have been satisfied and/or are within an acceptable margin thereto.

Of note, the processing described in blocks 700 and 900 may be done using one or more optimization techniques to optimize certain parameters such as rod (control blade) positions, exposed and fresh fuel bundle positions or placement, core flow, and/or where to make sequence changes, so that the iterative simulation, evaluation, modification of core design including the possibility of making additional fresh and exposed fuel locations changes in the loading template may be done automatically.

An overview of the example methodologies having been described, various processes within the blocks in FIG. 4 are now described in more detail.

Inputs Block 500

Initially, the designer or user selects a reactor plant for evaluation from a suitable drop down menu of plants and defines a set of limits or constraints to be satisfied by the selected plant for power operations. In other words, limits inclusive of the transient licensing constraints are defined which are to be satisfied in determining a reactor core design to be used in the selected plant being evaluated for power operations.

These limits may be related to key aspects of the design of the particular reactor being evaluated for power operations and design constraints of that reactor. The limits may be applicable to variables that are to be input for performing a simulation of a test reactor core design that is to be generated, and/or may include limits or constraints applicable only to the results of the simulation. For example, the input limits may be related to client-inputted reactor plant specific constraints and core performance criteria for power operations. Limits applicable to the simulation results may be related to one or more of operational parameter limits used for reactor operation, core safety limits, margins to these to these operational and safety limits and the other client-inputted reactor plant specific constraints. Additionally inclusive in these input limits include the definitions for the licensing calculations noted above that are run to generate the transient licensing constraints that also need to be satisfied for NRC licensing of the core.

FIG. 5 is a screen shot to illustrate example client-inputted plant specific constraints. These may be understood as limits or constraints on input variables to a simulation and limits or constraints on the simulation results. Referring to FIG. 5, there is listed a plurality of client-inputted plant specific constraints as indicated generally by the arrow 505. For each constraint, it is possible to assign a design value limit, as indicated by column 510. Although not shown in FIG. 5, the limits or constraints could also include margins to thermal limits and an uprate power limits flow window which sets higher reactor power, power density and mass flow rate limits for the plant being evaluated, if the plant is being designed for uprated power operations.

Core Loading Block 600

The process of selecting a fuel loading template, selecting the fresh fuel for loading and selecting the exposed fuel to reload is described in detail in co-pending and commonly assigned U.S. patent application Ser. No. 10/678,170 to David J. Kropaczek et al., filed Oct. 6, 2003 and entitled "Method and Apparatus for Facilitating Recovery of Nuclear Fuel from a Fuel Pool". The relevant portions describing these processes as described below in FIGS. 7-10 are incorporated in their entirety herein. However, prior to selecting the fuel loading template, a fresh fuel bundle count is determined for the initial test reactor core design.

Figure 6:
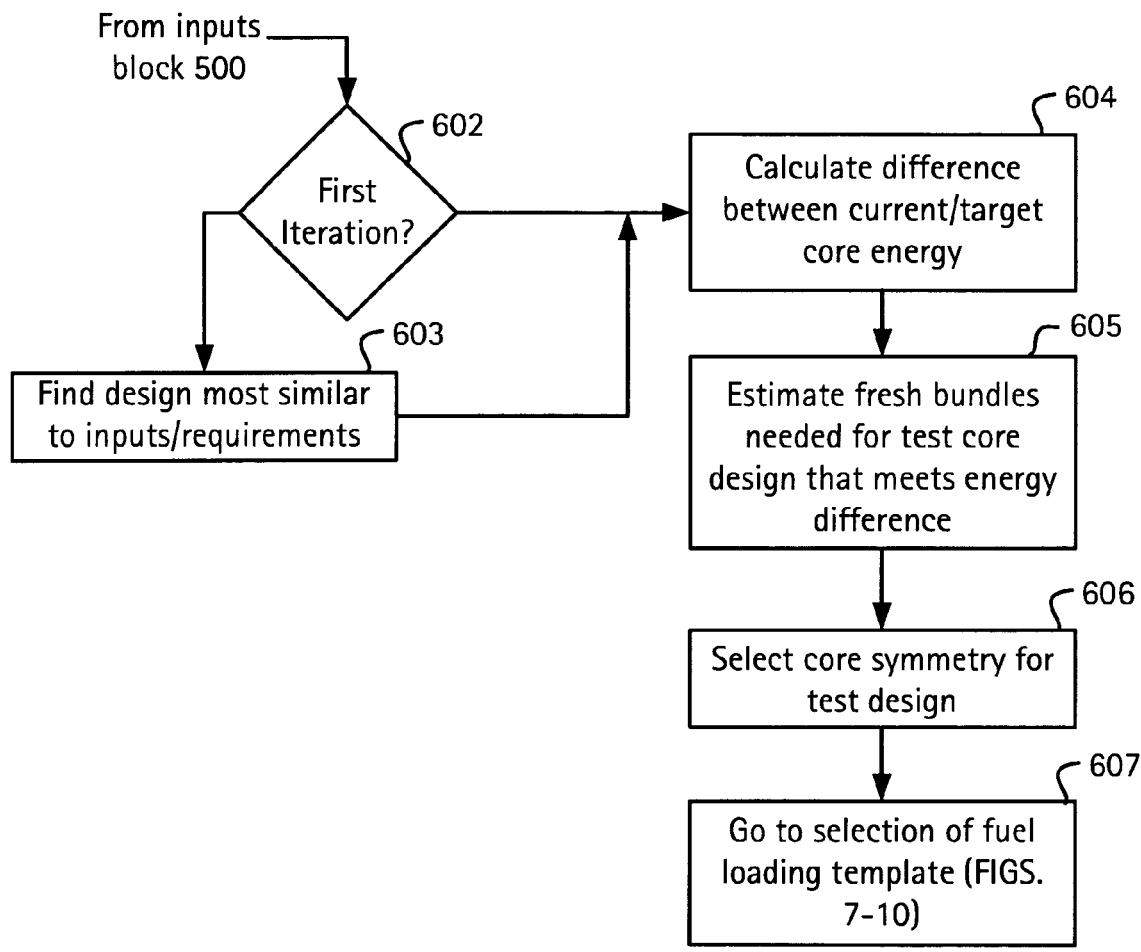
FIG. 6 is a flowchart describing the determination of a fresh fuel bundle count for the initial test reactor core design in accordance with an exemplary embodiment of the invention.

FIG. 6 is a flowchart describing the determination of a fresh fuel bundle count for the initial test reactor core design in accordance with an exemplary embodiment of the invention. The selection of a fresh fuel bundle count is done prior to the selection of the fuel loading template so as to provide the inventory of fresh fuel bundles to be used in designing a reactor core design for power operations. Initially, a check is performed (602) to establish whether prior iterations on a test fresh fuel loading pattern have occurred. If this is a first iteration, e.g., no previous test fresh fuel loading pattern has been analyzed, information on past cycles or similar plants may be used to provide a basis for an initial test fresh fuel loading pattern (603). For example, an initial test fresh fuel loading pattern may be selected from a core loading pattern design used for a similar core in a previous simulation, selected based on a core loading pattern design from a reactor that is similar to the reactor being evaluated, and/or from an actual core loading pattern design used in an earlier core energy cycle in the reactor plant being evaluated, for example. These designs may be accessed from the historical fuel cycle designs database 254, for example.

If past iterations have been performed (the output of 602 is "NO") the total energy content of the core, using an established core loading pattern that conforms to the input limits, may be calculated, and a difference from a desired/required energy content may be defined (604). This may also be done using a fresh fuel loading pattern from 603, also accounting for the inputted limits, if this is the first iteration. This energy "delta" is the difference in the required energy for the next, future cycle as compared to the most recent End-of-Cycle (EOC). For additional iterations, the delta may be reduced as the difference between the actual energy and desired energy is reduced. Furthermore, negative delta energies imply that the resulting energy is greater than the desired energy and is desirable.

The difference in energy should be supplied by the fresh fuel assemblies, which would also be part of the fresh fuel loading pattern for loading the core of the reactor, to be loaded at a next scheduled outage, for example. Typical rules of thumb exist that can help select the number of additional bundles needed (or number of bundles that must be removed) in order to obtain the desired target energy. For example, in a BWR reactor with 764 bundles, it is commonly believed that four (4) bundles are worth approximately 100 MWD/st of cycle length. Therefore, if the resulting energy is over 100 MWD/st longer than the desired energy, four fresh bundles could be removed. Similarly, if the resulting energy more than 100 MWD/st shorter than the desired energy, four additional fresh bundles should be added.

The user should select (605) the number of fresh fuel bundles needed to make up for the energy difference. This may be done by accessing a "palette" of previously modeled and stored fresh fuel bundle designs from fresh fuel bundle design database 252, or the user may create specific fresh fuel bundles from a database of bundle types, for example.

After the number or count of fresh bundles to be used in the test core design is determined, core loading symmetry is identified (606). Some plants may require quadrant loading symmetry or half-core loading symmetry, for example. GUI 230 may be used to access a plant configuration webpage, which may enable the user to select a "model size", e.g., quarter core, half core, or full core, for evaluation in a subsequent simulation. Additionally, a user may select a core symmetry option (e.g., octant, quadrant, no symmetry) for the selected model size, by clicking on a suitable drop down menu and the like.

By selecting "octant symmetry", the user can model the reactor assuming that all eight (8) octants (where an octant is a group of fuel bundles for example) are similar to the modeled octant. Consequently, simulator time may be generally decreased by a factor of eight. Similarly, by selecting "quadrant symmetry", the user can model the reactor assuming each of the four (4) quadrants is similar to the modeled quadrant. Hence, the simulator time may be generally decreased by a factor of four. If asymmetries in bundle properties prevent octant or quadrant symmetry, the user can also specify no symmetry.

Figure 7:
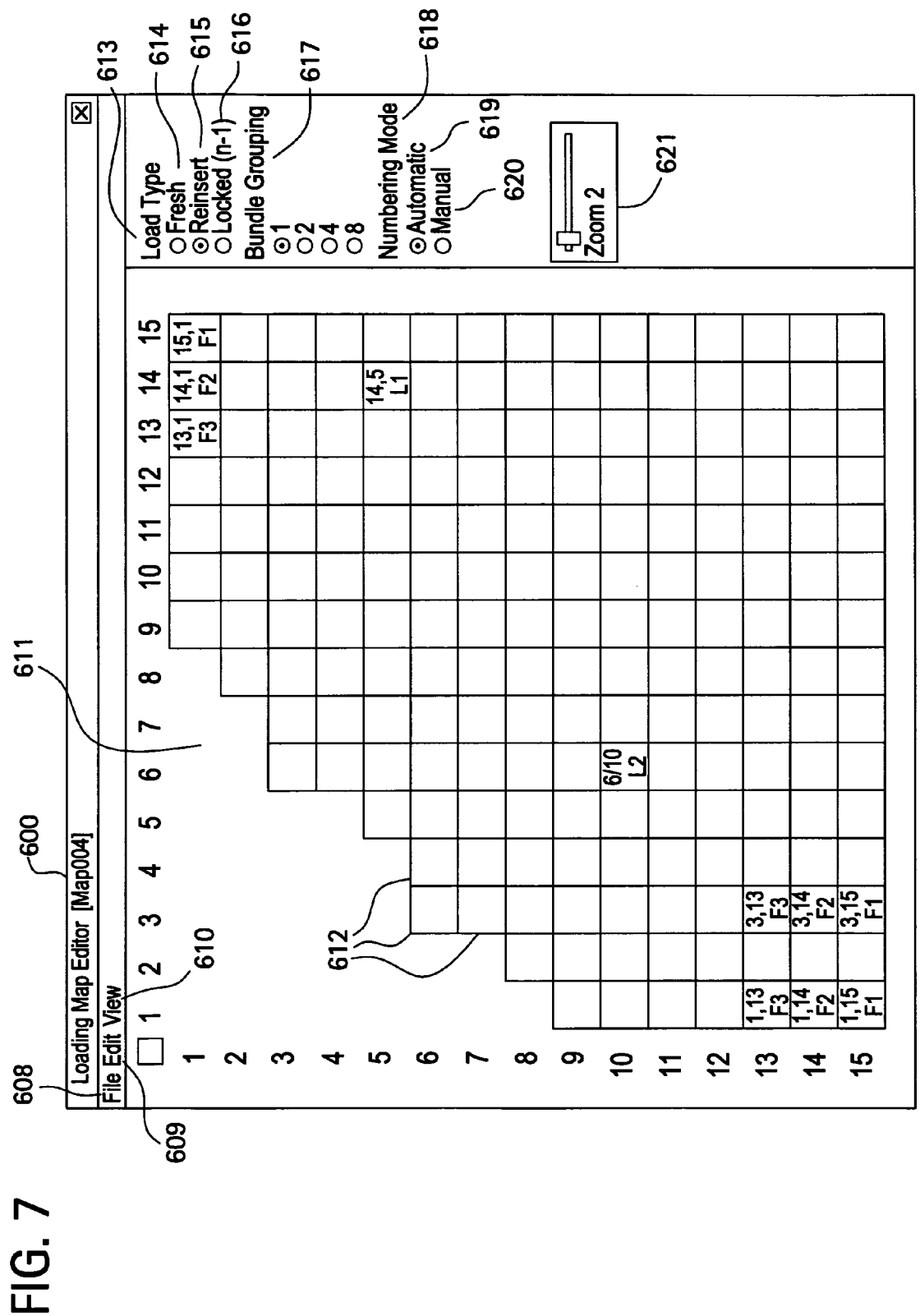
FIG. 7 illustrates a quarter-core screen shot of a partially completed loading template using a loading map editor 601 of the present invention.

Once the fresh fuel bundle count and symmetry is determined, the user may access a desired fuel loading template 607 from the loading templates database 256. FIG. 7 illustrates a quarter-core screen shot of a partially completed loading template using a loading map editor 601 of the present invention.

When the loading map editor is initially run, the user has the option via a file menu 608 to access a previously created template (from loading templates database 256) or to begin a new template. In an example, the loading map editor 601 requests the user to identify the reactor for which the template is being created. The loading map editor 601 retrieves the geometry of the identified nuclear reactor from the relational database 250 (such as loading templates database 256, and displays fuel bundle field 611 of the appropriate size based on the retrieved plant characteristics with the rows and columns numbered (such as with the fuel bundle position Row 6, Column 3 in FIG. 7).

Within the fuel bundle field 611, the user may then, for example, using a suitable input device (i.e., mouse, touch pad, etc.) via his computer, GUI 230 and application processor 200 to click on the fuel bundle positions 612 in the array of possible fuel bundle positions to identify the type (fresh, reinsert (exposed fuel), or locked) and grouping of the actual fuel bundle in that position. As shown on the right side of FIG. 7, the loading map editor 601 provides several tools for performing this assignment task, including Load Type 613, Bundle Grouping 617 and Numbering Mode 618 tools.

Under the Load Type 613 tool, the loading map editor 601 includes a Fresh button 614, a Reinsert button 615 and a Locked button 616. The Fresh, Reinsert and Locked buttons 614, 615 and 616 correspond to fresh, reinsert and locked fuel bundle categories. The user, for example, clicks on the desired button to choose the desired category and then clicks on the fuel bundle position 612 in the fuel bundle field 611 to assign that category to the fuel bundle position 612. The fresh fuel bundle category indicates to insert fresh fuel bundles, i.e., bundles that have not been exposed. The loading map editor then displays "F" and a number "N" at the bottom of the fuel bundle position 612. The "F" indicates the fresh fuel bundle category, and the number "N" indicates the Nth fresh bundle type 612. The loading map editor 601 maintains a count of the number of fuel bundle types assigned to the core. Multiple bundle positions can be assigned the same bundle type by specifying the same "F" and "N" value for each position.

The locked fuel bundle category indicates that a fuel bundle currently occupying an associated fuel bundle position in an actual nuclear reactor core is to remain in that position in creating a nuclear reactor core loading map. The loading map editor 601 displays "L" and a number "N" in the fuel bundle position 612 when the locked fuel bundle category is assigned. The "L" indicates the locked fuel bundle category, and the number "N" indicates the Nth locked bundle group.

The reinsert fuel bundle category indicates where to insert an exposed fuel bundle. The loading map editor displays only a number "N" in the fuel bundle position 612 when the reinsert fuel bundle category is assigned. The number indicates a priority of the fuel bundle position 612.

In an example, the loading map editor may display the fuel bundle positions 612 in a color associated with the assigned category. For example, fresh bundles are displayed in blue, locked are displayed in yellow, and reinserted exposed fuel bundles are displayed in violet.

Under the Bundle Grouping 617 heading, the loading map editor includes symmetry buttons "1", "2, "4" and "8". As noted above in FIG. 6, the user may have already selected a desired core symmetry option (e.g., octant, quadrant, no symmetry, etc.) for the selected reactor, by clicking on a suitable drop down menu and the like. However, the bundle grouping tool 617 allows the user to select the symmetry for given bundle positions 612, i.e., on a fuel bundle position 612 basis.

The Numbering Mode tool 618 includes an Automatic button 619 and a Manual button 620. Choosing between an automatic numbering and a manual numbering is only permitted when the Reinsert button 615 or Fresh button 616 has been selected, and is generally inapplicable if the Locked button 616 is selected.

With the Automatic button 619 selected, the loading map editor 601 maintains a count of exposed fuel bundles and assigns the count plus one to the next fuel bundle position 612 assigned the reinsert fuel bundle category. The assigned number is displayed at the bottom of the fuel bundle position 612. The loading map editor 601 maintains a count of the fresh bundle types as well; thus when a fuel bundle position 612 is assigned a fresh bundle category count plus one, referred to above as N, is assigned to that position. "F" and the value of N are displayed at the bottom of the fresh fuel bundle position.

When the Manual button 620 is selected, the loading map editor maintains the count of the number of fuel bundle positions 612 assigned the reinsert fuel bundle category, but does not assign numbers to the fuel bundle positions 612. Instead, the user may position a cursor in the fuel bundle position 612 and enter the number manually.

The assigned numbers in each bundle position 612 represent assigned priorities indicating an order for loading exposed fuel bundles based on an attribute of the exposed fuel bundles. The attributes include, but are not limited to, K infinity (which is a well-known measure of the energy content of the fuel bundle, exposure of the bundle (which is accumulated mega-watt days per metric ton of uranium in the bundle), residence time of the bundle (which is how long the bundle has been resident in the nuclear reactor core), etc. In one exemplary embodiment, the shade of the color associated with the reinserted fuel bundle positions varies (lighter or darker) in association with the assigned priority.

The loading map editor 601 also provides several viewing options via a view menu 610 and a zoom slide button 621. Adjusting the zoom slide button 621 by clicking and dragging the zoom slide button 621 to the left and the right decreases and increases the size of the displayed fuel bundle field 611. Under the view menu 610, the user has the option to view a single quadrant of the template, or a full core view of the template. Additionally, the user can control whether certain template attributes are displayed. Specifically, the view menu 610 includes the options of displaying the following in the loading template: control blades, bundle coordinates, core coordinates, etc.

As discussed above, instead of creating a new template, a previously created template may be viewed and, optionally, edited using edit button 609. Using the file menu 608, the user selects an "open" option. The loading map editor 601 then displays the accessible templates stored in fuel loading templates database 256. The user then selects an accessible template, for example, by clicking on one of the accessible templates. The loading map editor 601 will then display the chosen template.

The user may then edit the selected template. For example, for a given selected template, the user may select the fresh fuel and exposed fuel bundles desired for the template in order to generate the test reactor core design. The loading map editor 601 thus allows the user the option of reloading both fresh and exposed fuel bundles currently residing in one or more fuel pools. One or more of these exposed fuel bundles residing in the available fuel pool inventory may be accessed by the user from fuel pool database 258, for example, and one or more of the fresh fuel bundles may be accessed from fresh fuel bundle design database 252.

After accessing, creating and/or editing a fuel loading template using the loading map editor 601 as discussed above, the user may then create a loading map using the template. From the file menu 608, the user chooses a "load" option. The loading map editor 601 then displays a loading screen that includes a template access window, template information window, reload window and a load fresh window. The template access window provides a user with a drop down menu for selecting a loading template stored in the loading templates database 256. The template information window displays summary information for the selected loading template, such as the number of fresh bundle types, the number of reinserted (exposed) fuel bundle positions and the number of locked bundle positions in the loading template. The summary information may also indicate the number of fresh bundle types and number of reinserted (exposed fuel) bundles currently added in creating the loading map.

Figure 8:
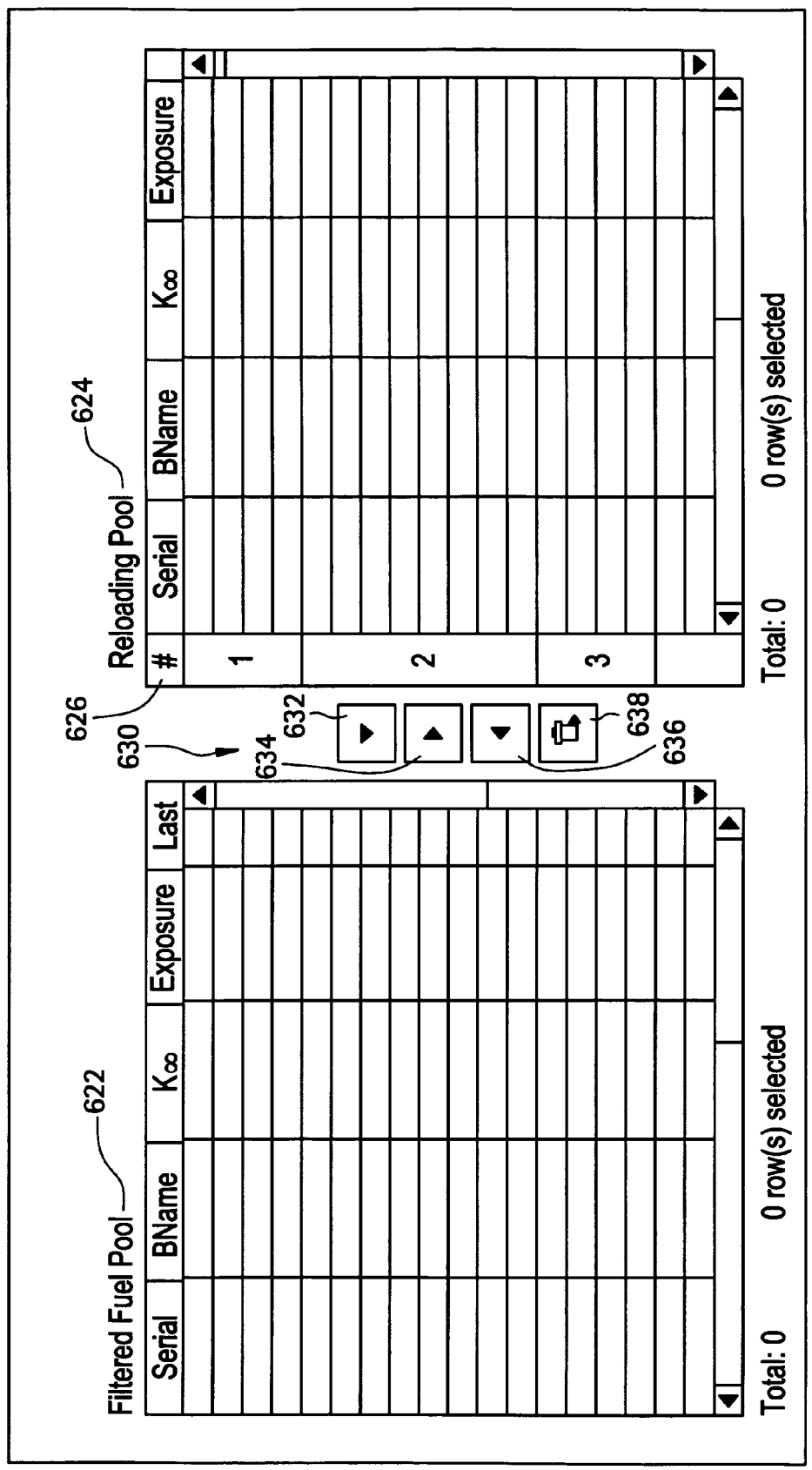
FIG. 8 is a screen shot to illustrate the reload window displayed by the loading map editor 601.

FIG. 8 is a screen shot to illustrate the reload window displayed by the loading map editor 601. The window is divided into a filtered fuel pool table 622 and a reloading pool table 624. The filtered fuel pool table 622 lists (1) the exposed fuel bundles currently in the fuel template of the nuclear reactor being evaluated, except for those fuel bundles in rocked fuel bundle positions 612, and (2) the fuel bundle inventory in one or more fuel pools for this and other nuclear reactors. As is well-known, exposed fuel bundles removed from a nuclear reactor are stored in what is known as a fuel pool. Fuel bundles from two or more nuclear reactor cores located at a same site may be stored in the same fuel pool.

The filtered fuel pool table 622 lists each exposed fuel bundle by its serial number and bundle name (BName). Each fuel bundle is assigned a unique serial number, used to assure traceability of the bundle from a quality assurance perspective. The bundle name is a character string identifier used to identify the fuel bundle product line as well as nuclear characteristics, such as uranium and gadolinia loading. The filtered fuel pool table 622 also lists one or more attributes of each exposed fuel bundle listed, such as K infinity, exposure, and the last fuel cycle number for which the bundle was resident in the core. Additional attributes for an exposed fuel bundle may include: 1) bundle product line, 2) initial uranium loading, 3) initial gadolinium loading, 4) number of axial zones, 5) historical fuel cycle numbers previous to the most recent for which the bundle was resident in the core, 6) the corresponding reactor in which the fuel bundle was resident for each of the historical fuel cycles, 7) accumulated residence time, and 8) fuel bundle pedigree, a parameter that reflects the usability of the bundle for continued reactor operation.

The fuel bundle pedigree is determined from a number of factors the foremost being an inspection of the fuel, either visually or by some other non-destructive test procedure, which is designed to detect a current failed fuel bundle or the vulnerability of the bundle to future failure. Failure mechanisms include such items as corrosion, debris impact, and mechanical bowing of the fuel bundle. Another factor affecting pedigree is possible reconstitution of a fuel bundle, which is a repair process involving the replacement of damaged fuel rods with replacement rods that may be a uranium containing fuel rod or alternatively, a non-uranium containing rod (e.g. stainless steel), henceforth referred to as a 'phantom' rod. A pedigree attribute might be 'RU' and 'RP' for reconstituted with uranium and phantom rods, respectively, and 'DC', 'DD' and 'DB' for damaged by corrosion, debris, and bow, respectively. A 'blank' pedigree attribute designates a bundle that was undamaged and useable.

The reloading fuel pool table 624 provides the same information for each fuel bundle as provided by the filtered fuel pool table 622. Additionally, the reloading fuel pool table 624 indicates the priority number 626 for each fuel bundle group as set forth in the loading template. FIG. 8 shows that the highest priority (1) reinserted fuel bundle position(s) are a group of four fuel bundles, and the next highest priority (2) reinserted fuel bundle(s) are a group of eight fuel bundles.

The reloading fuel pool table 624 is populated by moving fuel bundles from the filtered fuel pool table 622 into the reloading fuel pool table 624. The reload window further includes a set of tools 630 for aiding the user in selecting and moving fuel bundles from the filtered fuel pool table 622 to the reload fuel pool table 624. The set of tools 630 may include a filter tool 632, a move right tool 634, a move left tool 636 and a delete tool 638. Tools 634, 636 and 638 enable to user to move fuel bundles between the filtered fuel pool table 622 and reload fuel pool table 624, such as by highlighting one or more bundles to and then clicking on the move right tool 634 (or left tool 636), which causes the selected fuel bundles to populate the highest priority unpopulated fuel bundle positions in the reload fuel pool table 624 (or filtered fuel pool table 622). The delete tool 638 enables the user to select one or more fuel bundles in one of the tables 622, 624, and then to click the delete tool 638 to delete the selected fuel bundles from the table.

FIG. 9 is a screen shot illustrating the filter tool 632. A user clicks on the filter tool 632 to open a filter window 640 as shown in FIG. 9. The filter window lists the same attributes listed in the filtered fuel pool table 622, and allows the user to indicate to filter based on the attribute by clicking in the selection box 642 associated with the attribute. When an attribute has been selected, a check is displayed in the associated selection box 642. The user may also unselect an attribute by again clicking in the associated selection box. In this case, the check mark will be removed. It is of note that exposed bundles stored in available fuel pools may be accessed from the fuel pool database 258 by the user to populate the appropriate tables in FIG. 8 for eventual filtering by the filter tool 632.

For each attribute, the filter window 640 may display one or more filter characteristics associated with the attribute. For the K infinity attribute, the user may select a filter operator 644 of greater than, less than, or equal to and enter in a filter amount 646 associated with the filter operator 644. As shown in FIG. 9, a user has selected to filter based on K infinity, chosen the greater than filter operator, and entered the filter amount of 1.2.

As a result, the loading map editor 601 will filter the fuel bundles in the filtered fuel pool table 622 to display only those fuel bundles having a K infinity greater than 1.2. As another example, the exposure attribute in box 642 also has an associated filter operator and filter amount.

For the cycle attribute, the filter window provides a drop down menu for selecting the cycle number. FIG. 9 shows cycles 2 and 4 selected from the drop down menu for the cycle attribute. As a result, the loading map editor filters the filtered fuel pool table 622 to display only those fuel bundles whose most recent residence was in cycle 2 or cycle 4.

Similarly, the user may elect to filter bundles based on their pedigree, product line, etc. Once the attributes for filtering on have been selected and the filter characteristics have been entered, the user causes the loading map editor 601 to filter the filtered fuel pool table 622 based on this information by clicking on the OK selection box. Alternatively, the user may cancel the filter operation by clicking on the CANCEL selection box.

The filtered fuel pool table 622 also provides a filtering mechanism for filtering the fuel bundles listed therein. A user may sort the filtered fuel pool table 622 in ascending or descending order of an attribute by clicking on the attribute heading in the filtered fuel pool table 622. Once the user clicks on the attribute, the loading map editor displays a popup menu with the options "Sort Ascending" and "Sort Descending". The filtered fuel pool table 622 is then filtered in ascending or descending order of the attribute based on the option clicked on by the user.

FIG. 10 is a screen shot to illustrate a load fresh window displayed by the loading map editor 601 for loading of fresh bundles into the fuel template. The window is divided into a fresh bundle types table 650 and a fresh bundle pool table 660. The fresh bundle types table 650 lists the available fresh fuel bundle types, listing each fresh fuel bundle type by its bundle name. The bundle name is a character string identifier used to identify the fuel bundle product line as well as nuclear characteristics, such as uranium and gadolinia loading.

The fresh fuel bundle types table 650 also lists one or more attributes of each fresh fuel bundle type listed, such as K infinity, fuel bundle product line, average uranium-235 enrichment, percent (as a function of total fuel weight) of gadolinia burnable poison contained in the fuel bundle, number of gadolinia-containing fuel rods, and number of axial zones (an axial zone is defined by a cross-sectional slice of the bundle that is homogeneous along the axial direction). Other attributes of the fresh bundle may include parameters for predicted thermal behavior, such as R-factors and local peaking, calculated for various bundle exposure values. R-factors are used as inputs to the critical power ratio (CPR) and are determined from a weighted axial integration of fuel rod powers. Local peaking is a measure of the fuel rod peak pellet and clad temperature.

The fresh bundle pool table 660 provides the same information for each fuel bundle as provided by the fresh bundle types table 650. Additionally, the fresh bundle pool table 660 indicates the type number 662 for each type of fresh bundle in the loading template and then number of fresh fuel bundles of that type in the loading template. FIG. 10 shows that the first type of fresh fuel bundle position(s) are a group of four fuel bundles, and the next type of fresh fuel bundle(s) are a group of eight fuel bundles.

Similar to FIG. 8, the fresh bundle pool table 660 may be continually populated and/or updated by moving fuel bundles from the fresh bundle types table 650 into the fresh bundle pool table 660, and includes the tools 630 described in FIG. 8; the filter tool 632 (which may filter out fresh fuel bundles accessed from fresh fuel bundle design database 252), move right tool 634 and delete tool 638 for aiding the user in selecting and moving fuel bundles from the fresh bundle types table 650 to the fresh bundle pool table 660, as described above. The loading map editor 601 also provides for filtering the fresh bundle types table 650 in ascending or descending order of an attribute in the same manner that the filtered fuel pool table 622 may be sorted.

Once the reinserted (exposed fuel) and fresh fuel bundle positions 612 are filled using the tools described in detail above, the user may click on a "populate" button displayed in the loading screen to have the loading map displayed. The user may then save the created loading map by using the "Save" or "Save As" options in the file menu 608.

At this point, the user has now generated an initial test core design to be evaluated using a plurality of automated tools in order to determine a core design that satisfies all constraints or limits that have been set in an effort to achieve a core design suitable power operations. To load the test core design for evaluation using the automated tools, the user simply clicks a load button and enters ID prefixes for the fresh fuel types; the test core design is ready for evaluation.

Block 700-Automated Tools

For the initial test core design, the user may modify one or more of the rod pattern, core loading pattern and/or unique fresh fuel bundle types in the test core design until a reactor core design is determined that satisfies all limits and/or constraints for power operations. As will be explained below, each automated tool may provide associated procedural recommendations to assist the user or designer with any modifications that need to be made to the test core design in order to achieve a desired core design for power operations.

For each automated tool, a simulation of the test core design with one of a selected or modified rod pattern design (for the modify rod pattern tool option), a selected or modified core loading pattern (core loading design tool), and selected unique subset of fresh fuel bundle types (N-Streaming tool) is to be performed. In other words, each tool will establish a respective desired initial test rod pattern design, core loading pattern design, and/or unique fresh fuel bundle type of placement in the test core design output from the functions of block 600. For each of the automated tools, the plant to be evaluated has already been selected and the limits set (at inputs block 500). As the initial test core design has been loaded at the output of block 600, each of the automated tools may be invoked as to be described in more detail below.

For each automated tool, based on the corresponding given test rod pattern, core loading pattern or unique fresh fuel bundle types set for the test core design, the simulation results are compared to the limits and data related to the comparison is provided to the user in the form of one or more graphical or text pages; this data may indicate those limits that were violated during simulation and may also be used with procedural recommendations to provide feedback to the user as to what to modify with regard to the rod pattern, the core loading pattern and or the unique fresh fuel bundle types used in the core design.

As previously discussed, these tools can be invoked sequentially (i.e., the modify core pattern tool may be iterated with acceptable rod pattern and fresh fuel bundle designs input thereto from the rod pattern and unique fresh fuel type tools, and vice versa), or the tools in another example may be iterated independently from one another, and the best design (as indicative by the objective function values) may serve as a derivative core design resulting there from may be evaluated by the other two tools, sequentially or again independently, to refine the core design for power operations.

The Modify Rod Pattern Tool

The initial test core design generated above in block 600 may not have the desired rod pattern design (e.g., notch positions and sequences for control blade patterns in BWRs, or group sequences for control rod patterns in PWRs, etc.) for power operations. This may be determined by evaluating the results of simulation of the given test reactor core design that has been loaded with a test rod pattern design (e.g., notch positions and sequences for control blade patterns for BWRs, group sequences for control rod patterns for PWRs, etc.) and then simulated using core simulation software to generate simulation results for comparison against the limits set in the inputs block 500. Accordingly, a simulation of the given test reactor core design from block 600, but which includes an initial test rod pattern design, will need to be performed.

The implementation of the rod pattern tool and routine for modifying rod patterns in the test core design is described in detail in co-pending and commonly assigned U.S. patent application Ser. No. 10/321,441 to Russell, II et al. In general, a user implements the modify rod pattern tool via the GUI 230 and through processing power (the local computer at user, the application server 200 and/or calculation servers 400, etc.) to virtually modify rod pattern designs (e.g., notch positions and sequences for control blade patterns for BWRs, group sequences for control rod patterns for PWRs, etc.) for review on a suitable display device by the user. The iteration of the modify rod pattern subroutine may also provide feedback and/or procedural recommendations to the user, based on how closely a proposed rod pattern design solution meets the user input limits or constraints that need to be satisfied for the test core design to meet the requirements for power operations.

It is of note that many of the steps and figures describing the modify rod pattern tool are similar for the core loading pattern and unique fresh fuel bundle type tools. Accordingly, several of the figures describing the modify rod pattern tool will be referenced in the discussion of the core loading pattern and unique fresh fuel bundle type tools, with only the differences noted for purposes of brevity.

Figure 11:
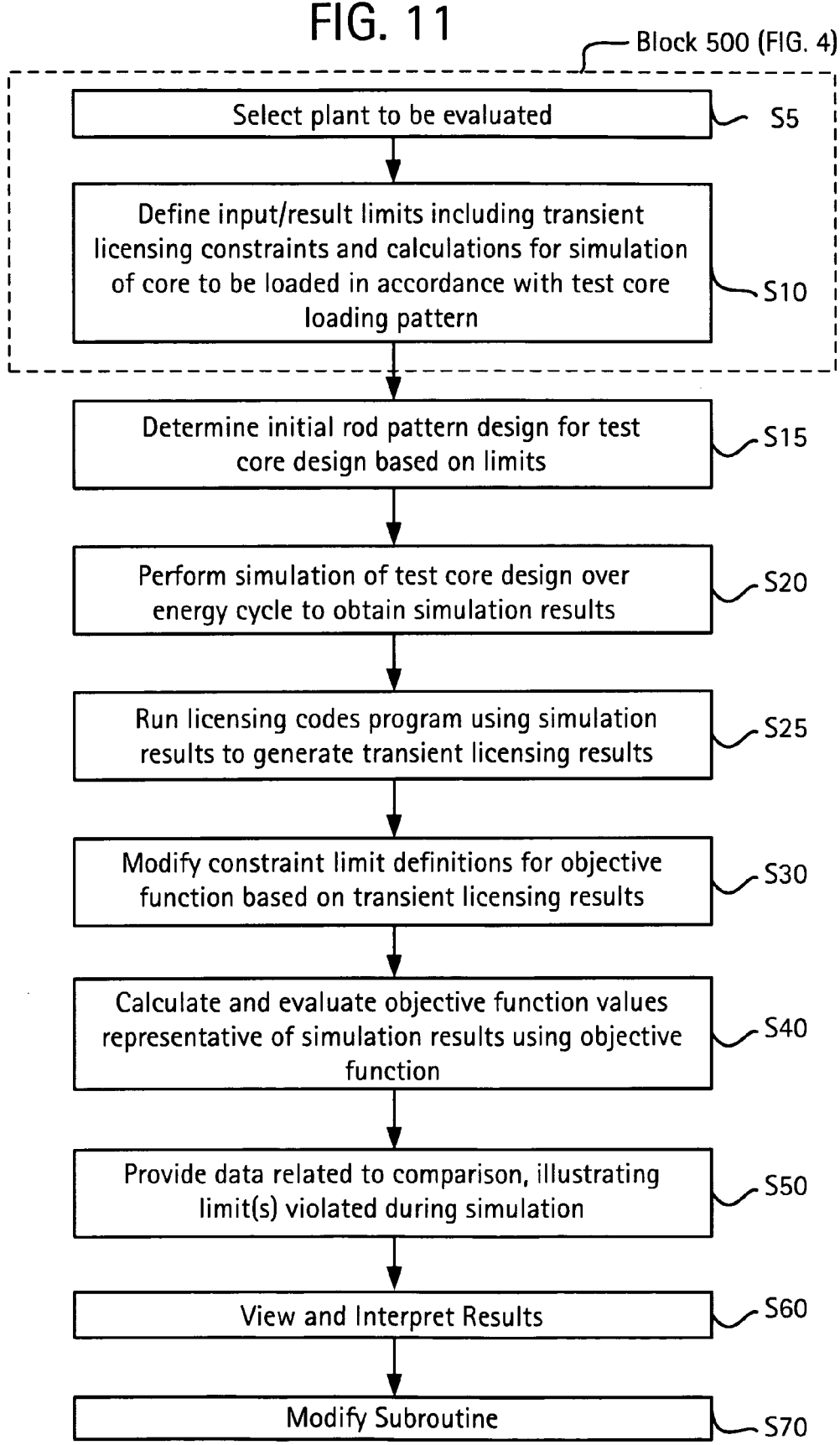
FIG. 11 is a flow chart illustrating implementation of the modify rod pattern tool in accordance with an exemplary embodiment of the invention.

FIG. 11 is a flow chart illustrating implementation of the modify rod pattern tool in accordance with an exemplary embodiment of the invention. FIG. 11 is described in terms of determining a rod pattern design for an exemplary boiling water reactor, it being understood that the method may be applicable to PWRs, gas-cooled reactors and heavy-water reactors.

Referring to FIG. 11, a reactor plant is selected for evaluation in Step S5 and limits (inclusive of the transient licensing constraints) which are used in a simulation for a test rod pattern design of the selected plant are defined (Step S10). These steps have previously been performed by the functions in input block 500, but are reiterated herein for clarity. Based on the limits, a sequence strategy (initial test rod pattern design) for control mechanism movement (e.g., control blade notch positions, control rod positions, etc.) is established (Step S15). Reactor operation is simulated (Step S20) on the entire test core design with the selected rod pattern design, or focused on a subset of the test rod pattern design, which may be a subset of fuel bundles in a reactor core for example, in order to produce a plurality of simulated results.

A base 3D simulator run evaluates the core response at rated, steady state core conditions over the operating cycle. Simulation results from the simulation run may include hot excess reactivity, cold shutdown margin, SLCS boron, as well as thermal margins.

The simulation results from the simulation are used in running a licensing codes program (Step S25) to generate transient licensing results. To run the licensing codes, the simulator may be again run as a means of creating 'transient wrapup' files that form the basis of the starting transient conditions for the licensing codes. In an example, the 3D simulator runs performed in this case correspond to limiting steady state operational scenarios designed to provide a conservative state with regard to analyzing the severity of a given transient. Examples of such 3D simulator runs for running the licensing codes include depleting the core with an extremely bottom peaked axial power shape, utilizing control blades that place as many bundles as possible on limits, etc.

The transient licensing results from the licensing codes define the steady state limits against which the steady state 3D simulator results may be evaluated. These steady state limits are used to modify the constraint limit definitions (S30) used in an objective function calculation and evaluation (Step S40) for evaluating the simulation results from Step S20) against the limits. Based on this evaluation, data is provided (displayed to the user) which illustrates whether any limits have been violated (Step S50). The data also provides the user with an indication of which location in a simulated core were the largest violators or largest contributors to a limit violation. Each of these steps is now described in further detail below.

Once the plant is selected, an initial rod pattern design may be selected by entering a previous test rod pattern (sequence strategy) using GUI 230 to access a plant configuration webpage. For example, the webpage may enable to user to select a "model size", e.g., quarter core, half core, or full core, for evaluation in a subsequent simulation. Additionally, a user may select a core symmetry option (e.g., octant, quadrant, no symmetry) for the selected model size, by clicking on a suitable drop down menu and the like. In an example, this core symmetry option has already been performed as evident in FIG. 6 for example.

As previously shown in FIG. 5, the client-inputted plant specific constraints, which may be configured as limits on input variables to the simulation and limits on the simulation results have already been set for the simulation. A sequence strategy (test rod pattern design for the test reactor core design output from block 600) for positioning one or more subsets of a test rod pattern design is established (Step S15) based on the limits. In an embodiment where the reactor being evaluated is a boiling water reactor, for example, the limits help to establish allowable control blade positions and durations.

Control blade themes are defined together with allowable blade symmetry to aid the user in determining an initial sequence strategy. In typical BWR operation, for example, the control blades may be divided into four groups of blades ("A1", "A2", "B1", and "B2"). By apportioning blades into these blade groups, the user may easily identify only the permissible blades within a given sequence. Consequently, undesirable blades are prevented from being used, which would result in an undesirable solution. Because control blade themes are identified for each exposure, satisfactory blade definitions may be forced.

By defining control blade themes and blade symmetry, the user need only identify a single blade position within the control blade theme, and the other symmetric control blades will accordingly follow. Thus, the graphical area is not cluttered by redundant control blade location information. Further, automating a sequence strategy prevents illegal control blade position errors from occurring.

Figure 12:
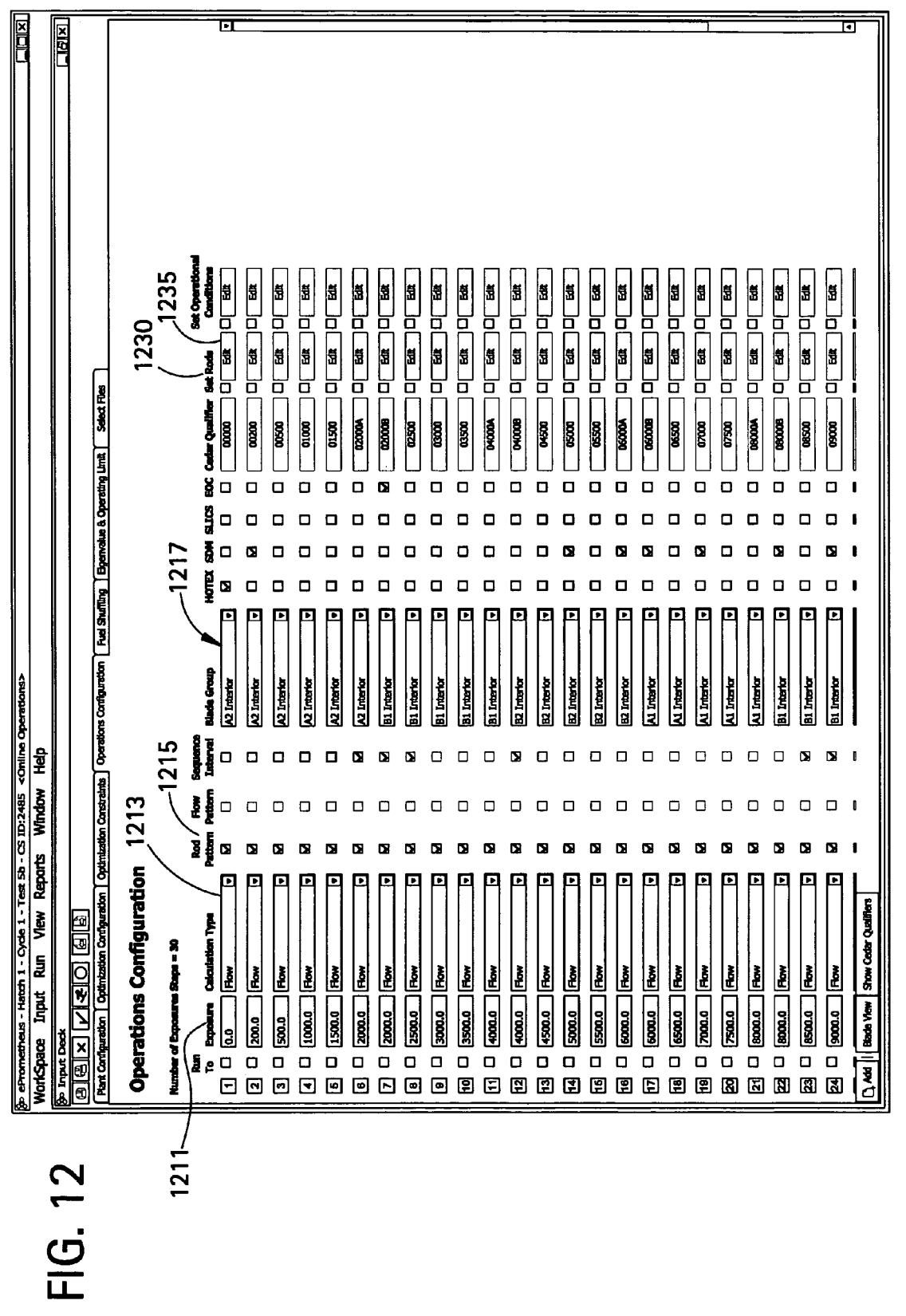

The user proceeds to identifying all sequences and the initial rod pattern determination from a beginning of cycle (BOC) to end of cycle (EOC). FIG. 12 is a screen shot illustrating how a control blade sequence may be entered. The column entitled blade group at 1217 enables the user to adjust or set the sequence strategy based on what user constraints have already been entered, for example. In FIG. 12, the user has set the exposure steps at 1211, calculation type at 1213, detailed rod pattern at 1215, blade groups at 1217 and any appropriate operation parameters.

With the limits (inclusive of transient licensing constraints) having been defined and the sequence strategy (initial test rod pattern for the test reactor core design) having been established, a simulation of the test core design is initiated (Step S30). The simulation may be executed by calculation servers 400; however, the simulation may be a 3D simulation process that is run external to the arrangement 1000. The user may employ well-known executable 3D simulator programs such as PANACEA, LOGOS, SIMULATE, POLCA, or any other known simulator software where the appropriate simulator drivers have been defined and coded, as is known. The calculation servers 400 may execute these simulator programs based on input by the user via GUI 230.

The user may initiate a 3D simulation at any time using GUI 230, and may have a number and different means to initiate a simulation. For example, the user may select a "run simulation" from a window drop down menu, or could click on a "RUN" icon on a webpage task bar, as is known. Additionally, the user may receive graphical updates or status of the simulation. Data related to the simulation may be queued in queue database 253 within relational database server 250. Once the simulation is queued, the user may have an audio and/or visual indication as to when the simulation is complete, as is known.

Figure 13:
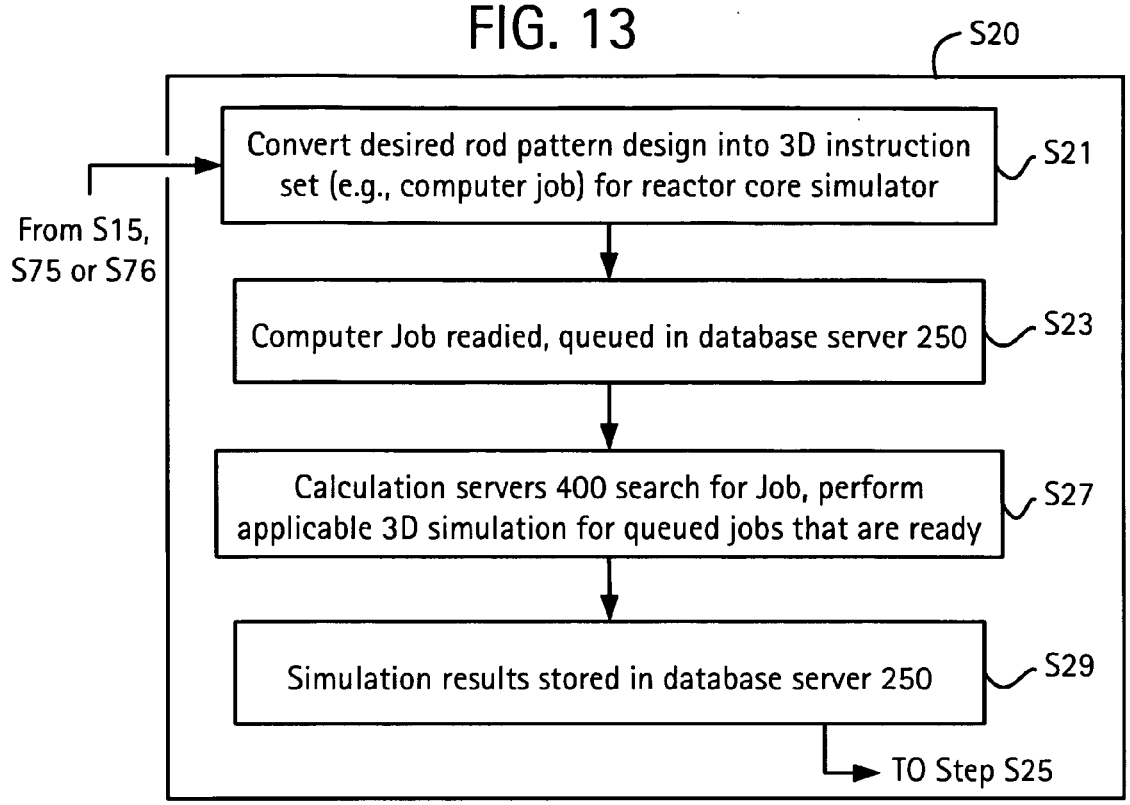
FIG. 13 is a flow chart illustrating simulation Step S20 of FIG. 11 in further detail.

Once the user initiates simulation, many automation steps follow. FIG. 13 is a flow chart illustrating simulation Step S20 in further detail. Initially, all definitions for the test core design with the selected rod pattern design problem are converted into a 3D instruction set (e.g., a computer job) for the 3D reactor core simulator (Step S21). This enables the user to have a choice of several types of simulators, such those described above. Selection of a particular simulator may be dependant on the plant criteria entered by the user (e.g. the limits). The computer job is readied for queuing in the queue database 253 of each relational database server 250 (Step S23). The storing of the data for a particular simulation enables any potential simulation iteration to start from the last or previous iteration. By storing and retrieving this data, future simulation iterations to a rod pattern design take only minutes or seconds to perform.

Concurrently, a program running on each of the available calculation servers 400 scans every few seconds to look for available jobs to run (Step S27). If a job is ready to run, one or more of the calculation servers 400 obtains the data from the queue database 253 and runs the appropriate 3D simulator. As described above, one or more status messages may be displayed to the user. Upon completion of the simulation, all results of interest may be stored (Step S29) in one or more subordinate databases within the relational database server 250 (e.g., simulation results database 255). Accordingly, the relational database server 250 may be accessed in order to calculate the objective function values for the test rod pattern design.

FIG. 28 is a flow diagram illustrating run licensing codes Step S25 of FIG. 11 in further detail. The processing for running transient codes to generate the transient licensing results is somewhat similar to FIG. 13. The user may run the transient codes at any time using the GUI 230. In addition, the transient codes are run as part of an automated algorithm.

As the 3D simulator is run for the transient codes, once the user initiates simulation, many automation steps follow. First, transient restart files are prepared (Step S251) based on the simulator results from the simulation of Step S20 (input from simulator results database 255) and based on licensing transient constraints input from the transient parameters database 261. Preparation of the transient restart files may involve certain 'preconditioning' 3-D simulator runs such as 'hard bottom burns' that are designed to put the core in operating configurations that are considered bounding for purposes of executing licensing calculations. Such runs are often performed utilizing alternative rod patterns than nominal that are designed to place the core on limits with respect to thermal or reactivity margins.

The computer job (transient simulation job) is readied for queuing in the queue database 253 of each relational database server 250 (Step S253). The storing of the data for a particular simulation enables any potential simulation iteration to start from the last or previous iteration. By storing and retrieving this data, future simulation iterations take only minutes or seconds to perform.

Concurrently, a program running on each of the available calculation servers 400 scans every few seconds to look for available jobs to run (Step S257). If a job is ready to run, one or more of the calculation servers 400 obtains the data from the queue database 253 and runs the appropriate 3D simulator. As described above, one or more status messages may be displayed to the user. Upon completion of the simulation, all results of interest, which in this case are the transient licensing results) are stored (Step S259) in the relational database server 250 (e.g., in transient results database 262). Accordingly, the transient licensing results from database 262 may be accessed in order to modify the constraint limit definitions at Step S30 in order to calculate the objective function values from the objective function for evaluation of the test design at Step S40.

In Step S30, and as previously described, the transient licensing results from the licensing codes define the steady state limits, and hence modify the constraint limit definitions in the objective function (CONS) against which simulator results are be evaluated in Step S40. An example of a steady-state limit that might be modified would be the limit on MFLPCR. In addition, the transient licensing results may be used to define transient-specific constraint values to be compared against transient-specific constraint limits obtained from limits database 251. Examples of transient-specific constraint limits are cladding plastic strain and centerline melting, which may only be evaluated as a result of transient licensing calculations.

Figure 14:
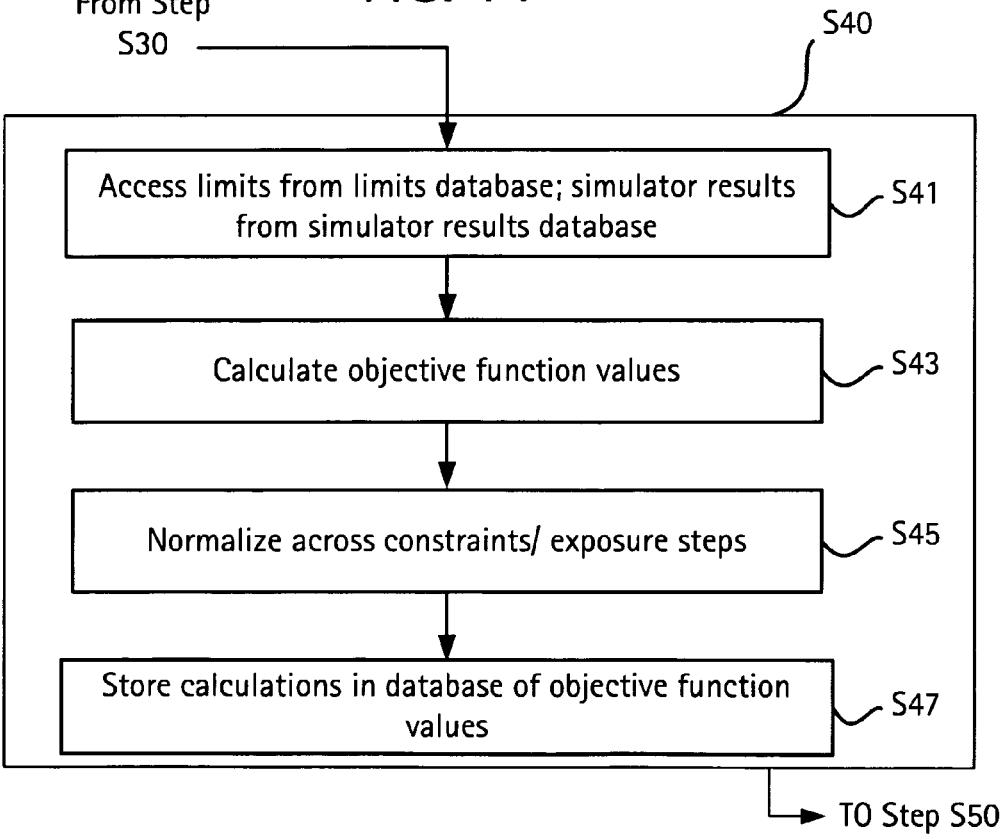
FIG. 14 is a flow diagram illustrating Step S40 of FIG. 11 in further detail.

FIG. 14 is a flow diagram illustrating Step S40 of FIG. 11 in further detail. The objective function may be stored in relational database server 250 for access by calculation servers 400. Objective function calculations, which provide objective functions values, may also be stored in the relational database server 250, such as in a subordinate objective function value database 257. Referring to FIG. 14, inputs to the objective function calculation include the limits from the limits database 251, the steady-state constraint limit definitions as modified based on the transient licensing results as well as transient-specific constraint limits from database 251 and the simulator results from the simulator results database 255. Accordingly, one or more calculation servers 400 access this data from relational database server 250 (Step S41).

Although the example embodiments of the present invention envision any number of objection function formats that could be utilized, one example includes an objective function having three components: (a) the limit for a particular constraint parameter (e.g., design constraint for reactor plant parameter), represented as "CONS" (i.e., the modified constraint limit definitions from Step S30); the simulation result from the 3D simulator for that particular constraint parameter, represented as "RESULT", and a multiplier for the constraint parameter, represented by "MULT". A set of predefined MULTs may be empirically determined from a large collection of BWR plant configurations, for example. These multipliers may be set at values that enable reactor energy, reactivity limits, and thermal limits to be determined in an appropriate order. Accordingly, the method of the present invention utilizes a generic set of empirically-determined multipliers, which may be applied to over thirty different core designs. However, GUI 230 permits manual changing of the multipliers, which is significant in that user preference may desire certain constraints to be "penalized" with greater multipliers than the multipliers identified by the pre-set defaults.

An objective function value may be calculated for each individual constraint parameter, and for all constraint parameters as a whole, where all constraint parameters represent the entity of what is being evaluated in a particular test rod pattern of the test reactor core design (or as will be discussed below, a particular core loading pattern or one or more (N) unique fresh fuel bundle types for the test core design). An individual constraint component of the objective function may be calculated as described in Equation (1):

$$OBJ_{par} = MULT_{par} * (RESULT_{par} - CONS_{par}); \quad (1)$$

where "par" may be any of the client-inputted constraints listed in FIG. 5. These parameters are not the only parameters that could be possible candidates for evaluation, but are parameters which are commonly used in order to determine a suitable core configuration for a nuclear reactor. The total objective function may be a summation of all constraint parameters, or $$OBJ_{TOT} = SUM(par=1,31)\{OBJ_{par}\} \quad (2)$$

Referring to Equation 1, if RESULT is less than CONS (e.g. there is no violation of a constraint), the difference is reset to zero and the objective function will be zero. Accordingly, objective function values of zero indicate that a particular constraint has not been violated. Positive values of the objective function represent violations that may require correction. Additionally, the simulation results may be provided in the form of special coordinates (i, j, k) and time coordinates (exposure step) (e.g., particular time in a core-energy cycle). Therefore, the user can see at which time coordinate (e.g., exposure step) the problem is located. Hence, the rod pattern (or core loading pattern or unique fresh fuel bundle type pattern) is modified only at the identified exposure step.

In addition, objective function values may be calculated as a function of each exposure step, and totaled for the entire design problem (Step S43). The objective function values calculated for each constraint, and the objective function values per exposure step, may be further examined by normalizing each objective function value to provide a percentage contribution of a given constraint to a total objective function value (Step S45). Each result or value of an objective function calculation is stored (Step S47) in a subordinate objective function value database 257 within relational database server 250.

The objective function values may be utilized in the manual determination of the desired rod pattern for the test core design. For example, the values of the objective function calculations may be viewed graphically by the user in order to determine parameters that violate limits. Additionally, any change in objective function values over successful iterations of rod pattern design changes in the test core design provides the user with a gauge to estimate both improvement and detriment in their proposed design.

Increases in an objective function value over several iterations indicate that the user's changes are creating a rod pattern design that is moving away from a desired solution, while successive iterations of lesser objective functions values (e.g., the objective function value decreasing from a positive value towards zero) may indicate improvements in the iterative design. The objective function values, limits and simulation results over successive iterations may be stored in various subordinate databases within relational database server 250. Therefore, designs from past iterations may be quickly retrieved, should later modifications prove unhelpful.

Figure 15:
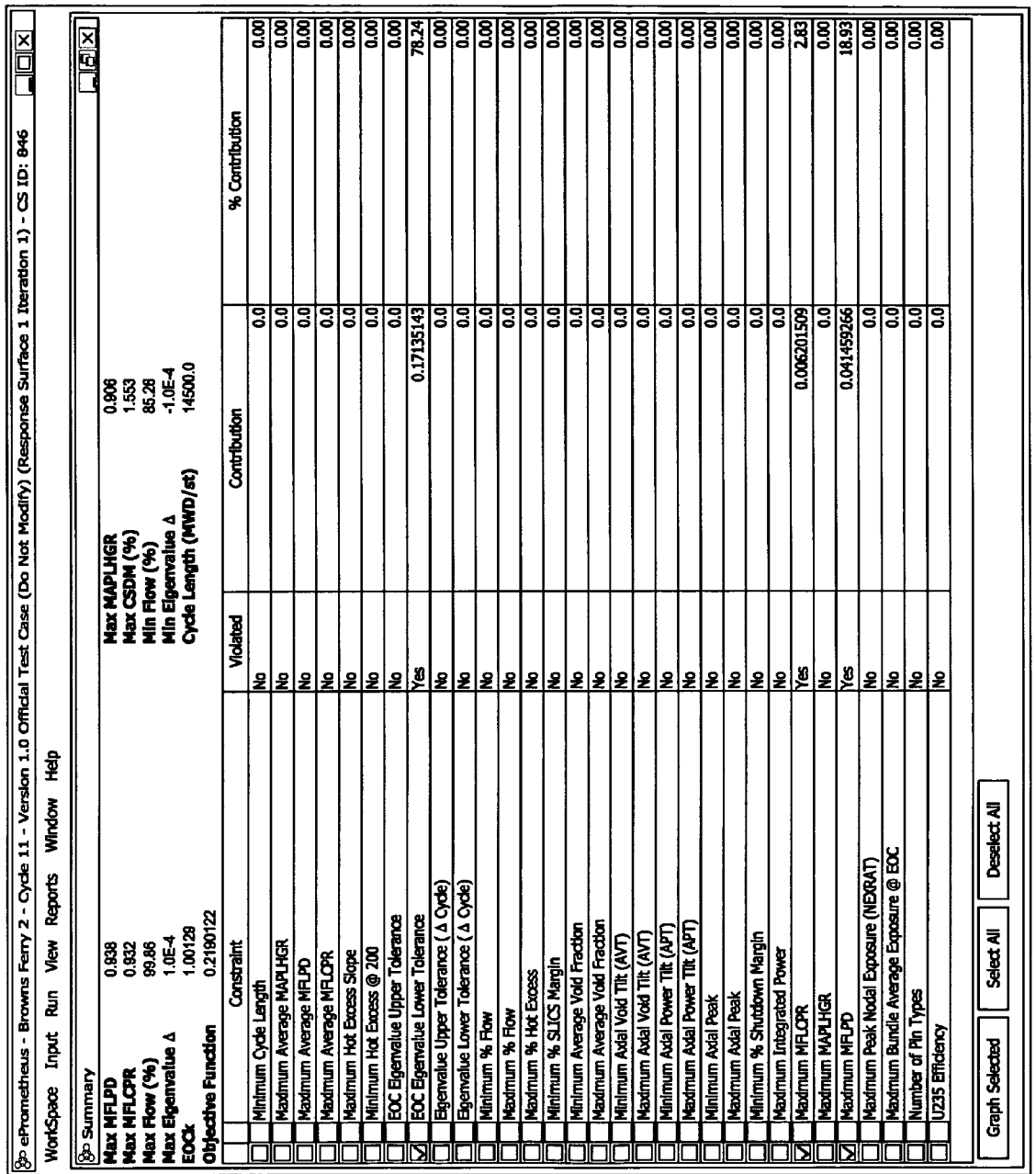
FIG. 15 is a screen shot to illustrate exemplary graphical data available to the user for review after completion of the objective function calculations.

FIG. 15 is a screen shot to illustrate exemplary graphical data available to the user for review after completion of the objective function calculations. Upon completion of the objective function calculation, the user may be provided with data related to the objective function calculations, which may include limits that have been violated during the simulation of the test reactor core design configured with the evaluated test rod pattern.

Referring to FIG. 15, there is displayed a list of constraint parameters which may represent the input limits, and the values of each of objective function value calculation on a per constraint basis. FIG. 15 illustrates limits which have been violated with a check in a box, as indicated by checked box 1505 for example. Additionally, for each limit violation, its contribution and percent (%) contribution (based on the calculations and the normalization routines described with respect to FIG. 14), are displayed. Accordingly, based on this data, the user may be provided with a recommendation as to what modifications need to be made to the rod pattern design for a subsequent iteration.

Although the individual rod pattern modifications may alternatively be left to the desires of the user, procedural recommendations may be provided in the form of a pull down menu, for example. These recommendations may be divided into four categories: energy beneficial moves, reactivity control, energy detrimental moves, and converting excessive margin (from thermal limit) into additional energy. As discussed above, one technique is to address problems using energy beneficial moves rather than energy detrimental moves. Even if the rod pattern design meets all of the limits (client-inputted plant specific constraints, design limits, thermal limits, etc.) the user may verify that any excessive margin to a particular limit is converted into additional energy. Accordingly, the following logic statements may represent the above procedural recommendations modifying the rod pattern:

Energy Beneficial Moves
    If peaking off top of blade, insert blade deeper
    If NEXRAT (e.g., a thermal margin constraint) problem at EOC, insert blade deeper earlier in cycle
    If kW/ft peaking during mid cycle, drive deeper rods deeper earlier in cycle
Reactivity Control
    If flow too high during sequence, pull deep rods
    If flow too low during sequence, drive rods deeper
Energy Detrimental Moves
    If peaking at bottom of core during sequence, insert shallow blade in local area
Converting Excessive Margin into Additional Energy
    If extra MFLCPR margin at EOC, drive blades deeper earlier in cycle
    If extra kW/ft margin EOC, drive blades deeper earlier in cycle
    If extra MFLCPR margin in center of core at EOC, drive center rods deeper earlier in cycle
Based on the location, and on the time exposure of limit violations, as indicated by the objective function, a user may easily follow one or more of the above recommendations to address and fix constraint violations.

The data resulting from the objective function calculations may be interpreted on a suitable display device. For example, this data may be displayed as a list of constraints with denoted violators, as described with respect to FIG. 15. However, the user may access a number of different "result" display screens that may configurable as 2- or 3-dimensional views, for example. The following Table 1 lists some of the exemplary views available to the user. These views represent example data that is available for display to the user

TABLE 1

GRAPHICAL VIEWS AVAILABLE TO USER

Figure 16:
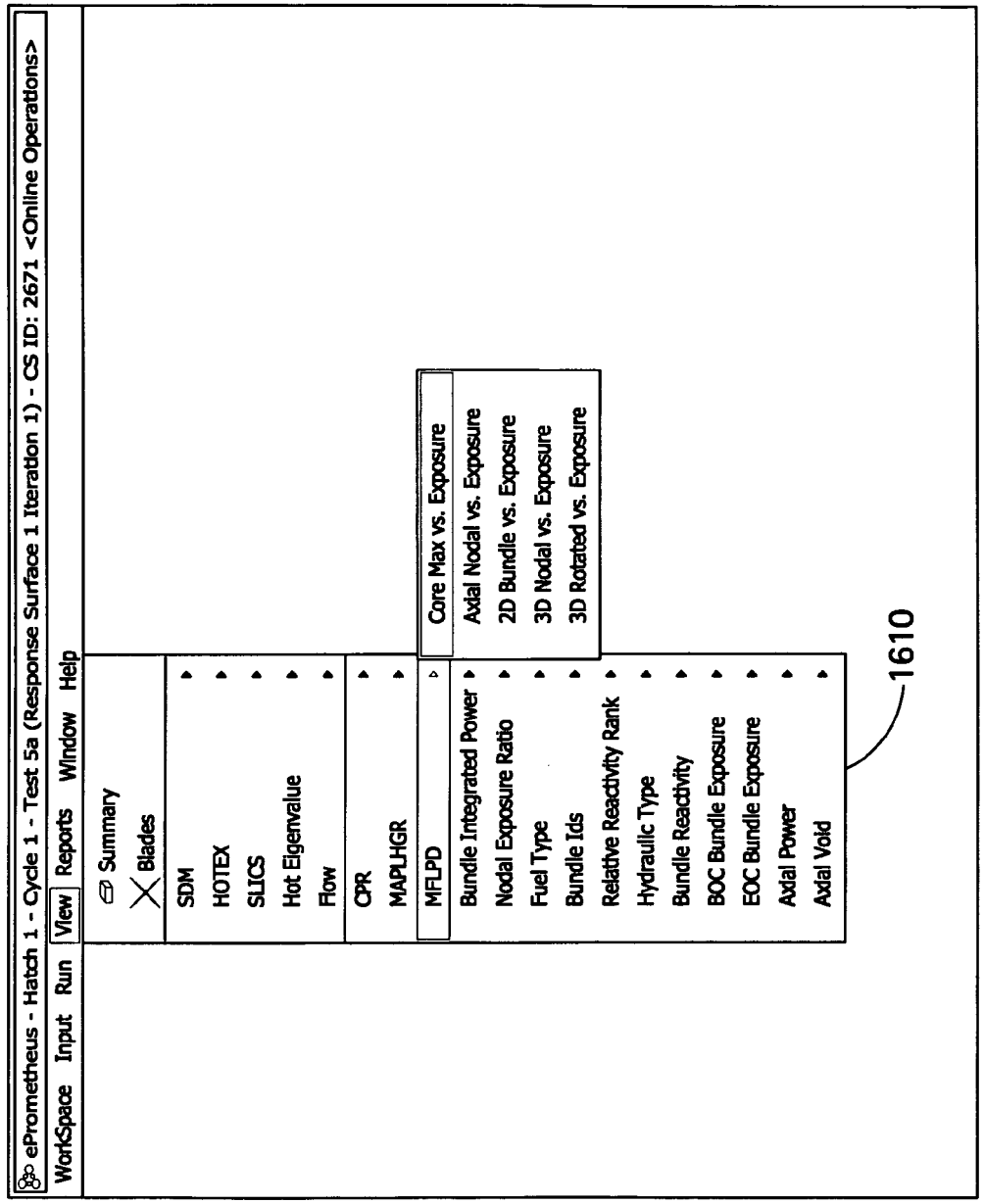
FIGS. 16, 17A and 17B are screen shots to illustrate graphical data available to the user to review the status of given constraints or limits subsequent to simulation and the objective function analysis, in accordance with the invention.
Figure 17A:
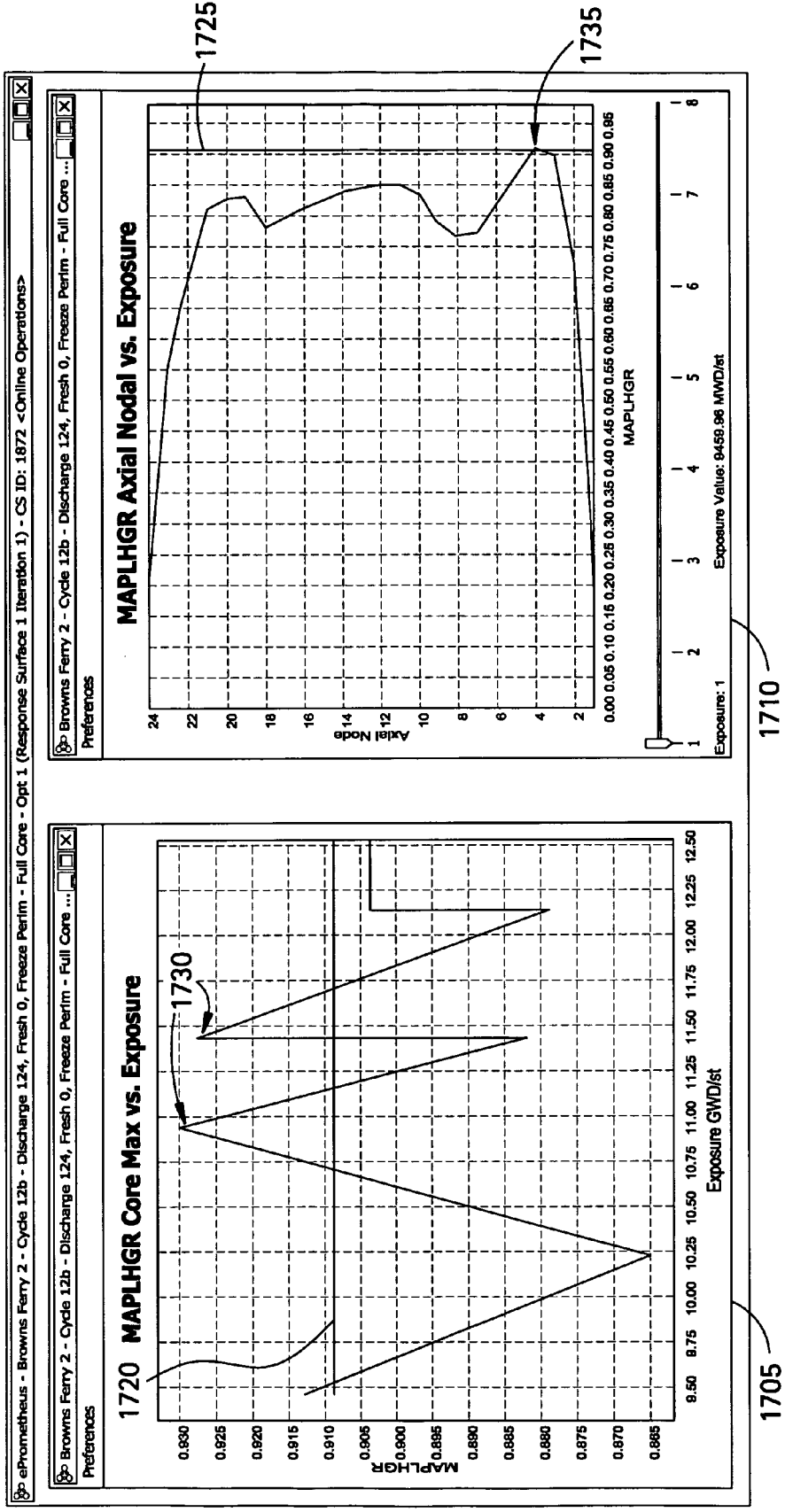
Figure 17B:
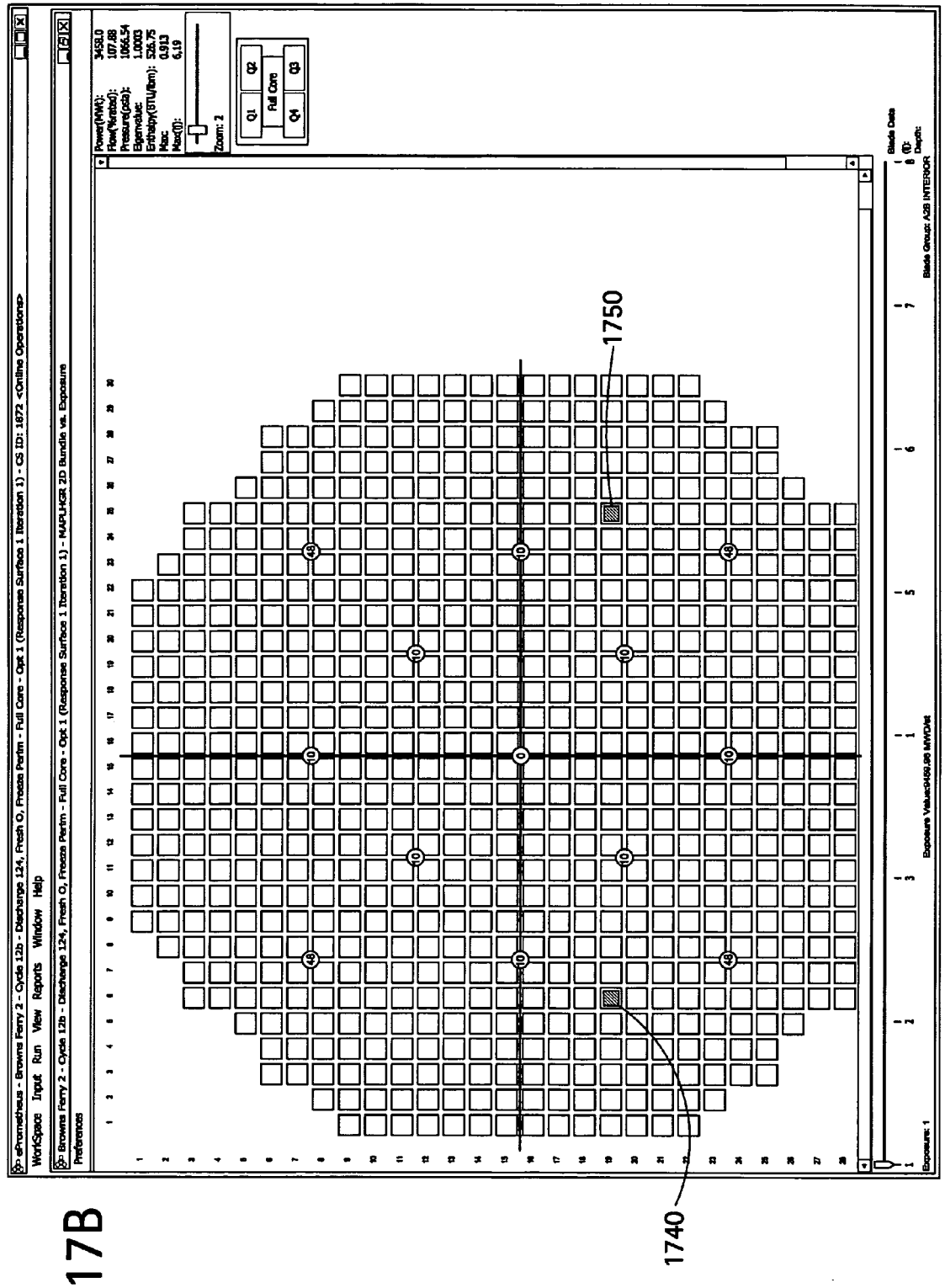

Objective function results - listing
Graph of max core value vs. exposure
Graph of nodal maximum value vs. exposure
Graph of location of max core value vs. exposure
Graph of pin value vs. exposure
Graph of bundle maximum value vs. exposure
View 3D rotational diagram
Report performance relative to previous iteration
Report improvement rates of various designers
Display of server status
Display of queue status
Display system recommendations FIGS. 16, 17A and 17B are screen shots to illustrate graphical data available to the user to review the status of given constraints or limits subsequent to simulation and the objective function analysis, in accordance with the invention. Referring to FIG. 16, a user may pull down a suitable drop down menu from a "view" icon on a task bar in order to display views of certain constraints or parameters. As illustrated in FIG. 16, a user has selected a Maximum Fractional Limiting Power Density (MFLPD) constraint parameter. There are a number of different graphical views available to the user, as indicated by pull-down menu 1610. The user simply selects the desired view and may then access a page such as is illustrated in FIG. 17A or 17B.

FIG. 17A illustrates two different 2-dimensional graphs of particular constraints, as seen at 1705 and 1710. For example, the user can determine where violations of Maximum Average Planar Heat Generation Rate (MAPLHGR) occur (in a core maximum vs. exposure graph 1705, and an axial values of MFLPD vs. exposure graph 1710) for a particular exposure in a core cycle. The limits for these constraints are shown by lines 1720 and 1725, with violations shown generally at 1730 and 1735 in FIG. 17A.

FIG. 17B illustrates another view, in this case a two dimensional view of an entire cross section of a core, in order to see where the biggest violation contributors for MAPLHGR vs. exposure are located. As can be seen at 1740 and 1750, the encircled squares represent the fuel bundles that are the largest violation contributors to MAPLHGR in the core (e.g., 1740 and 1750 pointing to bundles violating MAPLHGR). This gives the user an indication of which fuel bundles in the rod pattern design may need modification.

Figure 18A:
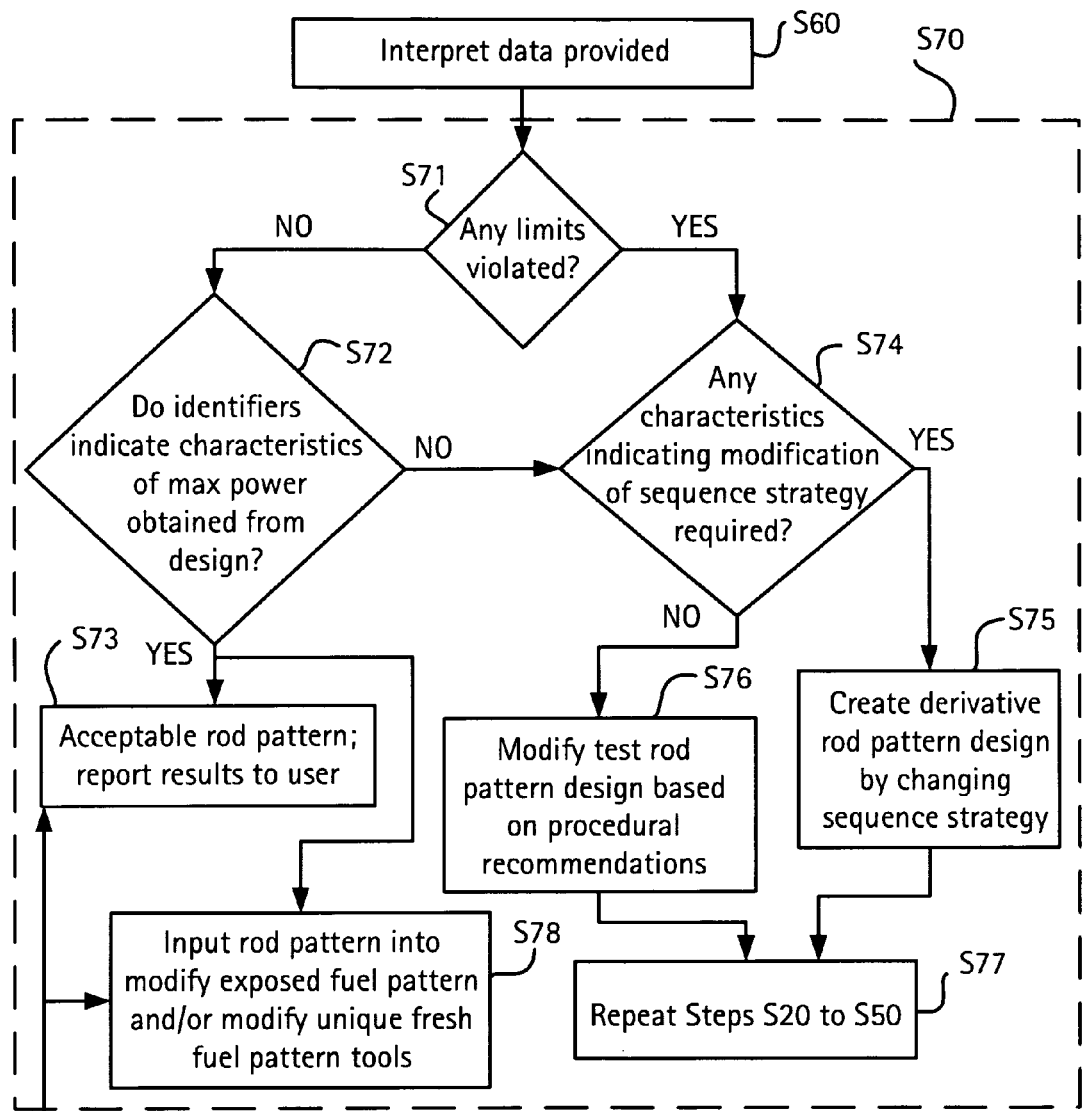
FIGS. 18A and 18B are flow diagrams describing rod pattern modification and iteration processing steps in accordance with the example modify rod pattern tool, in accordance with the invention.
Figure 18B:
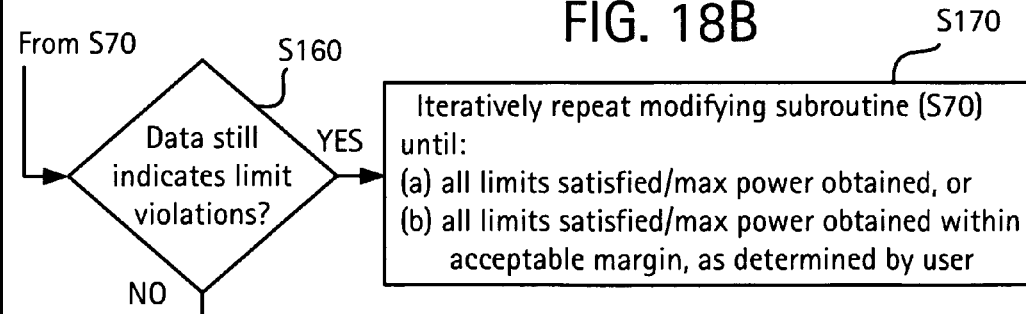

FIGS. 18A and 18B are flow diagrams describing rod pattern modification and iteration processing steps in accordance with the example modify rod pattern tool, in accordance with the invention. Referring to FIG. 18A, by interpreting the data at Step S60 (such as the data shown and described in FIGS. 15 through 17B, for example), the user may be inclined to initiate a modifying subroutine (Step S70). In all practicality, the test reactor core design with the initial test rod pattern will not be an acceptable design, and the modifying subroutine likely will be required.

In one embodiment, the user can manually direct this modifying subroutine, with the help of the graphical user GUI 230. In another embodiment, the subroutine may be performed within the bounds of an optimization algorithm that automatically iterates simulation, calculation of objective function and evaluation of the results or values of the objective function calculations for a number of rod pattern design iterations.

The user determines, based on the displayed data, whether any limits are violated (Step S71). If no limits are violated, the user determines if any identifiers indicate that characteristics of maximum power are obtained from the test reactor core design with selected test rod pattern. For example, these identifiers may include an indication of good thermal margin utilization (such as margins on MFLCPR and LHGR) by driving rods deeper into the core to maximize plutonium generation for cycle extension. Power requirements may be shown to be met when the minimum EOC eigenvalue is obtained for the cycle design (eigenvalue search) or the desired cycle length is determined at a fixed EOC eigenvalue. If there is an indication that max power has been obtained from the test reactor core design with selected test rod pattern (the output of Step S72 is YES), an acceptable test rod pattern for the test reactor core design has been determined, and the user may access a report of the results related to the rod pattern design (Step S73) and/or use the selected rod pattern in the modify core and/or unique fresh fuel bundle type design tools (Step S78).

If limits are violated (the output of Step S71 is YES) or limits are not violated but there is an indication that max power has not been obtained from the rod pattern design (the output Step S72 is NO) then the user determines whether any characteristics indicate that modification of the sequence strategy is required (Step S74). Characteristics that indicate a need to modify the sequence strategy may include excessive control blade (control rod) history, excessive MFLCPR at EOC in local areas and inability to contain MFLCPR at individual exposures. Additionally, if several iterations of rod pattern design changes have been attempted and there has been no real improvement to the objective function, this is a further indication that an alternative rod pattern sequence might need to be explored.

Figure 19:
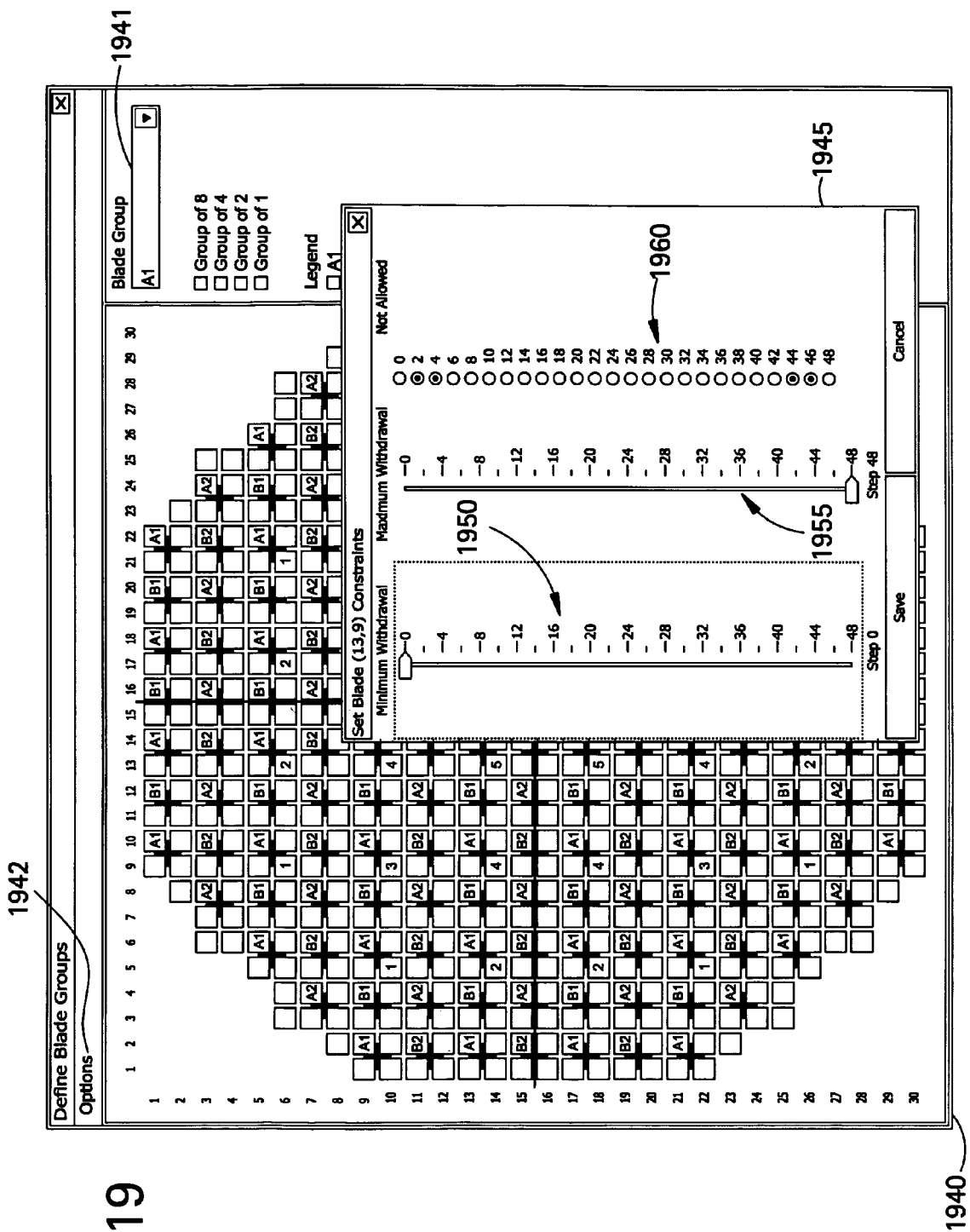
FIG. 19 is a screenshot for defining blade groups for modifying the rod pattern.

FIG. 19 is a screenshot for defining blade groups in order to modify the rod pattern. Accordingly, if the sequence strategy requires modification (the output of Step S74 is YES), the user creates a derivative rod pattern design by changing the sequence strategy (Step S75). For example, and referring to FIGS. 12 and 19, the user may select an edit option on the operations configuration page to change the blade groupings (see 1217 in FIG. 12).

If there are no characteristics indicating that the sequence strategy needs to be modified (the output of Step S74 is NO) the user may modify the test rod pattern design to create a derivative rod pattern (and hence a derivative reactor core design) by changing positions of control blades or control rods. Referring to FIG. 12, the user checks a "set rods" box 1230 for a particular exposure and selects edit icon 1235. As shown in FIG. 19, these operations may bring up another display that enables the user to manually alter the notch positions of the control blades in a particular group. In FIG. 19, there is shown a "Define Blade Groups" screenshot 1940, which illustrates a core cross section with a blade group Interior A1 selected at cell 1941. By selecting options pull down menu 1942, the user may display another window called a "Set Blade Constraints" window 1945. The minimum withdrawal column 1950 identifies how far a blade is allowed into the core. The maximum withdrawal column 1955 identifies how far the blade is allowed out of the core, and the Not Allowed column 1960 identifies blade locations that are not allowed for this particular rod pattern design. These examples are not limited to changing control blade notch positions for boiling water reactors, but also to changing rod position of control rods in pressurized water reactors, as well as control rod positions in other types of reactors (e.g., gas cooled reactor, heavy water reactors, etc.).

Regardless of whether the test rod pattern was modified by changing rod positions or modified by changing sequence strategy, Steps S20-S50 are repeated to determine if the derivative rod pattern (and hence the derivative reactor core design) meets all limits (Step S77). This may become an iterative process.

FIG. 18B illustrates the iterative process in accordance with an example embodiment of the invention. For each derivative rod pattern design that has been simulated, the user determines whether any data that is related to the comparison between simulated results and limits (e.g., the calculated objective function values) still indicates that there are limit violations. If not, the user has developed an acceptable rod pattern design that may be used in a particular reactor, and may access graphical results related to the acceptable rod pattern design (Step S73) and/or use the selected rod pattern in the modify core and/or unique fresh fuel bundle type design tools (Step S78).

If an iteration still indicates that limits are violated (the output of Step S160 is YES) then the modifying subroutine in Step S70 is iteratively repeated until all limits are satisfied, or until all limits are satisfied within a margin that is acceptable, as determined by the user (Step S170). The iterative process is beneficial in that it enables the user to fine tune a rod pattern design, and to perhaps extract even more energy out of an acceptable rod pattern design than was previously possible of doing with the conventional, manual iterative process. Further, incorporation of the relational database server 250 and a number of calculation servers 400 expedite calculations. The iterative process as described in FIG. 18B may be done in an extremely short period of time, as compared to a number of weeks using the prior art manual iterative process of changing one parameter at a time, and then running a reactor core simulation.

To this point, the modify rod pattern tool been described in terms of a user or designer interpreting data via GUI 230 and modifying the test rod pattern (and hence test reactor core design) iteratively, by hand, based on displayed feedback (the data from the objective function) in order to get a desired design. However, the aforementioned steps of FIGS. 18A and 18B may also be effectuated by way of an optimization process. Such an optimization process is equally applicable to the modify core loading pattern tool and unique fresh fuel bundle type design tool to be explained hereafter. The optimization process iterates the steps in FIGS. 18A and 18B over a number of different rod pattern designs, constantly improving on violated limits in order to achieve an optimal rod pattern design to be used in a nuclear reactor core.

Figure 20:
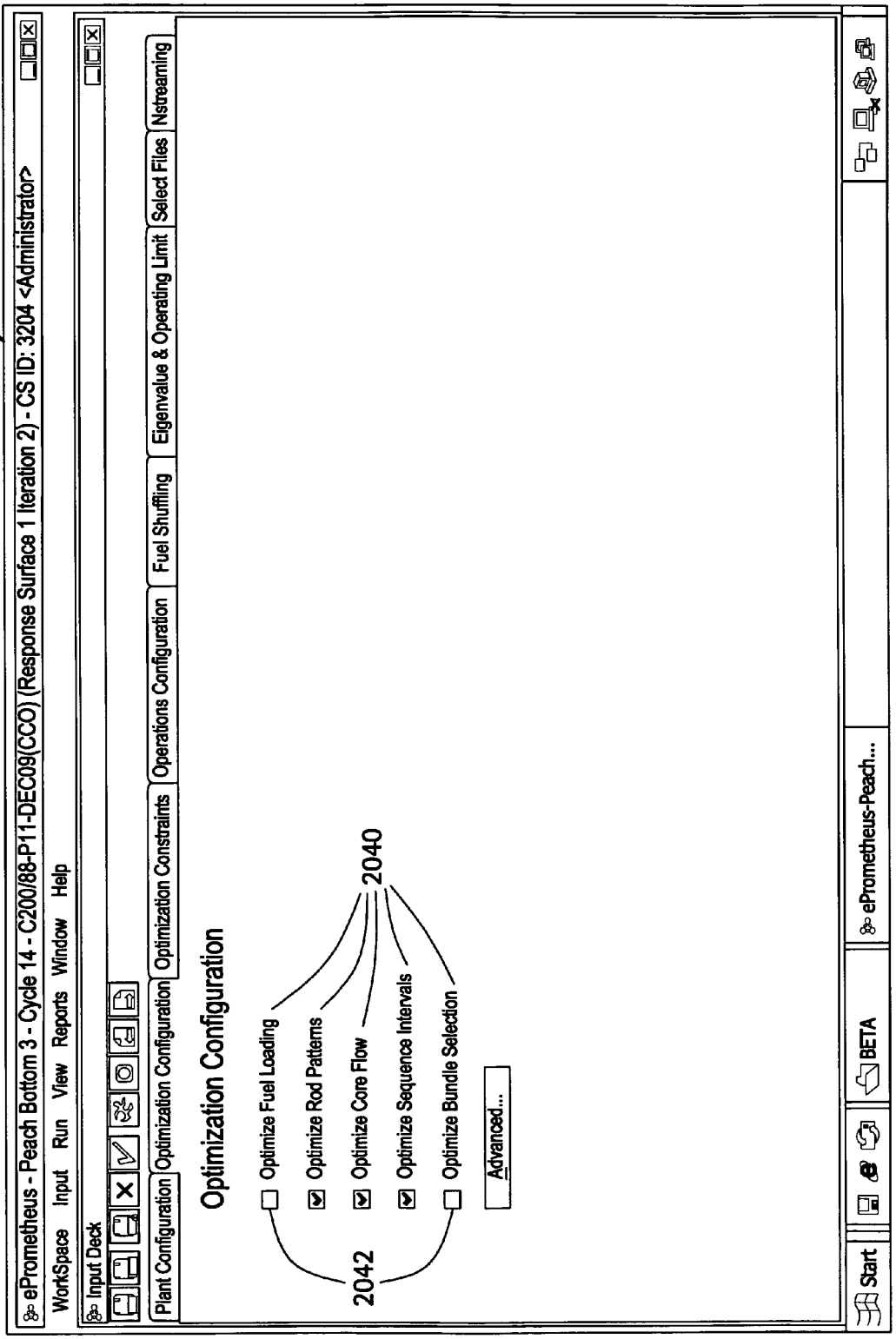
FIG. 20 is a screen shot to illustrate configuring an optimization process.

FIG. 20 illustrates a screen shot to initiate such a process. For example, after selecting the plant and the test rod pattern, the user may display an optimization configuration screen 2005. The user may select optimization parameters 2040 of optimize rod patterns, optimize core flow, and optimize sequence intervals, for example. Optimize rod patterns means making an optimal determination of individual rod (control blades in BWRs) positions within a control rod grouping (called a sequence), for the duration of time during the operating cycle when the given sequence is being used to control the reactor. Rod positions affect the local power as well as the nuclear reaction rate.

Optimize core flow means making an optimal determination of reactor coolant flow rate through the reactor as a function of time during the operating cycle. Flow rate affects global reactor power as well as the nuclear reaction rate. Optimize sequence intervals means making an optimal determination of the time duration a given sequence (i.e., control rod grouping) is used to control the reactor during the operating cycle. Sequence intervals affect local power as well as the nuclear reaction rate.

Using a suitable input device (e.g., keyboard, mouse, touch display, etc.), the user may select, via GUI 230, one or more of the optimization parameters by clicking in the selection box 2042 associated with a given optimization parameter 2040. When selected, a check appears in the selection box 2042 of the selected optimization parameter. Clicking in the selection box 2042 again de-selects the optimization parameter. As shown in FIG. 20, to optimize the iterative modify rod pattern design process, the user would select boxes 2042 for optimize rod patterns, optimize core flow and optimize sequence intervals.

Memory (relational database server) 250 may also store constraint parameters associated with the optimization problem. These may be stored in limits database 251 for example. The constraint parameters are parameters of the optimization problem that must or should satisfy a constraint or constraints, where a constraint may be analogous to the limits described above.

FIG. 21 illustrates a screen shot of an exemplary optimization constraints page listing optimization constraints associated with an optimization problem of boiler water reactor core design. As shown, each optimization constraint 2150 has a design value 2152 associated therewith. Each optimization constraint must fall below the specified design value. The user has the ability to select optimization parameters for consideration in configuring the objective function. The user selects an optimization constraint by clicking in the selection box 2154 associated with an optimization constraint 2150. When selected, a check appears in the selection box 2154 of the selected optimization constraint 2150. Clicking in the selection box 2154 again de-selects the optimization constraint.

Each optimization parameter may have a predetermined credit term and credit weight associated therewith stored in relational database server 250. Similarly, each optimization constraint has a predetermined penalty term and penalty weight associated therewith, which may be stored in relational database server 250, such as in limits database 251 and/or objective function values database 257. As seen in FIG. 21, the penalty term incorporates the design value, and the user can change (i.e., configure) this value as desired.

Additionally, the embodiment of FIG. 21 allows the user to set an importance 2156 for each optimization constraint 2150. In the importance field 2158 for an optimization constraint, the user may have pull down options of minute, low, nominal, high and extreme. Each option correlates to an empirically predetermined penalty weight such that the greater the importance, the greater the predetermined penalty weight. In this manner, the user selects from among a set of predetermined penalty weights.

Once the above selections have been completed, a calculation server 400 retrieves the selections above from relational database server 250 and configures the objective function according to the generic definition discussed above and the selections made during the selection process. The resulting configured objective function equals the sum of credit components associated with the selected optimization parameters plus the sum of penalty components associated with the selected optimization constraints.

Additionally, this embodiment provides for the user to select a method of handling the credit and penalty weights. For example, the user is supplied with the possible methodologies of static, death penalty, dynamic, and adaptive for the penalty weights; is supplied with the possible methodologies of static, dynamic and adaptive for the credit weights; and the methodology of relative adaptive for both the penalty and credit weights. The well-known static methodology maintains the weights at their initially set values. The well-known death methodology sets each penalty weight to infinity. The well-known dynamic methodology adjusts the initial weight value during the course of the objective function's use in an optimization search based on a mathematical expression that determines the amount and/or frequency of the weight change. The well-known adaptive methodology is also applied during the course of an optimization search. In this method, penalty weight values are adjusted periodically for each constraint parameter that violates the design value. The relative adaptive methodology is disclosed in U.S. patent application Ser. No. 10/246,718, entitled METHOD AND APPARATUS FOR ADAPTIVELY DETERMINING WEIGHT FACTORS WITHIN THE CONTEXT OF AN OBJECTIVE FUNCTION, by the inventors of the subject application, filed on Sep. 19, 2002, now U.S. Pat. No. 7,487,133.

Optimization Using the Objective Function

Figure 22:
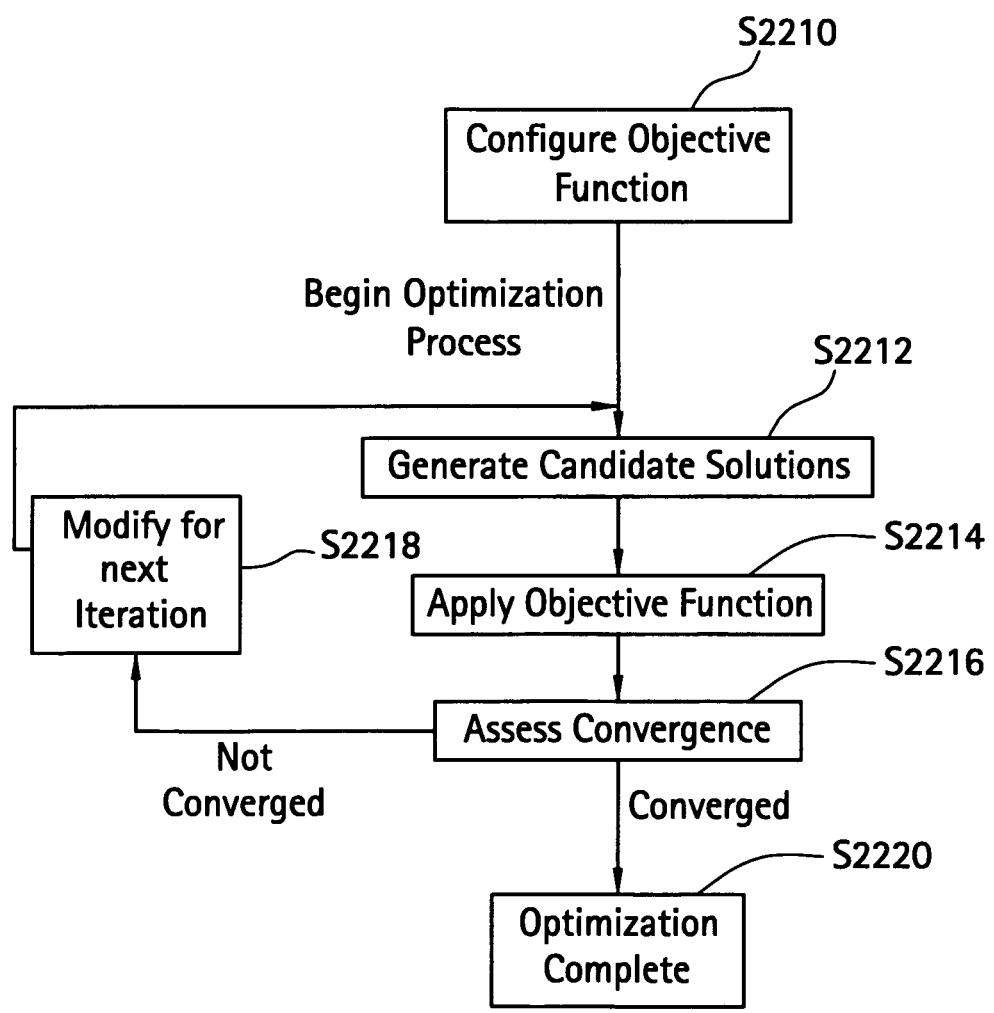
FIG. 22 illustrates a flow chart of an optimization process employing the objective function in accordance with an exemplary embodiment of the present invention.

FIG. 22 illustrates a flow chart of an optimization process employing the objective function in accordance with an exemplary embodiment of the present invention. This optimization process is disclosed in co-pending and commonly assigned U.S. patent application Ser. No. 10/246,716, entitled METHOD AND APPARATUS FOR EVALUATING A PROPOSED SOLUTION TO A CONSTRAINT PROBLEM, filed on Sep. 19, 2002, now abandoned. The relevant portions of the '716 describing the optimization process are hereby incorporated in its entirety by reference herein.

For the purposes of explanation only, the optimization process in FIG. 22 is described as being implemented by the architecture illustrated in FIG. 1. As shown, in Step S2210 the objective function is configured as discussed above in the preceding section, then the optimization process begins. In Step S2212, the calculation processors 400 retrieve system inputs from relational database 250, or generate one or more sets of values for input parameters (i.e., system inputs) of the optimization problem based on the optimization algorithm in use. For example, these input parameters may be related to determining rod patterns bundles in the test reactor core so as to meet the constraint or limit criteria for power operations, but may also be related to the other automated tools, i.e., for determining an core loading pattern and/or a unique fresh fuel bundle types for placement in the test reactor core so as to meet the constraint or limit criteria for power operations. However, optimization is not limited to using these parameters, as other input parameters in addition to placement of fresh and exposed fuel bundles within the reactor, selection of the rod groups (sequences) and/or placement of the control rod positions within the groups as a function of time during the cycle can be used, such as parameters directed to core flow as a function of time during a cycle, reactor coolant inlet pressure, etc.

Each input parameter set of values is a candidate solution of the optimization problem. The core simulator as described above runs a simulated operation and generates a simulation result for each input parameter set of values. The simulation result includes values (i.e., system outputs) for the optimization parameters and optimization constraints. These values, or a subset of these values, are values of the variables in the mathematical expressions of the objective function.

Then, in step S2214, a calculation processor 400 uses the objective function and the system outputs to generate an objective function value for each candidate solution. In step S2216, the calculation processor 400 assesses whether the optimization process has converged upon a solution using the objective function values generated in step S2214. If no convergence is reached, then in step S2218, the input parameter sets are modified, the optimization iteration count is increased and processing returns to step S2212.

The generation, convergence assessment and modification operations of steps S2212, S2216 and S2218 are performed according to any well-known optimization algorithm such as Genetic Algorithms, Simulated Annealing, and Tabu Search. When the optimization is utilized to determine an acceptable rod pattern design (and/or an acceptable core loading pattern design or unique fresh fuel bundle types for placement in the core), the optimization is run until convergence (e.g., acceptable results as in steps S73/S173 of FIGS. 18A and 18B) is obtained.

The Modify Core Loading Pattern Tool

One example of the modify core loading pattern tool is described in detail in co-pending and commonly-assigned U.S. application Ser. No. 10/401,602 to William Earl Russell, II et al., filed Mar. 31, 2003 and entitled "Method and Arrangement for Developing Core Loading Patterns in Nuclear Reactors," now U.S. Pat. No. 7,231,333. The user may implement to core loading pattern tool in conjunction with an accepted rod pattern design determined for the test reactor core, or the tool may be iterated on the existing test reactor core design determined in block 600.

As described with the rod pattern tool and with reference to FIGS. 4 and 11, the test reactor core design (loaded in accordance with the limits identified in FIGS. 5 and 11 and supporting disclosure, with the desired inventory of fresh fuel bundles from FIG. 6, with a desired initial test core loading pattern determined as described in FIGS. 8 and 9 and fresh fuel loading pattern as described in FIG. 10, the test reactor design is simulated. As per the simulation, the only difference in FIG. 13 is that in step S21 the desired core loading pattern, instead of (or in addition to) the rod pattern (control blade sequence) for the test core design is converted into a 3D instruction set. Thus, a desired control blade sequence (rod pattern) determined from iteration of the modify rod pattern tool may be set for the desired core loading pattern (and incorporated as well into the 3D instruction set) for the test core design to be simulated.

Similarly as shown in FIG. 11 and with reference to FIG. 28, the simulation results from the simulation are used in running a licensing codes program (Step S25) to generate transient licensing results. The transient licensing results used to modify the constraint limit definitions (S30) used in an objective function calculation and evaluation (Step S40) for evaluating the simulation results from Step S20) against the limits.

Similarly as described in FIG. 14 which illustrates Step S40 in greater detail, inputs to the objective function calculations from the limits database 251 and the simulator results from the simulator results database 255 are accessed by one or more calculation servers 400 (Step S41), and the objective function values are calculated as a function of each exposure step, and totaled for the entire design problem (Step S43). The calculated objective function values calculated for each constraint, and the objective function values per exposure step are normalized to provide a percentage contribution of a given constraint to a total objective function value (Step S45). Each result or value of an objective function calculation is stored (Step S47) in a subordinate objective function value database 251 within relational database server 250.

As shown in FIG. 15, the user may be provided with data indicating those limits that may have been violated during the simulation. Accordingly, based on this data, the user may be provided with recommendation(s) as to what modifications may need to be made to the selected core loading pattern of the test core design for a subsequent iteration.

As discussed above with the modify rod pattern tool, while individual core loading pattern modifications may alternatively be left to the desires of the user, procedural recommendations as energy beneficial moves, energy detrimental moves, and converting excessive margin (from thermal to limit) into additional energy may be accessible by the user. Even if the test core design with the desired core loading pattern meets all of the limits (client-inputted plant specific constraints, design limits, thermal limits, etc.) the user may verify that any excessive margin to a particular limit is converted into additional energy. Accordingly, the following logic statements may illustrate the above procedural recommendations for modifying the core loading pattern:

Energy Beneficial Moves

If Critical Power Ratio (CPR) margin too low towards core perimeter, move more reactive (less exposed) fuel toward core center If MFLPD (e.g., a thermal margin constraint) problem at EOC, move more reactive fuel towards problem location If shutdown margin (SDM) problem at core perimeter at BOC, place less reactive fuel toward core perimeter Energy Detrimental Moves If Minimum Critical Power Ratio (MCPR) margin too low at EOC, move less reactive (more exposed) fuel into problem location(s)

If KW/ft margin (MAPLHGR) too low at EOC, move less reactive fuel into problem location(s)

Converting Excessive Margin into Additional Energy

If extra MCPR margin in center of core at EOC, move more reactive fuel from core perimeter location to core center The data resulting from the objective function calculations may be displayed as a list of constraints with denoted violators, as shown in FIG. 15 and Table 1. The user may again be presented with graphical displays as shown in FIGS. 16 to 17B to see the effect of the core design on certain constraints or parameters. For example, in FIG. 17B at 1740 and 1750, the encircled squares represent the fuel bundles that are the largest violation contributors to MAPLHGR in the core (e.g., 1740 and 1750 pointing to bundles violating MAPLHGR). This gives the user an indication of fresh and/or exposed fuel locations in the test core design that may need modification.

Figure 23A:
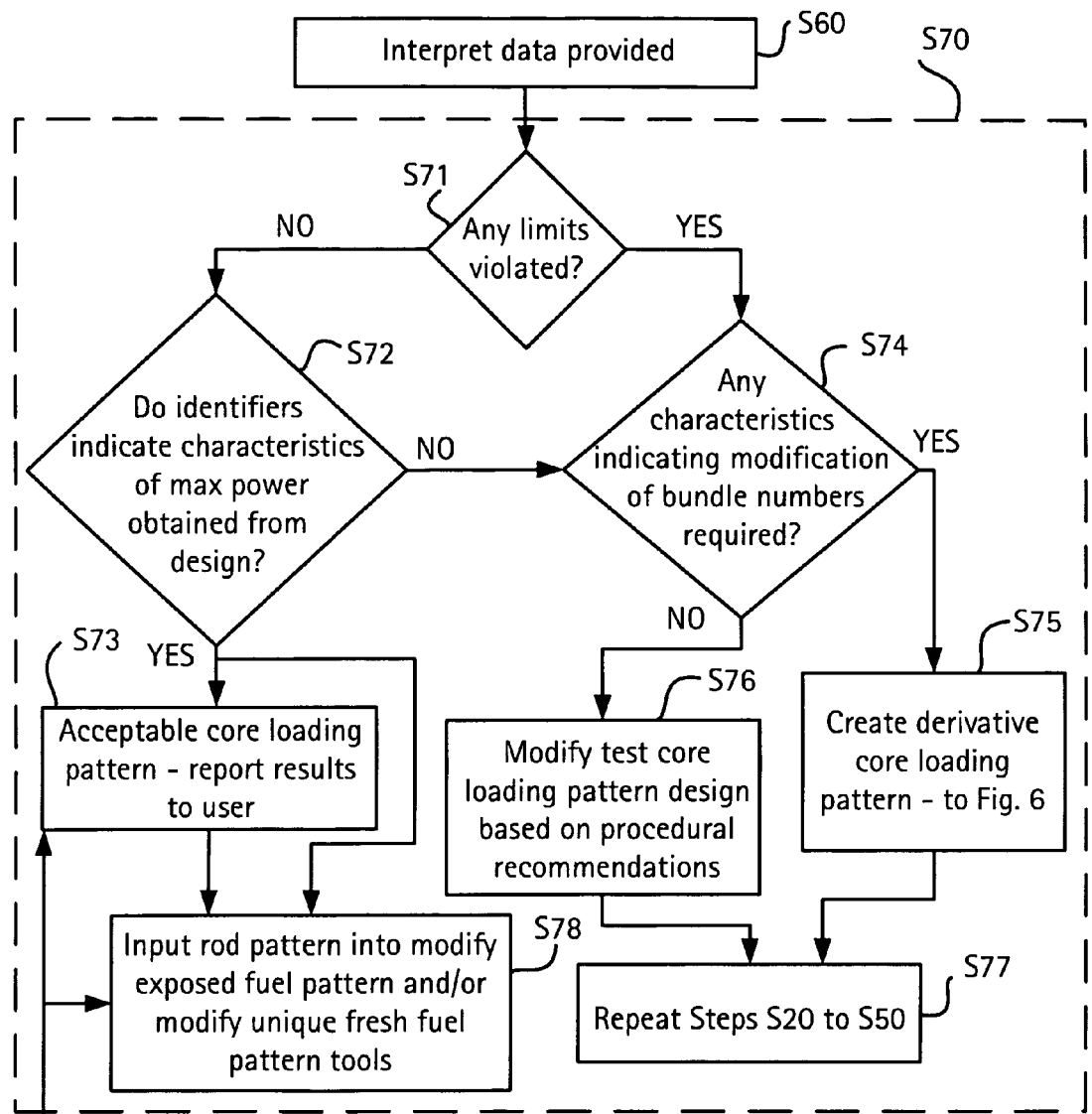
FIGS. 23A and 23B are flow diagrams describing core loading pattern modification and iteration processing steps in accordance with the example modify core loading pattern tool, in accordance with the invention.
Figure 23B:
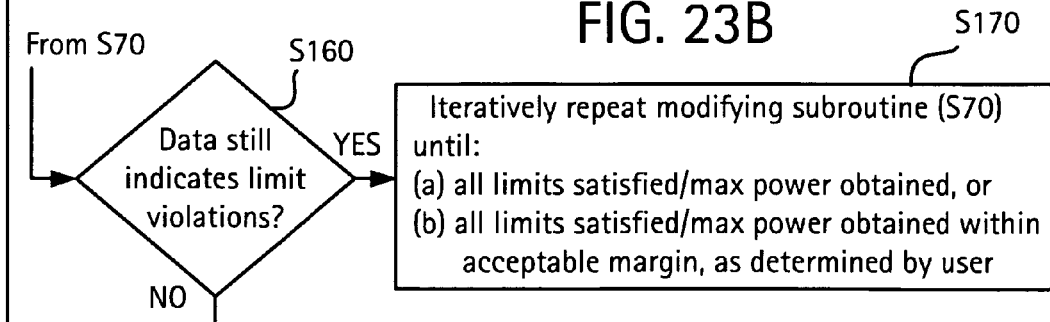

FIGS. 23A and 23B are flow diagrams describing core loading pattern modification and iteration processing steps in accordance with the example modify core loading pattern tool, in accordance with the invention. The functions described in these figures are similar to FIGS. 18A and 18B, and thus similar notation has been used for clarity with the differences discussed in more detail below.

As with the modify rod pattern tool, the user may direct each iteration of this modifying subroutine, with the help of the graphical user GUI 230, or the modifying subroutine may be performed within the bounds of an optimization algorithm that automatically iterates simulation, calculation of objective function and evaluation of the results or values of the objective function calculations for a number of core loading pattern design iterations.

The user determines whether any limits are violated (Step S71), and if none, determines if any identifiers indicate that characteristics of maximum power are obtained from the selected core loading pattern for the test core design. If there is an indication that maximum power has been obtained from the test core design with the selected core loading pattern (the output of Step S72 is YES), an acceptable core loading pattern design has been determined, and the user may access a report of results and data related to the accepted design (Step S73) and/or use the selected core loading pattern in the modify unique fresh fuel bundle type design tool and/or as an input back to the modify rod pattern tool (Step S78).

If limits are violated (the output of Step S71 is YES) or limits are not violated but there is an indication that maximum power has not been obtained from the core loading pattern design (the output Step S72 is NO) the user determines whether any characteristics indicate that modification of fresh fuel bundle numbers is required (Step S74). Characteristics that indicate a need to modify the fresh fuel bundle number may include an energy shortfall, a margin shortfall with acceptable energy, and/or a loss of reactivity due to outage date changes. Additionally, if several iterations of core loading pattern design changes have been attempted and there has been no real improvement to the objective function, this is a further indication that an alternative core loading pattern design might need to be explored.

Accordingly, if the output of Step S74 is YES, the user may create a modified or derivative core loading pattern design by re-estimating the number of fresh fuel bundles needed, rounding bundle numbers down as required for core symmetry and loading the core according to the revised or derivative test core loading pattern (Step S75). Step S75 generally corresponds to steps 604 through 607 in FIG. 6.

If there are no characteristics indicating a need to modify the fresh fuel bundle number (the output of Step S74 is NO) the user may modify the test core design (Step S76) to create a derivative core design. In making a modification to the test core loading pattern based on the procedural recommendations described above, the user may alter the core loading pattern via the GUI 230.

For example, and using a suitable input device (mouse, keyboard, touch screen, voice command, etc) and GUI 230, a designer may identify the core symmetry option for any exposed (or fresh) fuel bundle(s) in the core design that the user desires to move, may select these "target" exposed fuel bundle(s), and may select the "destination" exposed (or fresh) fuel bundles in the core design for replacement by the target exposed (or fresh) fuel bundle(s). The target and destination bundles may be "shuffled" according to the required symmetry (mirror, rotational, etc.). This process may be repeated for any exposed (or fresh) fuel bundle shuffle that is required to re-load modified or derivative test core design in the desired manner.

Figure 24:
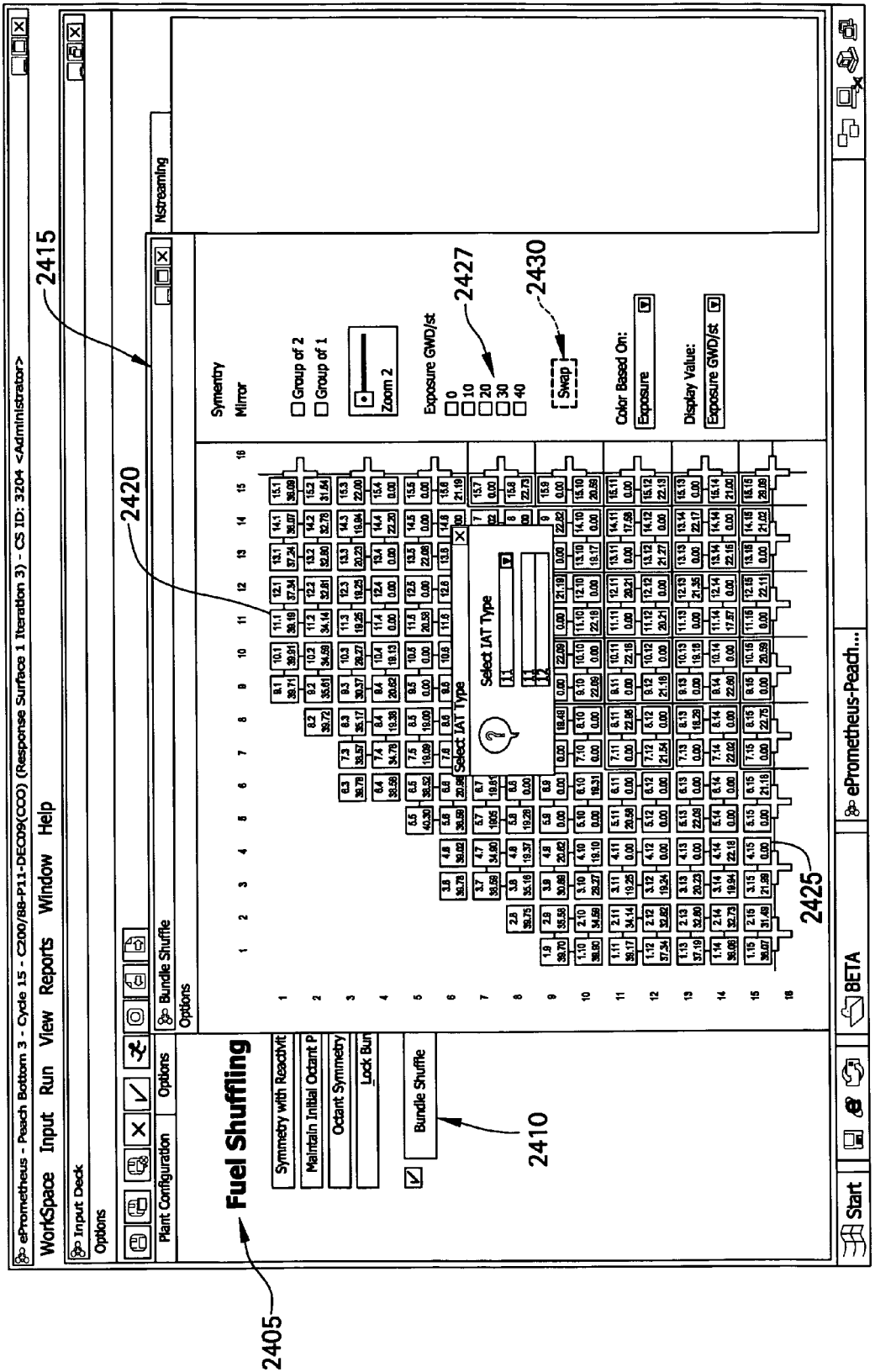
FIG. 24 is a screen shot illustrating the modifying Step S76 of FIG. 23A in further detail in accordance with an exemplary embodiment of the invention.

FIG. 24 is a screen shot illustrating the modifying Step S76 of FIG. 23A in further detail in accordance with an exemplary embodiment of the invention. FIG. 24 illustrates the functionality available to the user so as make swift design modifications to the core loading pattern of the test core design. A user may select a fuel shuffling page 2405 and may select a "bundle shuffle" taskbar 2410 in order to display a screen 2415 of a portion of a core design. In FIG. 13, an exposed fuel bundle designated at 2420 is being changed from one fuel bundle type (IAT type 11) to another (IAT type 12). In an example, an exposed fuel bundle may be swapped with a fresh fuel bundle by selecting a fresh fuel bundle in the core design, the exposed fuel bundle, and selecting the "SWAP" button 2430. The portion of the core shown in screen 2425 may be color coded to show the various exposures (i.e., giga-watt days per short ton (GWD/st)) of each of the exposed and fresh fuel bundles. A corresponding color coded key may be displayed as indicated at 2427 for example. Selection of items in FIG. 24 may be possible via a suitable input device, such as a mouse, keyboard, touch screen, voice-activated command, etc.

These core loading pattern design modifications may be saved in relational database 250, such as in 3D Simulator input parameters database 259, for example. Referring again to FIG. 23A, regardless of whether the test core loading pattern was modified as described in Steps S75 or S76, Steps S20-S50 as shown in FIG. 11 may be repeated to determine if the derivative core design which meets all limits (Step S77). This may become an iterative process.

FIG. 23B illustrates an iterative process in accordance with an exemplary embodiment of the invention. For each derivative core loading pattern design from Step S70 that has been simulated, the user determines whether any data that is related to the comparison between simulated results and limits (e.g., the calculated objective function values) still indicates that there are limit violations (Step S160). If not, (output of Step S160 is NO) the user has developed an acceptable derivative core loading pattern design that may be used in a particular reactor, and may access graphical results related to the acceptable core loading pattern design (Step S73) and/or use the selected derivative core loading pattern in the modify unique fresh fuel bundle type design tool and/or as an input back to the modify rod pattern tool (Step S78).

If an iteration still indicates that limits are violated (the output of Step S160 is YES) then the modifying subroutine in Step S70 may be iteratively repeated until all limits are satisfied/maximum power obtained, or until all limits are satisfied/maximum power obtained within a margin thereto that is acceptable, as determined by the user (Step S170). The iterative process may be beneficial in that it enables the user to fine tune a core loading pattern design, and to perhaps extract even more energy out of an acceptable core loading pattern design than was previously possible of doing with the conventional, manual iterative process. Further, incorporation of the relational database server 250 and a number of calculation servers 400 expedite calculations. The iterative process as described in FIG. 23B may be done in an extremely short period of time, as compared to a number of weeks using the prior art manual iterative process of changing one parameter at a time, and then running a reactor core simulation.

As described with the modify rod pattern tool in FIGS. 18A and 18B, the functions of FIGS. 23A and 23B may also be iterated over N different core loading pattern designs, in an effort to consistently improve toward a desired core loading pattern design that satisfies all user limits and constraints, for use in a nuclear reactor core.

Referring again to FIG. 20, for optimizing the iterative core loading pattern process, the user would check box 2042 for the optimize fuel loading parameter. Optimize fuel loading selection means making an optimal determination of the once and twice burnt fuel.

As shown in FIG. 21, the user may select desired optimization constraints (box 2152) associated with a given optimization constraint 2150, and may set the importance 2156 for each optimization constraint 2150 as described above (minute, low, nominal, high and extreme), correlating to empirically predetermined penalty weights such that the greater the importance, the greater the predetermined penalty weight.

Once the above selections have been completed, a calculation server 400 retrieves the selections above from relational database server 250 and configures the objective function according to the generic definition discussed above and the selections made during the selection process. The resulting configured objective function equals the sum of credit components associated with the selected optimization parameters plus the sum of penalty components associated with the selected optimization constraints.

As previously described, the user may select possible methodologies of static, death penalty, dynamic, and adaptive for the penalty weights; is supplied with the possible methodologies of static, dynamic and adaptive for the credit weights; and the methodology of relative adaptive for both the penalty and credit weights, as disclosed in the '718 application above. Accordingly, the optimization process of FIG. 22 may then proceed to determine an acceptable derivative core loading pattern design.

Unique Fresh Fuel Bundle Type Design Tool (N-Streaming)

Based on one or both of an accepted core loading pattern from the modify core loading design tool and an accepted rod pattern from the modify rod pattern design tool, the unique fresh fuel bundle type design tool may be iterated to determine the different types and/or locations of fresh fuel bundles (available from the fresh fuel bundle inventory) that may be used for the desired reactor core design. Alternatively, the user may implement this tool using the original, initial test core design determined in block 600, in order to determine the placement and makeup of fresh fuel bundle types in the design, and output this design to one or both of the modify core loading pattern and/or modify rod pattern tools.

The unique fresh fuel bundle type design tool, hereafter "N-Streaming tool" for convenience is described in detail in co-pending and commonly-assigned U.S. application Ser. No. 10/325,831 to David J. Kropaczek et al., filed Dec. 23, 2002 and entitled "Method and Arrangement for Determining Nuclear Reactor Core Designs", now U.S. Pat. No. 7,200,541. This tool is adapted to determine N unique fresh fuel bundle types for the core design. Although the sequence of operations to generating the test core design for N-streaming is a slight modification from that described in FIGS. 5-11, the test core design is simulated as per FIG. 13, the licensing codes are run to generate the licensing results for modifying the constraint definitions of the objective function (as shown in FIGS. 11 and 28 (Steps S25 and S30)) and objective function values are calculated as per FIG. 14.

As to the simulation, the difference in FIG. 13 is that in step S21 the test core design incorporates a certain unique subset of fresh fuel bundle types that is converted into a 3D instruction set. Moreover, a desired control blade sequence (rod pattern) determined from iteration of the modify rod pattern tool (and base core loading pattern (the placement and makeup of once and twice burnt fuel bundles, and fresh fuel bundles other than the unique subset being evaluated) may be set for the test reactor core design (and incorporated as well into the 3D instruction set) for the test core design to be simulated.

FIG. 25 is a flow chart illustrating the functionality of the N-Streaming tool in accordance with an exemplary embodiment of the invention. As described in FIG. 11, a reactor plant is selected for evaluation in Step S5 and limits (inclusive of transient licensing constraints) which are used in a simulation for a test rod pattern design of the selected plant are defined (Step S10). These steps have previously been performed by the functions in input block 500, but are reiterated herein for clarity. As previously shown in FIG. 5, the client-inputted plant specific constraints, which may be configured as limits on input variables to the simulation and limits on the simulation results are set for the simulation.

A test core design with an initial fresh fuel loading pattern is then generated (Step S15) for the selected reactor plant. For example, historical core loading pattern design database 254 may be accessed to find a historical reactor core design most consistent with the defined limits. A historical core design may be consistent if it is of a similar core size and power output rating, has similar cycle energy, and has similar operational performance characteristics to the core design being developed for the selected reactor plant.

Using the similar historical design as a basis, and similar to as described in FIG. 6, the total energy content of the historical core may be calculated and a difference from the required energy content (e.g., the desired energy output from the determined core design, as based on customer requirements for example) defined. The difference in energy between historical core the energy content desired should be supplied by the loading of fresh fuel assemblies.

Thus, to generate the reference core design, the user should select (Step S17) fresh fuel bundle type(s) for the reference core design that can best meet the energy requirement(s) (which may be included in the limits) for the reactor core design to be developed. The bundles designs may be selected from the fresh fuel bundle design database 252, which provides a wide variety of fresh fuel bundle designs (or N streams) that have been previously created and modeled.

FIG. 26 illustrates a screen shot of a bundle selection web page 2600. Entitled "N-Streaming", a user may bring up page 2600 via GUI 230 using a suitable input device, such as a modem, keyboard, pointer and the like. A plurality of selectable fresh fuel bundle types 2605 may be displayed; these bundle types 2605 have been previously modeled, so information relating to the performance of these bundle types 2605 is readily available to the user. The user may then select desired bundle types to be used in the loading pattern of the reference core design by checking boxes 2610.

With the fresh bundle types selected, core loading symmetries are accounted for as described in step 606 of FIG. 6. Then, one or more current fresh fuel bundles in the test core design may be replaced (Step S19) with one or more of the selectable fresh fuel bundles 2605 during an iterative improvement process. The selection may be performed via GUI 230, which provides the user with a summary of each bundle's performance characteristics. Once the "N-streaming" (selected fresh fuel bundles) have been defined, a looping process described in terms of Steps S19 and S20 is initiated, whereby a systematic process of replacement and analysis for fresh fuel bundles is performed.

In an example, at an outermost level ("outer loop") each fresh fuel location in the current reference core design is examined in sequence. By "examined", reactor core operation is simulated (Step S20) similar to as described in FIG. 13 for the test core design with each particular unique fresh fuel loading pattern, and performance characteristics of the N-streams (unique fuel bundles) are reviewed to determine whether the test (or derivative) core design can best meet the energy requirement(s) for the reactor core design to be developed. At the innermost level, each "replacement" fresh fuel bundle 2605 selected from page 2600 is examined in each fuel location (S35). During this process, a current fresh fuel bundle in the reference core design is replaced with each new "N-streaming" fresh fuel bundle 2605.

Of note, for each simulation in the above looping process until the output of Step S35 is YES, the simulation results are used as an input for running the transient licensing codes to generate the transient licensing results that are stored in database 262. As previously discusses, the transient licensing results used to modify the constraint limit definitions (CONS) for the objective function to be evaluated in Step 40' (to be described hereafter) for ranking the simulation results (outputs) based on the limits using the objective function. These are shown in FIG. 25 as Steps S25' and S30' and should be referenced to Steps S25 and S30 in FIG. 11.

Thus, reactor core operation is simulated (Step S20) on the test core design containing one or more of the select fresh fuel bundles, in order to produce a plurality of simulated results, or outputs. The iterative step's of replacement and simulation are repeated (output of Step S35 is NO) until all selected fresh fuel bundles have been inserted at each fuel location and each derivative core design has been simulated (e.g., output of Step S35 is YES). Substitution of all selected fresh fuel bundles 2605 into each of the fresh fuel locations is therefore complete upon exiting the inner and outer loops.

The iterative improvement process described above may be beneficial in that it enables the user to fine tune the fresh fuel loading pattern for the core design, and to perhaps extract even more energy out of an acceptable core design than was previously possible of doing with the conventional, manual iterative process. Further, incorporation of the relational database server 250 and a number of calculation servers 400 expedite calculations, reducing processing time to hours instead of weeks.

The outputs from simulation are ranked (or evaluated) based on the limits (Step S40'), as described in FIG. 14. A user may display data related to each of the outputs, if desired. This enables a user to make a comparison against the reference core design to determine whether there was any improvement, where improvement may be defined in terms of not exceeding the defined limits, or meeting certain energy requirements, for example.

If the top ranked output is an improvement (output of Step S50 is YES) the core design corresponding to that highest ranked output is set (Step S80) as the new core design (and may be input for iteration of the core loading tool or rod pattern tool to refine the design) with the results stored (Step S90) in relational database server 250, such as in simulator results database 255. This completes a single iteration of the iterative improvement process.

Steps S19, S20, S25', S30', S40' and S50 (inclusive of steps S20 (simulation) through S90 are repeated (e.g., N iterations), with each "improvement" becoming the new reference core design for a subsequent iteration. The defined limits are applicable to the reference core design in each of the N iterations. If, for a given iteration, there is no improvement in the top ranked output, the iterative process is complete, and data relating to the reference core design at that point, since it is the top ranked design may be displayed and interpreted (Step S60) by the user. The data may also provide the user with an indication of which location in a simulated core were the largest violators or largest contributors to a limit violation. At Step S60, the user may be inclined to initiate a modify subroutine (Step S70) similar to that described in FIGS. 18A-B and 23A-B. In an example, this could be an optional step, since the rod pattern and core loading pattern for the core design may already have been determined and set with the exception of fine tuning the location and/or makeup of the fresh fuel bundles to achieve an acceptable core design.

As discussed above with the modify rod pattern and modify core loading tools, procedural recommendations may be accessible by the user. Even if the test core design with the desired N streams of fresh fuel bundles meets all of the limits (client-inputted plant specific constraints, design limits, thermal limits, transient licensing constraints, etc.) the user may verify that any excessive margin to a particular limit is converted into additional energy. Accordingly, the following logic statements may illustrate the above procedural recommendations for modifying the fresh fuel loading pattern for the test or derivative core design:

Energy Beneficial Moves

If Critical Power Ratio (CPR) margin is too low towards core perimeter, bring more reactive fuel toward core center If NEXRAT (Nodal Exposure Ratio, a thermal margin constraint) problem at end-of-cycle (EOC), move more reactive (e.g., less exposed) fuel to problem location;

If ShutDown Margin (SDM) problem at perimeter of core at beginning of cycle (BOC), place less reactive fuel towards perimeter Energy Detrimental Moves If CPR margin too low at EOC, move less reactive fuel into problem location If kW/ft margin too low at EOC, move less reactive fuel into problem location Converting Excessive Margin into Additional Energy If extra CPR margin in center of core at EOC, move more reactive fuel from perimeter locations to core center The data resulting from the objective function calculations may be displayed as a list of constraints with denoted violators, as shown in FIG. 15 and Table 1. The user may again be presented with graphical displays as shown in FIGS. 16 to 17B to see the effect of the core design with unique fresh fuel loading pattern on certain constraints or parameters, to give the user an indication of those fresh fuel locations in the test core design that may need modification.

Figure 27A:
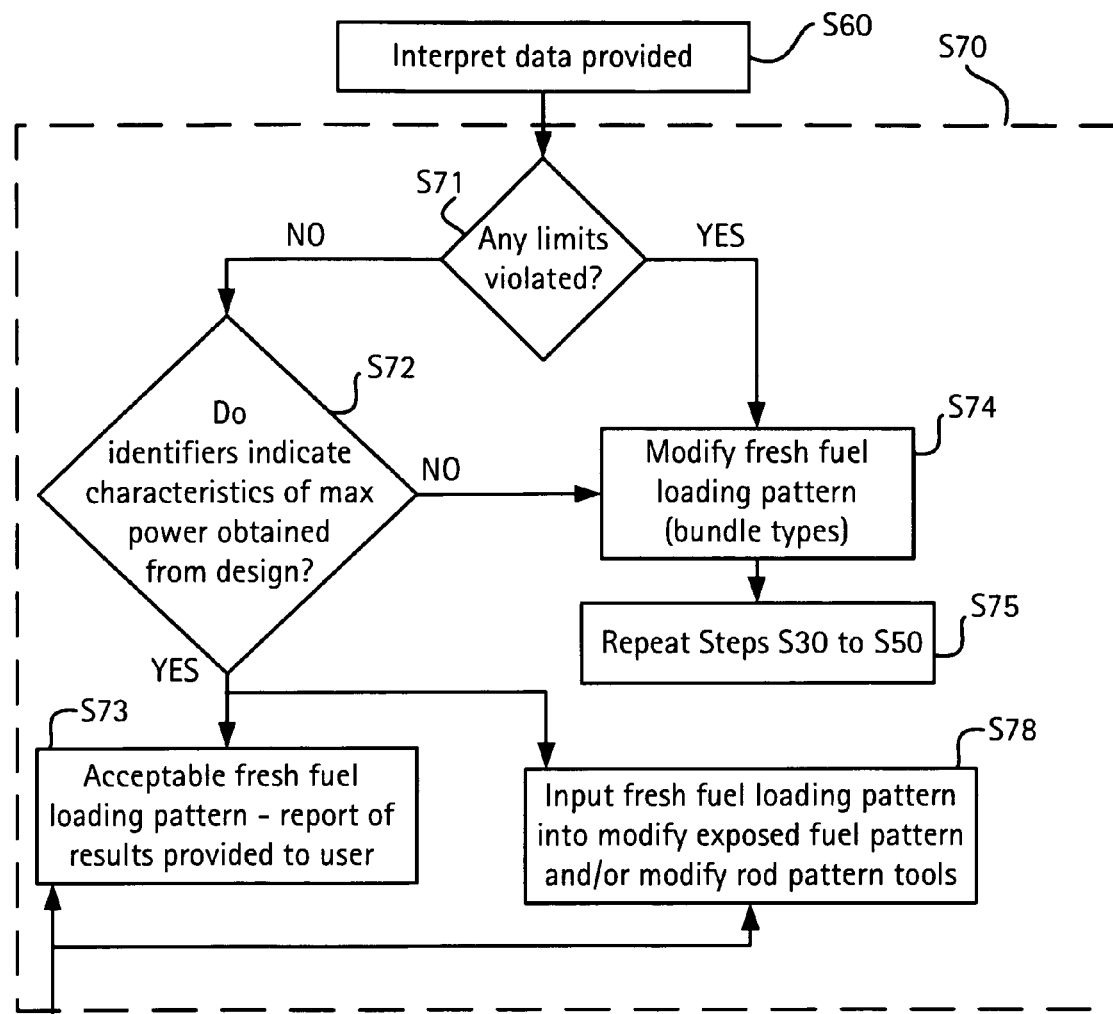
FIGS. 27A and 27B are flow diagrams describing the modification of the N-streams (unique fresh fuel types) in accordance with the invention.
Figure 27B:
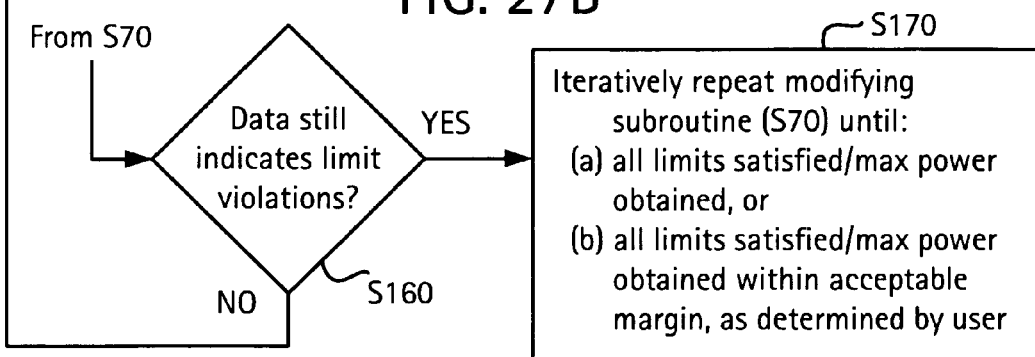

FIGS. 27A and 27B are flow diagrams describing the modification of the N-streams (unique fresh fuel types) in accordance with the invention. The functions described in these figures are similar to FIGS. 18A and 18B or FIGS. 23A and 23B, and thus similar notation has been used for clarity with the differences discussed in more detail below.

As previously discussed, the user may direct each iteration of this modifying subroutine, with the help of the graphical user GUI 230, or the modifying subroutine may be performed within the bounds of an optimization algorithm that automatically iterates simulation, calculation of objective function and evaluation of the results or values of the objective function calculations for a number of core loading pattern design iterations.

Referring to FIG. 27A, by interpreting the data at Step S60, the user may be inclined to initiate a modify subroutine (Step S70). In such a case practicality, the original test core design will not be an acceptable design, and the modify subroutine may be required if the iterative improvement process fails to provide a core design that is acceptable to the user, such as may be the case where certain limits which shall not be violated are still violated with each iteration.

As with the modify rod pattern and modify core loading tool, the user may direct each iteration of this modifying subroutine, with the help of the graphical user GUI 230, or the modifying subroutine may be performed within the bounds of an optimization algorithm that automatically iterates simulation, calculation of objective function and evaluation of the results or values of the objective function calculations for a number of core loading pattern design iterations.

The user determines, based on the displayed data, whether any limits are violated (Step S71). If no limits are violated, the user determines if any identifiers indicate that characteristics of maximum energy are obtained from the core design (i.e., indication of good thermal margin utilization (such as margins on MFLCPR and LHGR) by moving fuel so as to maximize plutonium generation for cycle extension, or where the minimum EOC eigenvalue is obtained for the core design to be used for the fuel cycle (eigenvalue search) or the desired cycle length is determined at a fixed EOC eigenvalue.

If there is an indication that maximum energy has been obtained from a core design (the output of Step S72 is YES), the acceptable core design with desired fresh fuel loading pattern has been determined, and the user may access a report of the results related to the core design (Step S73) and/or use the selected fresh fuel loading pattern in the modify rod pattern design tool and/or as an input back to the modify core loading pattern tool (Step S78).

If limits are violated (the output of Step S71 is YES) or limits are not violated but there is an indication that maximum energy has not been obtained from the core design (the output Step S72 is NO) then the user determines a fresh fuel loading pattern modification to be made to the current reference core design (Step S74). In making a modification to the fresh fuel loading pattern, and based on the recommendations from above, the user may alter the fresh bundle loading via the GUI as described in FIG. 24, such by identifying the bundle symmetry option of any potential fresh bundle(s) in the test core design to be moved, and selecting the "target" fresh fuel bundle(s), the destination(s) where the target bundle(s) is/are to be moved. The identified target bundles are then shuffled according to the required symmetry (mirror, rotational, etc.). This process may be repeated for any fresh bundle shuffle that is required to re-load the core reference pattern in the desired manner. Further, the test core design modifications may be saved in simulator input parameters database 259, for example.

The user may repeat steps S20 to S50 (Step S75) incorporating the design modifications. The resultant highest ranked output establishes a new reference core design from which the iterative improvement process of FIG. 25 may be repeated. In other words, Steps S20-S50 may be repeated to determine if the derivative core design meets all limits (Step S75). This may become an iterative process, as described above.

Referring to FIG. 27B, the modify subroutine in Step S70 is iteratively repeated until all limits are satisfied, or until all limits are satisfied within a margin that is acceptable, as determined by the user (Step S170). The functions of FIGS. 27A and 27B may be iterated over N different fresh fuel loading pattern designs, in an effort to consistently improve toward a desired fresh fuel pattern design that satisfies all user limits and constraints, for use in a nuclear reactor core. Assuming the core loading pattern for exposed fuel and rod patterns have been set to satisfy the limits for power operations, this fine tuning determines the desired fresh fuel loading pattern, that could with exposed fuel and rod pattern designs, generates the core design reported to the customer at block 1100 in FIG. 4

Referring again to FIG. 20, for optimizing the iterative N-streaming process, the user would check box 2042 for the optimize fuel loading and optimize bundle selection parameters, and select desired optimization constraints 2150 and set the importance for each optimization constraint 2150 as described in FIG. 21. Once the above selections have been completed, a calculation server 400 retrieves the selections above from relational database server 250 and configures the objective function according to the generic definition discussed above and the selections made during the selection process, and the optimization process in accordance with FIG. 22 may then proceed to determine an acceptable derivative core design with the desired fresh fuel loading pattern.

Accordingly, the N-streaming tool permits any number or combinations of fresh fuel bundle loading pattern designs (e.g., "N streams") to be utilized in order to determine an accepted core design that satisfies the plurality of limits or constraints that have been input by a user for power operations. The thus determined core design may include N new fresh fuel bundle solutions therein, for example.

In contrast to current reactor core designs, which typically utilize at most one or two fresh fuel bundle types (i.e., a one or two stream solution), any number or combinations of fresh fuel bundle loading pattern designs for location and type of fresh fuel bundle (e.g., "N streams") may be utilized in order to determine the desired fresh fuel bundles for placement in the core design. In an example, the N-streaming methodology may be used to determine a core design satisfying the limits and/or constraints for power operations with N unique fresh fuel bundle types (N streams), where N equals or exceeds at least 2 unique fresh fuel bundle types (N≥2).

Accordingly, as described here above, each of the rod pattern, core loading pattern and unique fresh fuel bundle type design tools may be iterated sequentially and/or together by the user and can provide feedback to one or both of the other tools, until all rod (control blade), exposed fuel and/or fresh fuel type changes have been exhausted in the test core design and/or a given "candidate" modified test core design satisfies each of the limits or constraints set for power operations.

For each automated tool, operation or iteration of the selected automated tool to evaluate the test core design against the input limits inclusive of transient licensing constraints includes performing a simulation in order to produce a plurality of simulation results for comparison against the limits and constraints. Data indicating that one or more limits were violated by the test core design during the simulation may be accompanied by procedural recommendations to modify one or more of the rod pattern core loading pattern and or unique fresh fuel bundle type makeup in the core design. One, some or all of the automated tools are implemented and iteratively repeated until a test core design is determined which meets all limits and transient licensing constraints for power operations. This design thus represents an acceptable reactor core design.

As discussed above, the comparison includes configuring an objective function to generate a corresponding objective function value for each output using the objective function. The objective function values are evaluated based on the constraints to determine which of the outputs violate a limit. Based on procedural recommendation and/or by the user's own choosing, the user may then modify the test core design via GUI 230 to create a derivative reactor core design. Modifications may be made to control blade placement (modify rod pattern design tool), exposed fuel placement (modify core loading pattern design tool), fresh fuel bundle type make-up and placement (N-streaming design tool), and repeating simulation to evaluate if there is any performance improvement in a given derivative test core design.

Referring back to FIG. 4, if after all tools have been iterated and all rod (control blade), exposed fuel and fresh fuel bundle changes have been exhausted, one or more limits from block 500 are still not satisfied, the user may be required to make global changes to exposed fuel to reload in block 600 and to reload the test core in accordance with the new exposed fuel loading pattern, as described in FIGS. 8 and 9. As previously discussed, if limit violations still exist after all modifications in block 700 have been exhausted, the user may return to block 600 and evaluate whether all exposed fuel bundles from the fuel pool inventory have been used. The user may change the exposed fuel bundles that are to be reloaded in the core design as described in FIGS. 8 and 9, accessing a different combination of exposed fuel bundles from the fuel pool with the filter window of FIG. 9, for example.

If one or more limits from block 500 are still not satisfied, the user may be directed back to the processes in core loading block 600 and modify the original fuel loading template, inclusive of changing the exposed and fresh fuel placements of bundles, in order to change the locations in the template for insertion of different exposed and/or fresh fuel bundles selected from existing inventory. Once these changes have been made, a modified or derivative core design may be re-evaluated using one, some or all of the automated tools in block 700 until all limits have been satisfied and/or are within an acceptable margin to the limits as determined by the user.

The user then may receive the data and design parameters (e.g., via suitable reports and graphical representations) corresponding to the acceptable core design at block 1100, and the plant operators and/or staff can then modify the actual reactor core being evaluated in accordance with the accepted design at a next planned outage to satisfy NRC licensing requirements.

The example system and computer implemented method described above may potentially enable a user or designer to determine superior core designs that improve fuel cycle economics. The resultant core designs may exhibit improved fresh fuel utilization with greater cycle lengths, and may provide plant operators greater operation flexibility. The example system and computer-implemented method described above may offer the ability to incorporate complex bundle designs into loading pattern development as a means to address specific customer requirements or requests, and may reduce the design or modeling period for determining a core design for power operations within a relatively short timeframe, (<2 weeks versus 9 months). Human errors may be eliminated in trying to generate 3-D Simulator input files or transient input files, as these are generated by the example computer-implemented methodology.

The example embodiments of the present invention being thus described, it will be obvious that the same may be varied in many ways. For example, the functional blocks of FIGS. 1-4, 6, 11, 13, 14, 18A-B, 22, 23A-B, 25, 27A-B and 28 describing the exemplary methodologies and system may be implemented in hardware and/or software. The hardware/software implementations may include a combination of processor(s) as shown and/or article(s) of manufacture. The article(s) of manufacture may further include storage media and executable computer program(s).

The executable computer program(s) may include the instructions to perform the described processes or functions to determine a reactor core design. The computer executable program(s) may also be provided as part of externally supplied propagated signal(s).

The technical effect of the example embodiment may be a system and/or computer-implemented method invoking the processing capabilities of multiple processors(s) and/or computer program logic of the programs implemented by the one or more processors to provide a way to efficiently develop a core design for a nuclear reactor that satisfies all NRC steady-state and transient licensing requirements for reactor operation in a given plant being evaluated.

Additionally, the technical effect of the example embodiments provide a computer/processing-driven system for providing internal and external users the ability to quickly develop, simulate, modify and perfect core design with a specified rod pattern, core loading pattern for exposed fuel and fresh fuel assemblies which satisfies all input limits and transient licensing constraints particular to the reactor plant being evaluated. The core design may thus be implemented in the core of the evaluated reactor plant at a next scheduled outage, with the core operating in a next and subsequent cycles in accordance with the thus determined core design.

Such variations are not to be regarded as departure from the spirit and scope of the exemplary embodiments of the present invention, and all such modifications as would be obvious to one skilled in the art are intended to be included within the scope of the following claims.

What is claimed is:

1. A computer-implemented method of designing a nuclear reactor core of a given reactor plant, comprising:
   generating an initial, test reactor core design for the given plant based on a plurality of limits input by a user, the limits including a plurality of transient licensing constraints to be satisfied for power operations by the given plant;

selecting, from a set of automated tools, one or more automated tools to evaluate the test core design, and operating one or more of selected automated tools to output data for display to the user related to a core design that satisfies the limits inclusive of the transient licensing constraints.

2. The method of claim 1, wherein operating a given selected automated tool includes simulating reactor operation with the test core design to produce a plurality of simulation outputs, running a licensing codes program using the simulation outputs to generate a plurality of transient licensing results, modifying constraint limit definitions to be used in an objective function that quantifies the test core design's adherence to the limits, based on the transient licensing results, calculating, for each simulation output, a representative objective function value using the objective function with modified constraint limit definitions, evaluating the objective function values to determine which of the simulation outputs, if any, violate a limit, and outputting data related to an acceptable core design for display to the user, if the evaluating step indicates no limit violations, or all limits are within a margin that is acceptable to the user, else providing data indicative of limits that were violated by the core during the simulation and procedural recommendations for modifying the test core design based on the limit violations for display to the user.

3. The method of claim 2, further comprising:
storing information related to the test core design, limits, transient licensing constraints, transient licensing results, outputs, and data from one of the outputting or providing steps.

4. The method of claim 2, wherein if one or more limits were violated based on the evaluating step, the method further comprising:
modifying the test core design to create a derivative core design; and
repeating the selecting and operating steps for multiple automated tools to determine whether any limits were violated by the derivative core design during the simulation.

5. The method of claim 4, further comprising:
iteratively repeating the modifying, selecting and operating steps for N iterations of the derivative design, and, for selected ones of the N iterations, storing, at each iteration, information related to limits, transient licensing constraints, transient licensing results, simulation outputs, and data from the evaluating step.

6. The method of claim 5, wherein, based on which limits were violated by a particular derivative design, a specific automated tool is selected for a subsequent iteration.

7. The method of claim 1, wherein the input limits include a plurality of licensing transient calculation definitions to be run for generating the transient licensing constraints.

8. The method of claim 1, wherein the set of automated tools includes a rod pattern design tool to modify the rod pattern of the test core design, a core loading pattern design tool to modify core loading pattern of the test core design, and a fresh fuel bundle type design tool to modify the fresh fuel loading pattern within the test core design.

9. The method of claim 8, wherein each of the rod pattern, core loading pattern and fresh fuel bundle type design tools are invoked sequentially and provide feedback as an output to each corresponding tool, until all rod, exposed fuel and fresh fuel changes have been exhausted in the test core design.

10. The method of claim 1, wherein the limits include client-inputted plant specific constraints and core performance criteria.

11. The method of claim 1, further comprising:
modifying the test core design to create a derivative core design; and
repeating the selecting and operating steps for multiple automated tools to determine whether any limits were violated by the derivative core design during the simulation.

12. The method of claim 11, wherein, for the derivative core design, the selecting step selects the same automated tool used for the test core design.

13. The method of claim 11, wherein, for the derivative core design, the selecting step selects a different automated tool than used for the test core design.

14. The method of claim 1, wherein a core design that satisfies the limits inclusive of the transient licensing constraint includes data illustrating to the user how to load and run the reactor to satisfy the limits inclusive of the transient licensing constraints.

15. The method of claim 1, wherein the accepted core design has N unique fresh fuel bundle types, $N \geq 2$.

16. A computer-implemented method of designing a nuclear reactor core of a given power plant for power operations, comprising:
inputting, by a user, a set of limits to be satisfied for core power operations in the given plant, the limits including transient licensing constraints to be satisfied for power operation by the given plant;
generating a test reactor core design based on the limits;
operating a set of automated tools to generate output data for display to the user for a core design which satisfies the limits and transient licensing constraints, the automated tools including a rod pattern design tool to modify the rod pattern of the test core design, a core loading pattern design tool to modify the core loading pattern of the test core design, and a fresh fuel bundle type design tool to modify the fresh fuel loading pattern within the test core design.

17. The method of claim 16, wherein the accepted core design has N unique fresh fuel bundle types, $N \geq 2$.

18. The method of claim 16, wherein the limits to be satisfied include client-inputted plant-specific limits and core performance criteria for reactor power operation and core flow.

19. The method of claim 16, wherein operation of one of more of the automated tools is repeated by modifying the core design using an optimization process until a given core design indicates that all limits have been satisfied or satisfied within a margin to one or more given limits that is acceptable to the user.

* * * * *